Nov. 3, 1959 H. C. A. VAN DUUREN 2,911,473

MULTIPLEX WIRELESS TELEGRAPH SYSTEM

Filed March 2, 1953 29 Sheets-Sheet 1

CONTROL CENTER

INVENTOR.

Hendrik Cornelis Anthony van Duuren

BY Baron Jackson Buttler + Dennen

Att'ys.

Nov. 3, 1959 H. C. A. VAN DUUREN 2,911,473

MULTIPLEX WIRELESS TELEGRAPH SYSTEM

Filed March 2, 1953 29 Sheets-Sheet 2

INVENTOR.

Hendrik Cornelis Anthony van Duuren

BY Brown, Jackson, Boettcher & Dienner

Attys.

INVENTOR.

Hendrik Cornelis Anthony van Duuren

BY Brown, Jackson, Boettcher & Dienner

Attys.

INVENTOR.
Hendrik Cornelis
Anthony van Duuren
By Dunn Jackson Gatchen + Dunner
Atty.

INVENTOR.
Hendrik Cornelis Anthony van Duuren
BY Bym Jackson Bottcher & Dienner
Att'ys.

INVENTOR.
Hendrik Cornelis Anthony van Duuren
BY Brown, Jackson, Boettcher & Dienner
Att'ys

INVENTOR.

Hendrik Cornelis Anthony van Duuren

BY Brown, Jackson, Boettcher & Dienner

Att'ys.

INVENTOR.
Hendrik Cornelis Anthony van Duuren
BY Brown, Jackson, Boettcher & Dienner
Attys.

MULTIPLEX WIRELESS TELEGRAPH SYSTEM

Filed March 2, 1953 29 Sheets-Sheet 9

INVENTOR.
Hendrik Cornelis Anthony van Duuren
BY Brown Jackson Boettcher & Dienner
Att'ys.

INVENTOR.
Hendrik Cornelis Anthony van Duuren
BY Brown Jackson Boettcher & Dienner
Att'ys.

MULTIPLEX WIRELESS TELEGRAPH SYSTEM

Filed March 2, 1953 29 Sheets-Sheet 11

INVENTOR.

*Hendrik Cornelis Anthony van Duuren*

BY *Baum Jackson Boettcher & Dienner*

*Att'ys.*

Nov. 3, 1959 H. C. A. VAN DUUREN 2,911,473

MULTIPLEX WIRELESS TELEGRAPH SYSTEM

Filed March 2, 1953 29 Sheets-Sheet 12

INVENTOR.

Hendrik Cornelis Anthony van Duuren

BY [signature]

Att'ys.

INVENTOR.
Hendrik Cornelis Anthony van Duuren
BY Brown, Jackson, Boettcher & Dienner
Att'ys.

INVENTOR.
Hendrik Cornelis Anthony van Duuren
BY Brown, Jackson, Boettcher & Dienner
Att'ys.

Nov. 3, 1959 H. C. A. VAN DUUREN 2,911,473

MULTIPLEX WIRELESS TELEGRAPH SYSTEM

Filed March 2, 1953 29 Sheets-Sheet 15

INVENTOR.

Hendrik Cornelis Anthony van Duuren

BY [signature]

Att'ys.

Nov. 3, 1959 H. C. A. VAN DUUREN 2,911,473

MULTIPLEX WIRELESS TELEGRAPH SYSTEM

Filed March 2, 1953 29 Sheets-Sheet 16

INVENTOR.

Hendrik Cornelis Anthony van Duuren

BY Brown Jackson Boettcher & Dienner

Attys.

MULTIPLEX WIRELESS TELEGRAPH SYSTEM

Filed March 2, 1953 29 Sheets-Sheet 17

INVENTOR.

Hendrik Cornelis Anthony van Duuren

BY Brown, Jackson, Boettcher & Dienner

Att'ys.

INVENTOR.
Hendrik Cornelis Anthony van Duuren
BY Brown, Jackson, Boettcher & Dienner
Att'ys.

MULTIPLEX WIRELESS TELEGRAPH SYSTEM

Filed March 2, 1953 29 Sheets-Sheet 19

INVENTOR.
Hendrik Cornelis Anthony van Duuren
BY [signature]
Attys.

Nov. 3, 1959 H. C. A. VAN DUUREN 2,911,473
MULTIPLEX WIRELESS TELEGRAPH SYSTEM
Filed March 2, 1953 29 Sheets-Sheet 20
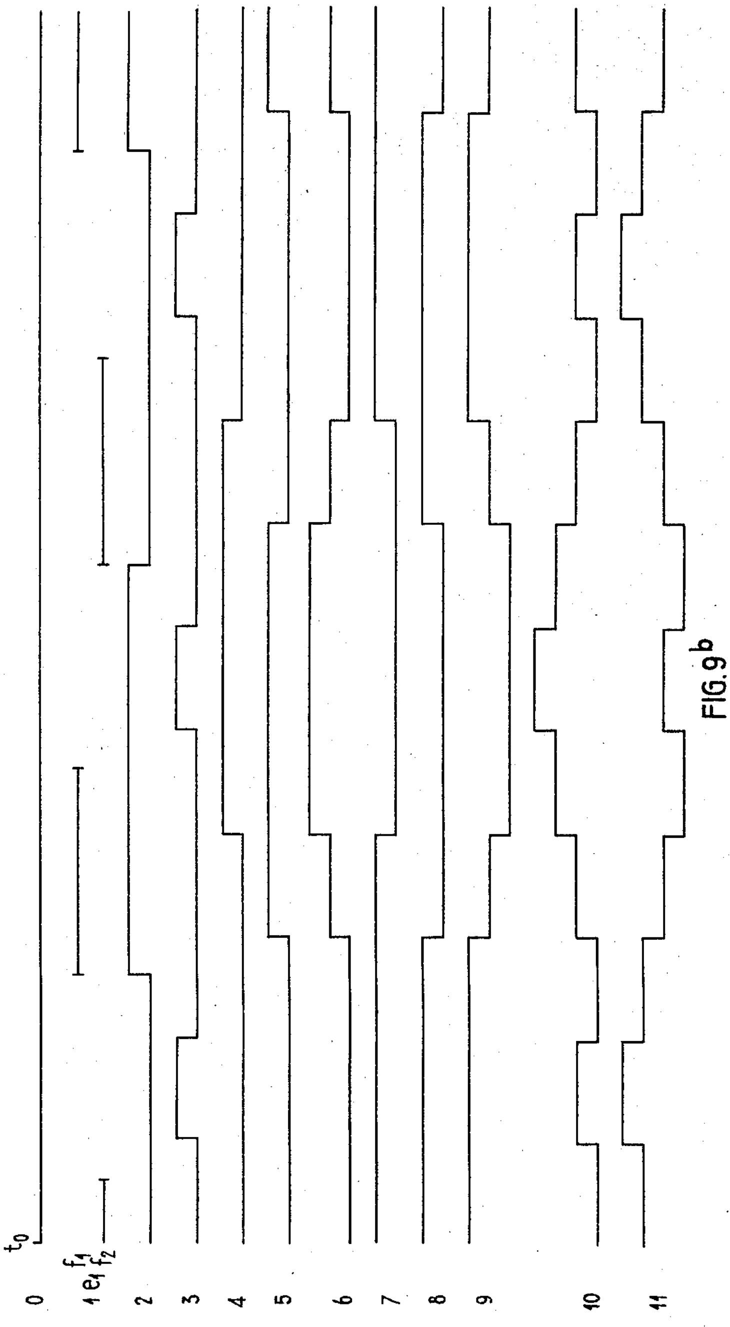
FIG. $9^b$
INVENTOR.
Hendrik Cornelis Anthony van Duuren
BY Brown, Jackson, Boettcher & Dienner
Attys.

INVENTOR.
Hendrik Cornelis Anthony van Duuren
BY Brown Jackson Boettcher & Dienner
Att'ys.

INVENTOR.
Hendrik Cornelis Anthony van Duuren
BY Simon Jackson Brittles & Dunner
Att'ys.

Nov. 3, 1959 H. C. A. VAN DUUREN 2,911,473

MULTIPLEX WIRELESS TELEGRAPH SYSTEM

Filed March 2, 1953 29 Sheets-Sheet 23

INVENTOR.

*Hendrik Cornelis Anthony van Duuren*

BY *Brown Jackson Boettcher & Dienner*

*Att'ys.*

INVENTOR.
Hendrik Cornelis Anthony van Duuren
BY Brown, Jackson, Boettcher & Dienner
Att'ys

MULTIPLEX WIRELESS TELEGRAPH SYSTEM

Filed March 2, 1953 29 Sheets-Sheet 25

INVENTOR.

*Hendrik Cornelis Anthony van Duuren*

BY *Brown, Jackson, Boettcher & Dienner*

*Attys.*

MULTIPLEX WIRELESS TELEGRAPH SYSTEM

Filed March 2, 1953 29 Sheets-Sheet 26

INVENTOR.

Hendrik Cornelis Anthony van Duuren
BY Brown Jackson Boettcher & Dienner
Att'ys

INVENTOR.

Hendrik Cornelis Anthony van Duuren

BY

Atty's.

INVENTOR.

Hendrik Cornelis Anthony van Duuren

BY Brown, Jackson, Boettcher & Dienner

Attys.

INVENTOR.
Hendrik Cornelis Anthony van Duuren
BY Brown, Jackson, Boettcher & Dienner
Att'ys.

United States Patent Office 2,911,473
Patented Nov. 3, 1959

2,911,473

MULTIPLEX WIRELESS TELEGRAPH SYSTEM

Hendrik Cornelis Anthony van Duuren, Wassenaar, Netherlands, assignor to Staatsbedrijf der Posterijen, Telegrafie en Telefonie, The Hague, Netherlands Application March 2, 1953, Serial No. 339,702
Claims priority, application Netherlands March 3, 1952
51 Claims. (Cl. 178—50)

Figure 1A:
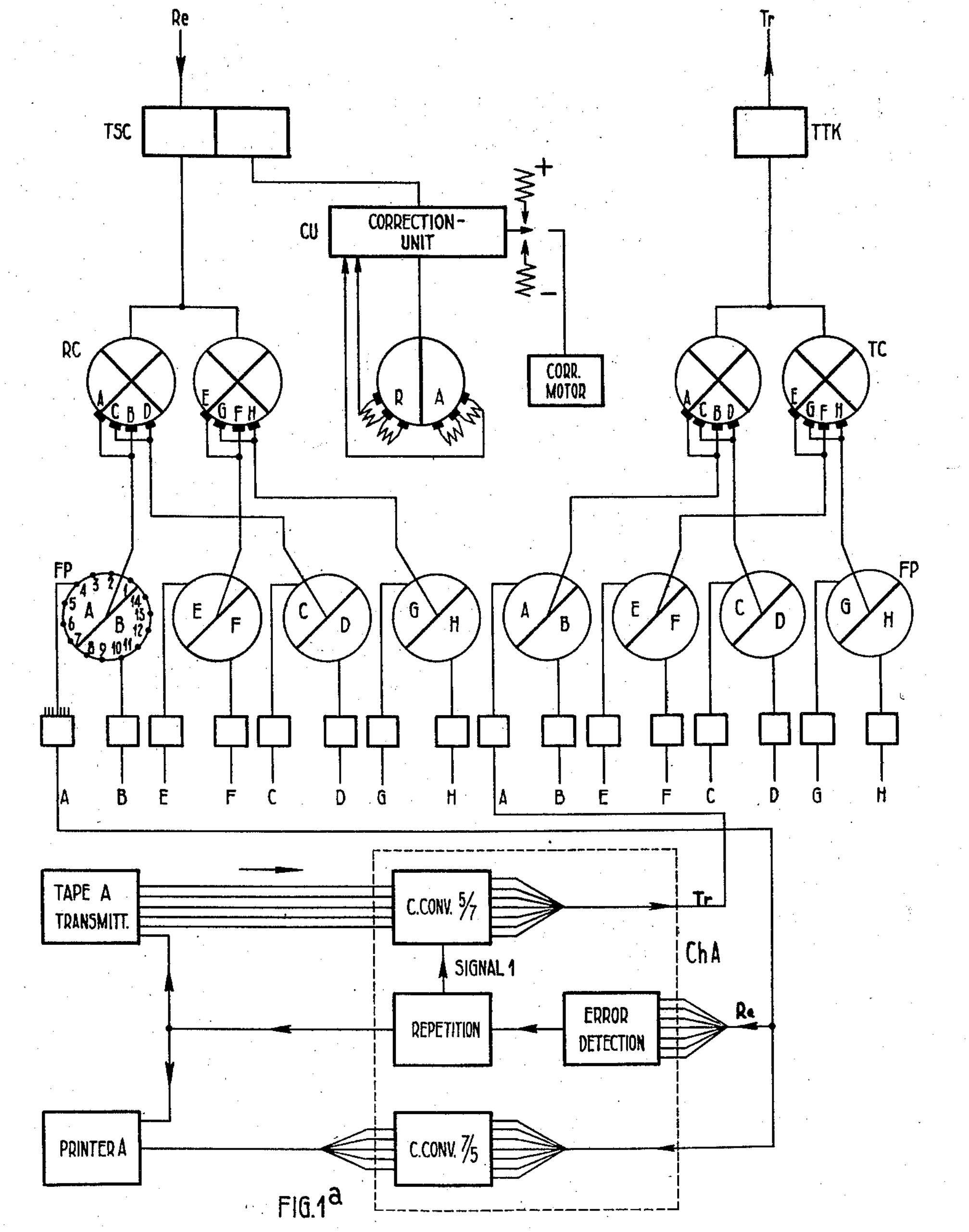
Figure 1B:
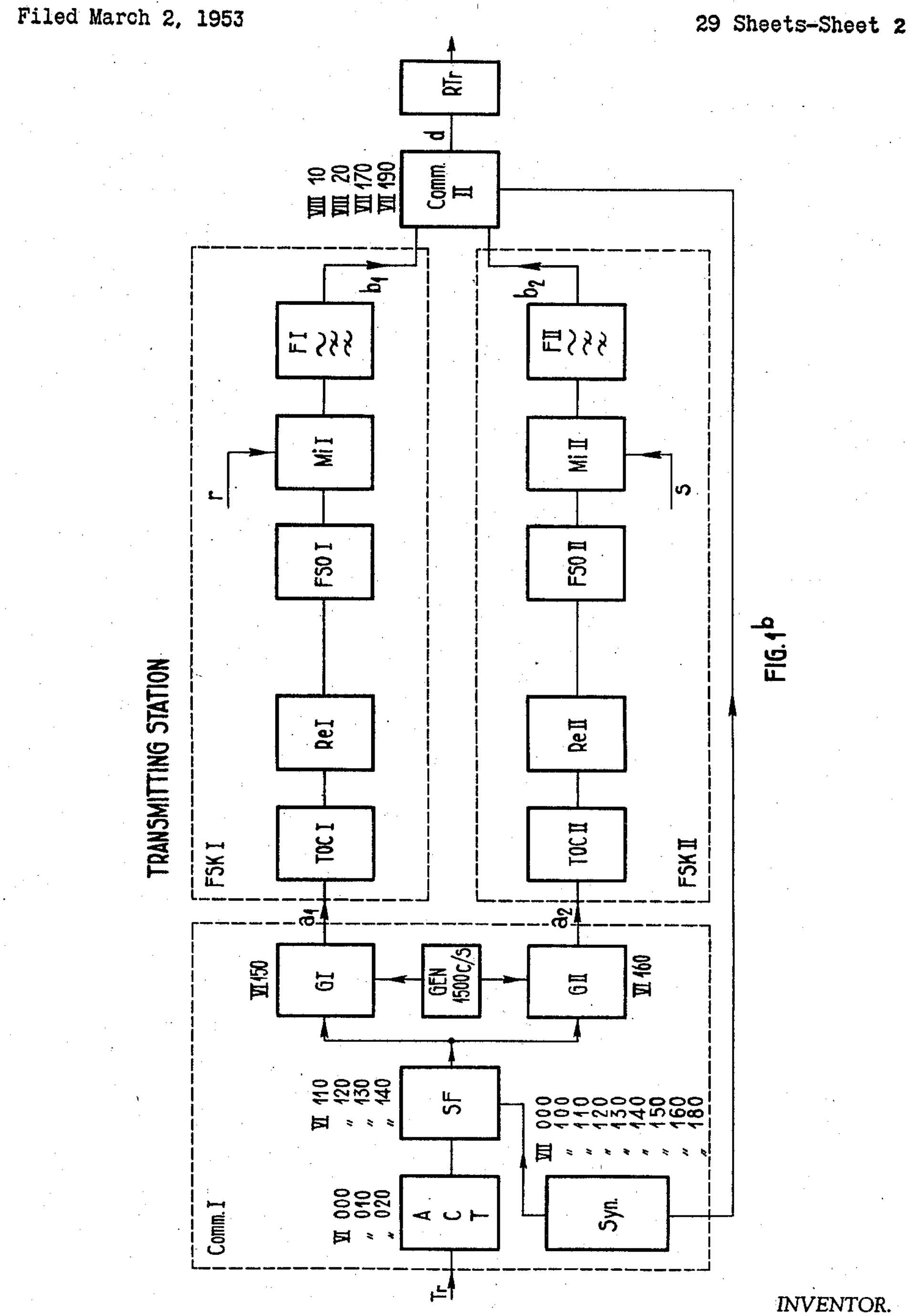
Figure 1C:
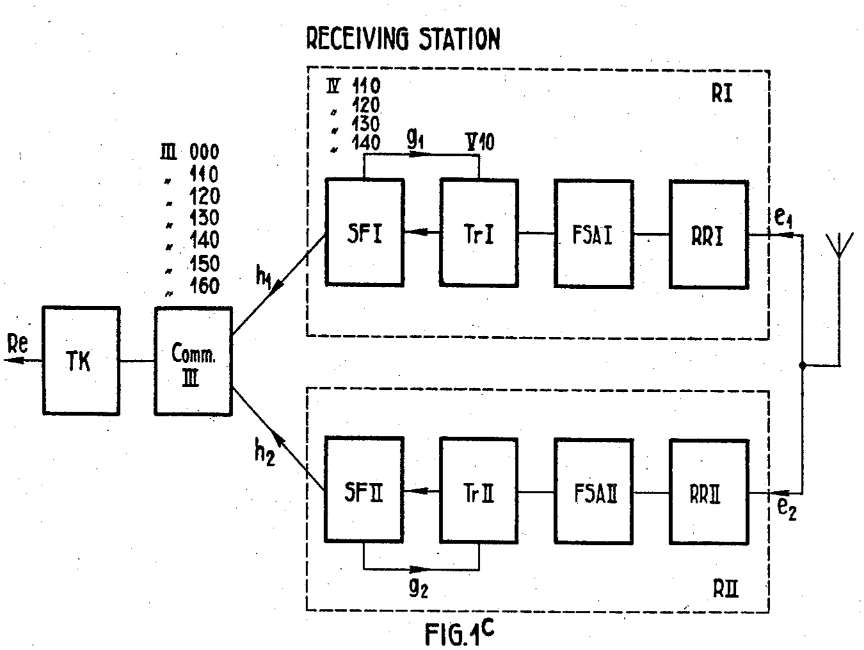
Figure 1D:
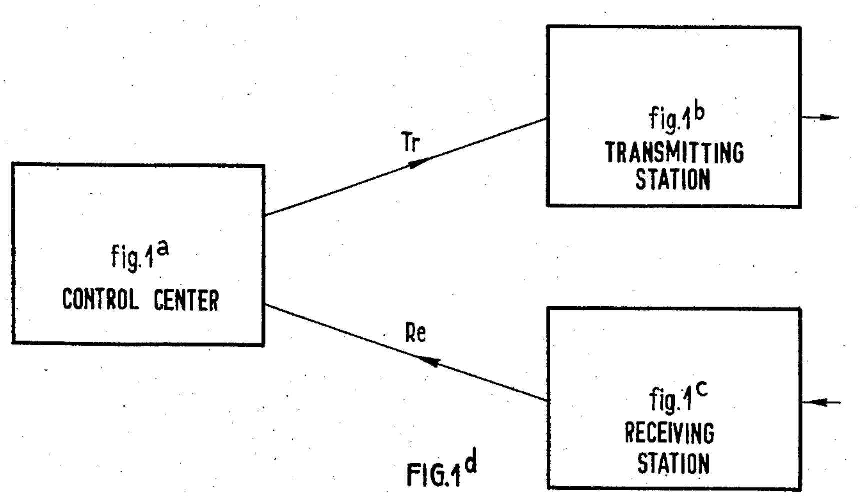
Figure 2A:
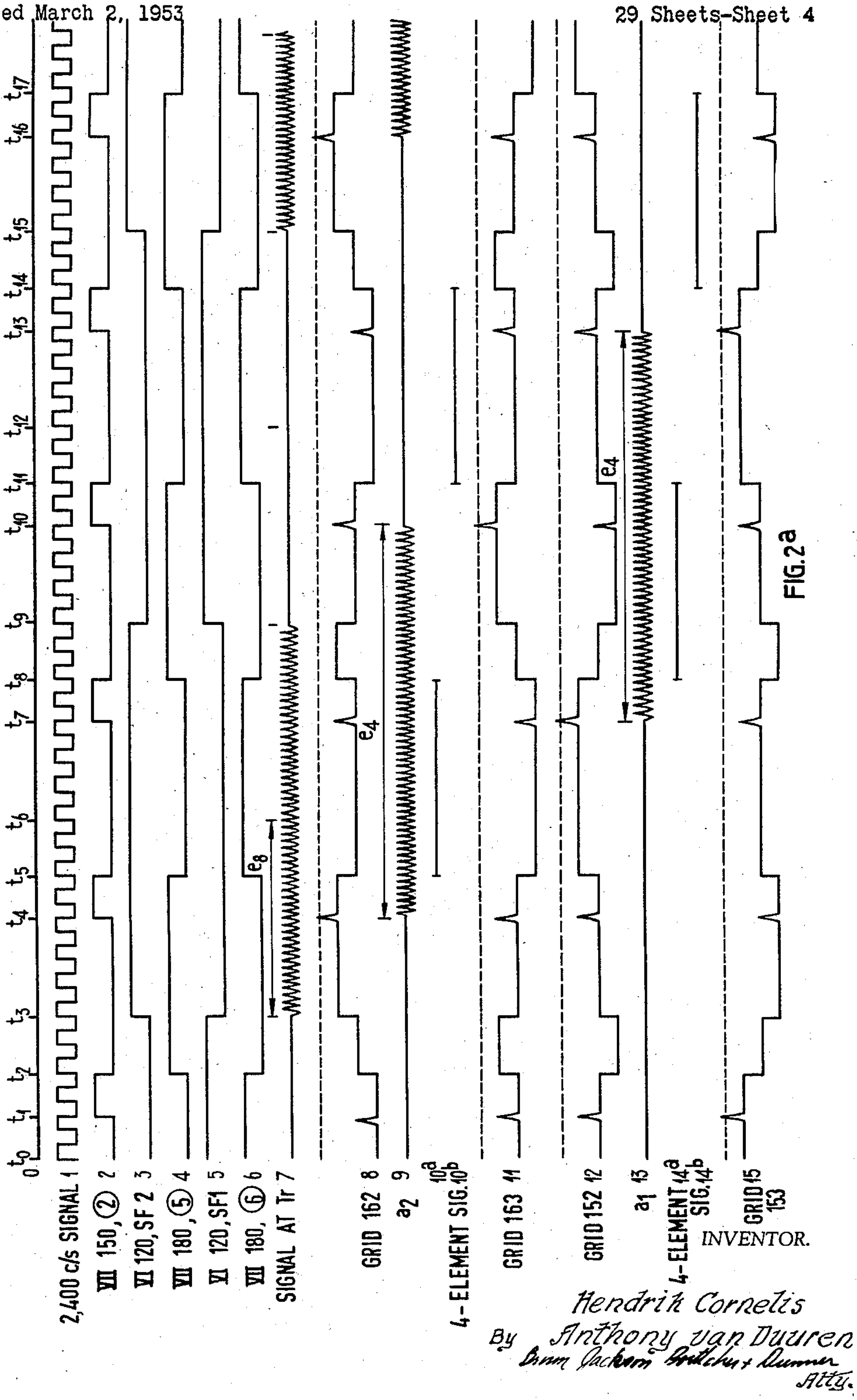
Figure 2B:
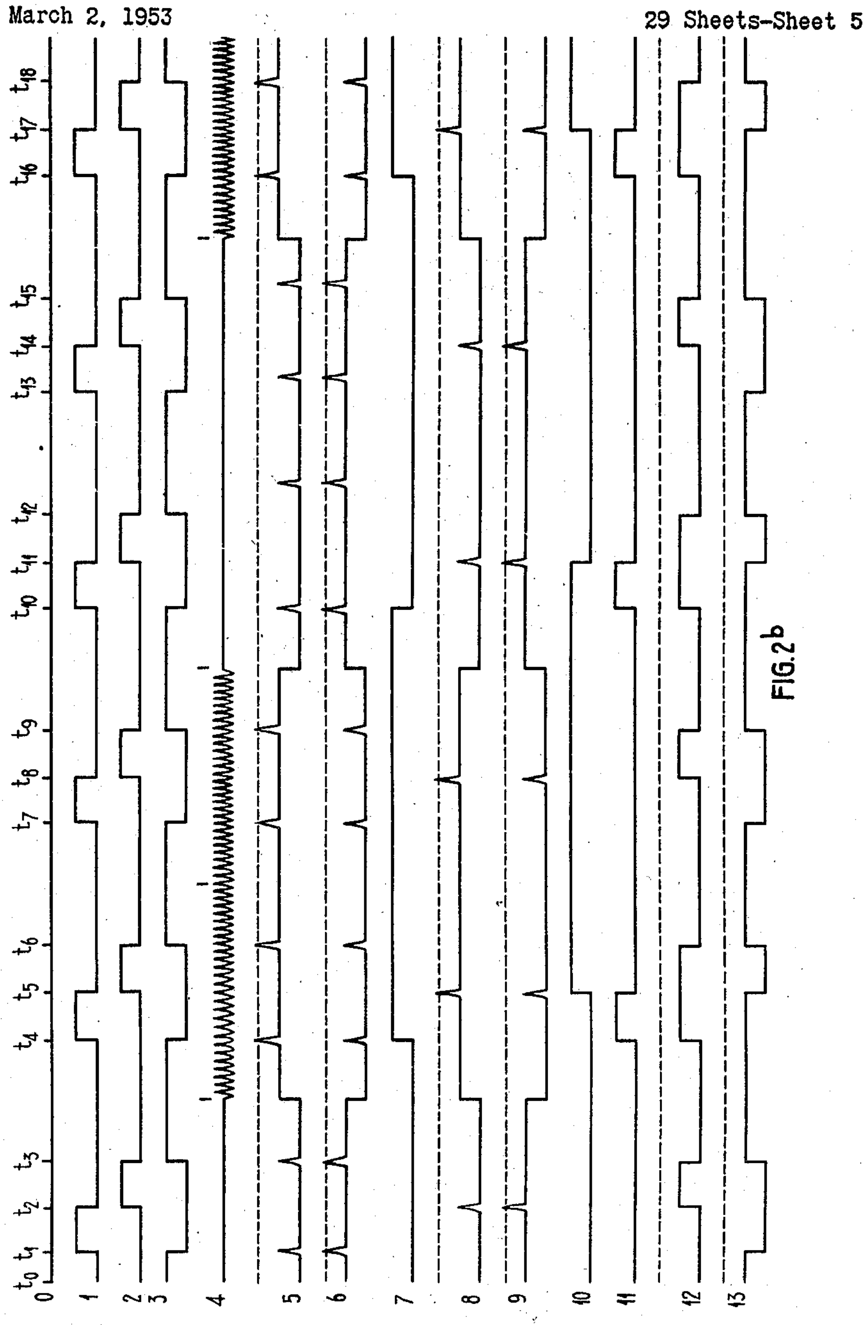
Figure 2C:
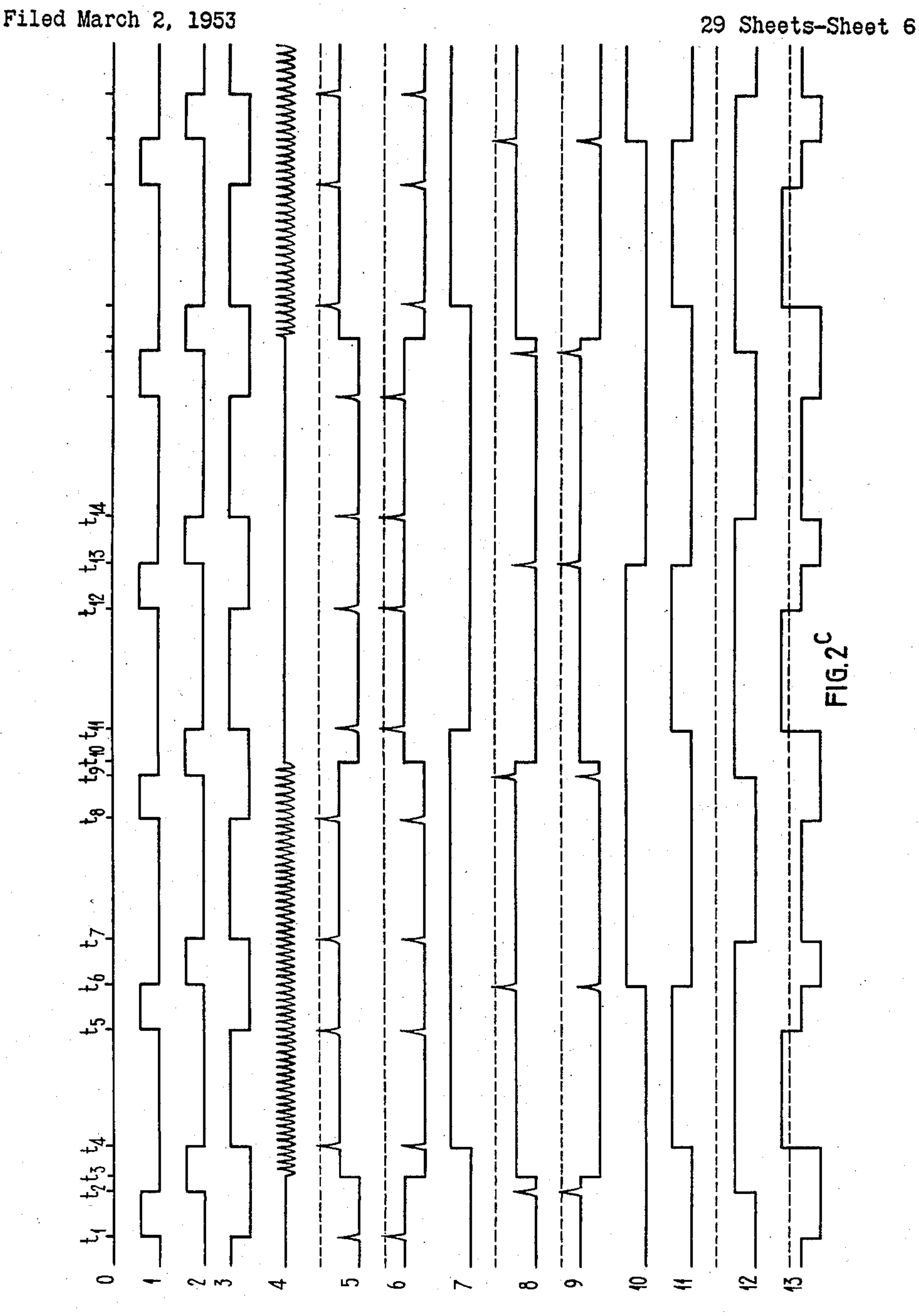
Figure 2D:
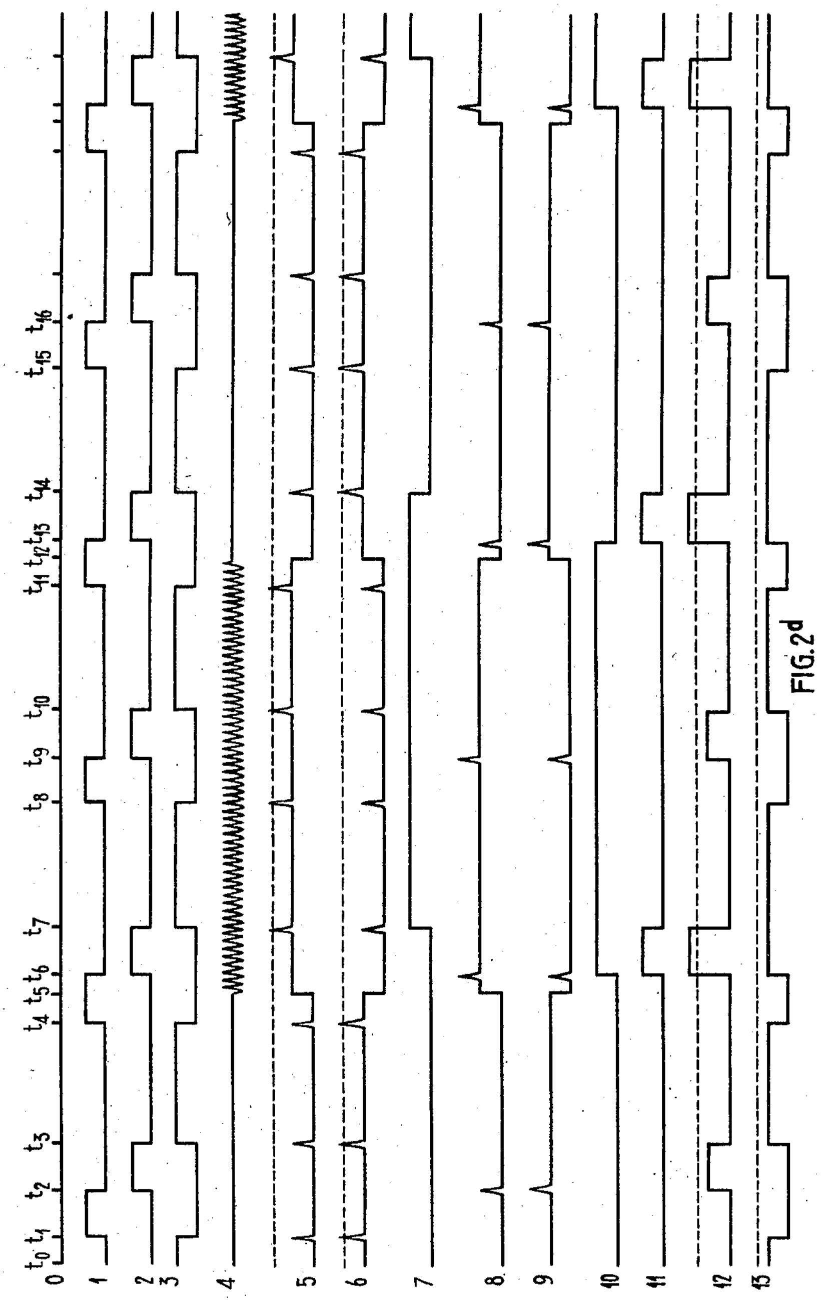
Figure 2F:
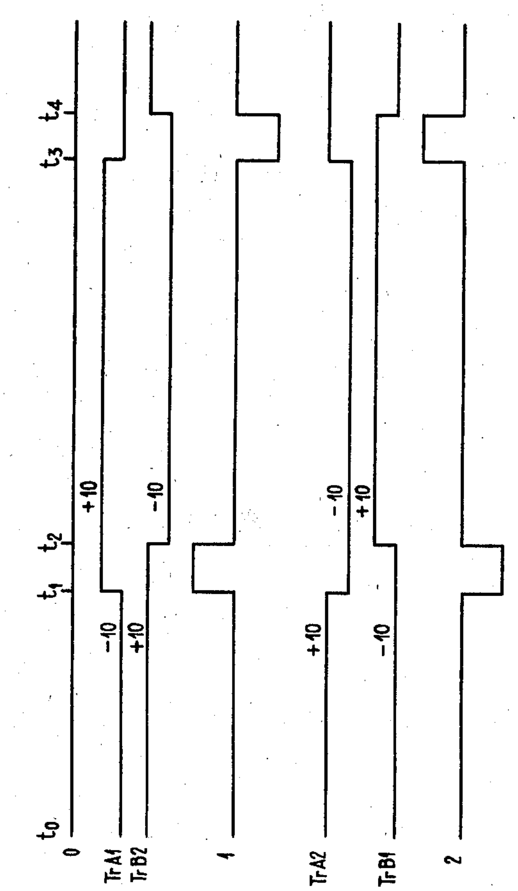
Figure 2E:
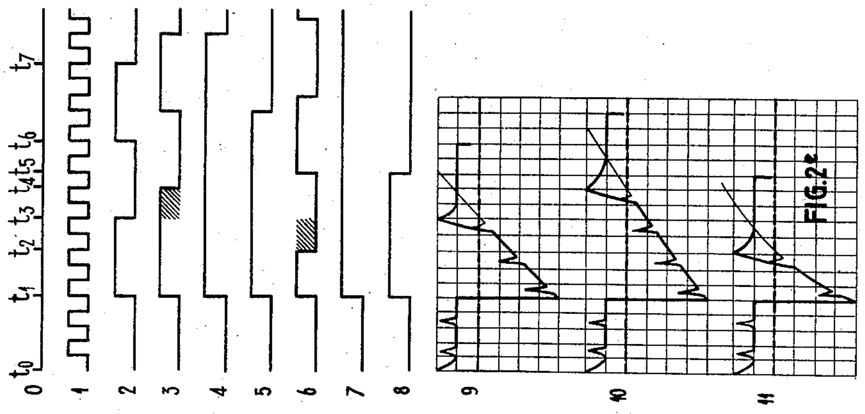
Figure 2G:
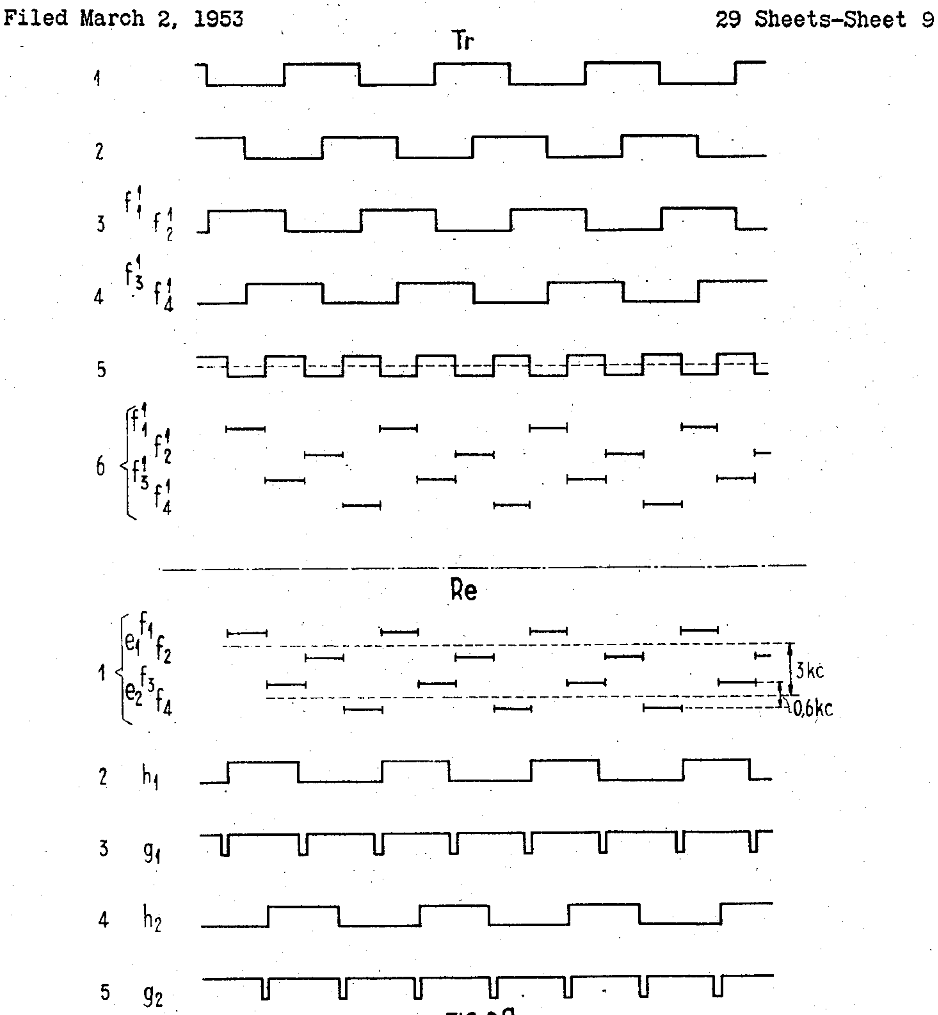

This invention relates to multiplex radio-telegraph systems, and more particularly to such a system in which a number of individual messages, originating from an equal number of single channels, are transmitted via one multiplex channel by utilizing a time division process.

The provision of expeditious and reliable message transmissions has for countless years been the life line of industrial, economic, and military fields. There has been, therefore, a constant search for improved facilities capable of providing more rapid message transmission in a more reliable manner. The advent of the telegraph and telephone facilities constituted an important step forward in the field. However, until recent years it was, and still is, common practice in many installations to use one path for each message transmission. For example, in many telegraph and telephone systems which are used to extend connections between subscribers located in two cities distant from each other, a single path is used for each message transmission. Thus, the number of subscribers in the two separate cities which may communicate with each other at the same time is limited to the number of paths which extend between the cities. Inasmuch as such systems are subject to so-called "peak loads," that is, the heavy usage during certain hours of the day and prolonged idle periods during other portions of each twenty-four hour period, it is apparent that it is not economically feasible to extend an unlimited number of lines between cities. It soon became apparent, therefore, that some method of simultaneously transmitting a number of different messages over a single cable or path was necessary to the reduction of the cost of providing adequate service in a reliable manner between remote points.

In locations where the installation of a cable was extremely difficult and prohibitively expensive, the field soon turned to wireless transmissions as a method of reducing such costs. In such systems the transmitter unit in a first city transmitted messages to an associated receiver in a distant city, and a transmitter in the distant city returned messages to a receiver in the first city. Thus, a transmitter and a receiver were required at each station for each communication path established between the cities, and the problem of cost for a path was again encountered by the field.

One solution to the problem of providing a large number of communication paths with a minimum amount of equipment was provided with the development of the so-called multiplex system. The multiplex system is a system capable of simultaneously transmitting a number of different messages, in many instances, over a single channel. In a typical installation for two cities A and B located at a substantial distance from each other, a number of different messages are concurrently transmitted from transmitting sources located at city A, to corresponding receiving equipment located at city B. Likewise, a number of messages may be simultaneously transmitted from transmitters at city B to receivers at city A.

The several transmitting stations at station A are connected to a selection device, which forms a so-called multiplex signal by first selecting a letter from the message of the first transmitter, then a letter from the message of the second transmitter, etc., until a letter has been selected from each transmitter of the group. In this manner a multiplex signal is formed, which contains letters of each of the original messages in alternate sequence. At the multiplex receiving station in city B, a sorting device is connected to the channel to sort the incoming signal, the sorting device being operative to route the first incoming letter to the first receiver station, the second incoming letter to the second receiver station, etc. In this manner, the original messages are concurrently transmitted from transmitters in city A to associated receivers in city B. The manner of transmission in the reverse direction is obvious from the foregoing description.

It is apparent from the foregoing description that the shorter the duration of the individual elements of each signal, the greater the number of messages which can be transmitted in a given time period. However, it is apparent that the signals cannot be shortened beyond a certain point without making it impossible to reconstruct the signal as received at the remote end of the multiplex channel. That is, because the signal duration in the multiplex channel is shortened as much as practical, it is apparent if one of the signal elements is inadvertently extended in duration, the receiver station of the multiplex system may not be able to recognize a succeeding signal element. As is well known to parties skilled in the art, there are various sources of disturbance which may elongate a signal element to the extent that the succeeding element is not recognizable. For example, if a multiplex system is connected to operate over a radio path, ordinary static might prolong one signal element to twice its original length, thereby preventing recognition of the succeeding signal element. The reliability of message transmission is an essential requirement of a communication system and it is apparent that appropriate safeguards which minimize this problem must be provided in a system which will be acceptable for use in the field of message transmission, and it is an object of the present invention to provide equipment which includes such safeguards.

The problems caused by such undesired prolongation of a signal can be substantially reduced in accordance with the inventive teaching, by transmitting the successive multiplex signal elements on alternate frequencies. If a series of signal elements is transmitted as a multiplex signal, the first signal element on a first frequency, the second element on a second frequency, the third element on the first frequency, the fourth element on the second frequency, and so forth, such a system obviates a substantial portion of the difficulties inherent in prior art systems.

For example, in the last-mentioned illustration, suppose the second element (transmitted on the second frequency) was doubled in length during transmission over the multiplex path. Ordinarily this would prevent recognition of the third element, for the projected second element now extends through the time assigned for the transmission (and later recognition) of the third element. But if the third element has been transmitted on the first frequency (instead of the same frequency as the second element), then this third element can still be recognized by a receiver tuned to the first frequency which also excludes signals of the second frequency.

In a specific illustration of the invention the eight channel signal is first broken down into two four-element signals, and the signals of each four-element group are doubled in length to help insure accurate frequency transposition. After the successive elements have been encoded in different frequencies, the eight-element signal can then be reformed directly from the two four-element signals, and the signal elements reduced to their original length. The resultant eight-element signal, containing elements which alternate at different frequencies, arrives at the receiver station, where the incoming signal elements are routed into two receivers in an alternating manner, and each receiver is constructed to admit only signal elements at a certain frequency. This alternate acceptance of signal elements by two receivers prevents disturbance of the recognition apparatus in one receiver, even if a received element is twice its assigned length, for the succeeding element is routed to the other receiver where it is unaffected by the disturbance of the preceding element, and may be easily recognized.

By way of illustrative example, experience has shown that if a prolongation is less than or equal to 50% of the assigned duration period, the succeeding element can still be scanned and regenerated. Thus, if a single channel is carrying intelligence at the rate of 42 6/7 Bauds (one Baud is one element per second), the duration of a single element equals $$\frac{1.000 \text{ second}}{42\ 6/7 \text{ Bauds}}$$

or 70/3 milliseconds (hereinafter abbreviated ms.). If eight such single channels are connected to one multiplex channel, the duration of a single element in the multiplex channel equals $70/3 \times 1/8$ or 35/12 ms. Using the maximum prolongation criterion of 50%, it is seen that even if a single element is prolonged to 52.5/12 ms., the succeeding element can still be scanned and regenerated. It is known, however, that static or random noise can prolong an element as much as 2 ms. beyond its assigned duration. If this occurs where each element is originally 35/12 ms., an element is prolonged to 59/12 ms., and the succeeding element cannot then be scanned and regenerated. It is apparent, therefore, that eight single channels, each having a speed of 42 6/7 Bauds, cannot successfully be operated through a single multiplex channel, if conventional time division is utilized. But if only four single channels are used, then the duration of a single element in the multiplex channel equals $70/3 \times 1/4$ or 35/6 ms. If a 2 ms. prolongation occurs now, the result is a 47/6 ms. duration, which is less than the permissible extension (52.5/6 ms.). From the foregoing, it is evident that, if single channels having a speed of 42 6/7 Bauds are considered, four such channels can be used in conjunction with a single multiplex channel without encountering the aforementioned difficulties.

It is an object of the invention to provide a multiplex channel structure for use with a greater number of single channels than was possible with prior art teachings and structures.

It is another object of the invention to provide a multiplex channel structure such that, although certain elements are prolonged by more than 50% of their assigned duration, the succeeding elements can nevertheless be scanned and regenerated.

In accordance with the broader concepts of the invention, a multiplex telegraph system comprises a source of "$n$" separate signal channels, and a distributor operative to scan the signals occurring in each of the "$n$" channels to provide a single composite signal therefrom. Means are provided for converting the composite signal into an outgoing signal having a plurality of different frequencies appearing therein; the composite signal is converted into its component parts, and the component parts are transmitted over $$\frac{n}{q}$$

different paths, $q$ being the number of channels which can be reliably scanned in the receiver equipment of a multiplex radio-telegraph system with the occurrence of maximum element prolongation in the multiplex channel. In the field, a maximum of four channels was provided heretofore with known equipment operating at a speed of 42 6/7 Bauds, and "$q$" equals four at this time. In a specific embodiment of applicant's invention, eight channels ($n=8$) were provided by using two different paths $$\left(\frac{8}{4}\right)$$

or sub-channels. Thus if twelve channels are desired ($n=12$) in a system using known receiver station equipment operating at the accepted transmission speed ($q=4$), a total of three sub-channels will be required $$\left(\frac{n}{q}=\frac{12}{4}=3\right)$$

Frequency-shift keyer means (or on-off keyer means can be employed) are provided in each different path to supply frequency signals representative of the signals which are transmitted thereover. Also included are means for combining the frequency signal outputs of the $$\frac{n}{q}$$

different paths into a single signal for transmission purposes, which signal is comprised of a series of signals derived in a successive manner from each of the different paths. Analogous structure is present at the receiver station to separate the single transmission signal into the original "$n$" separate signals.

The features of the present invention which are believed to be novel are set forth with particularity in the appended claims. The invention, together with further objects and advantages thereof, may best be understood by reference to the following description taken in connection with the accompanying drawings, in the several figures of which like reference characters identify like elements, and in which:

Figure $1^a$ is a block diagram, partly in schematic form, showing the connection of equipment located in a multiplex system control center;

Figures $1^b$ and $1^c$ are block diagrams illustrating the connections of the transmitting and receiving stations, respectively, according to the inventive teaching;

Figure $1^d$ is a block diagram illustrating the interconnection of the equipment shown in Figures $1^a$, $1^b$, and $1^c$;

Figures $2^a$–$2^f$ are graphical illustrations of voltage waveforms with respect to time, useful in understanding the operation of the invention;

Figure $2^g$ is a diagram of signals in the transmitter (T$r$) and in the receiver (R$e$) with respect to time, useful in understanding the operation of the invention;

Figure $2^h$ is a sequence diagram illustrating the derivation of a single multiplex channel signal from eight separate, simultaneous signals;

Figures 3–8 are schematic diagrams, which more fully illustrate the structure and operation of equipment shown elsewhere in block diagram form; and Figures $9^a$–11 are graphical illustrations of voltage waveforms with respect to time, useful in understanding the operation of the invention.

GENERAL ARRANGEMENT

The disposition and interconnection of the major portions of the inventive apparatus is shown in Figure $1^d$. The equipment of the multiplex control center of station A is generally shown by the block labelled "fig. $1^a$," which is connected over path T$r$ to block "fig. $1^b$," which represents the transmitter equipment at station A. The receiver equipment at station A is signified by the block "fig. $1^c$," and is connected to the control center block "fig. $1^a$" over path R$e$. The arrows to the right of blocks "fig. $1^b$" and "fig. $1^c$" indicate the paths of wireless transmission and reception between station A and corresponding equipment at station B, which corresponding equipment is not illustrated, because it is largely a duplication of the apparatus at station A. The various portions of the apparatus at station A will now be generally described.

*Control center*

Figure 1ª shows equipment located in a control center at station A; it will be understood that a corresponding station B includes similar equipment, which station B is not shown in the drawings. At station A a tape transmitter, designated Tape A Transmitt, translates intelligence from a tape into signals in the five-unit code and couples those signals to a 5/7 code converter designated C. Conv. 5/7. The code converter translates the incoming five-element signal to a seven-element signal, which is coupled to one channel (designated *Ch*A) of the channels A—H represented in the right hand portion of Figure 1ª. It will be understood that similar equipment is connected to each of the other channels B—H.

Distributor equipment (shown in the upper part of Figure 1ª) samples the signals appearing in the channels and provides a multiplex signal comprised of a signal of each of the eight channels. Briefly, channels A and B are connected to a first distributor or face plate (FP); channels E and F are connected to a second face plate, etc. The eight channels A–H are connected to the input terminals of four face plates, the output terminals of which are coupled to the input terminals of a pair of commutators TC. The output terminals of commutators TC are coupled through a converter TTK to the transmitter along a lead designated T*r*. The equipment just described is conventional equipment employed to derive a single multiplex signal from eight separate signals appearing simultaneously in eight separate channels; and since the structure and operation of such equipment is well known and understood in the art, no further explanation is given hereat.

The receiver equipment for accepting a single multiplex signal and converting the signal into its eight constituent parts is shown in the upper left portion of Figure 1ª, where the received signal is coupled over conductor R*e* to an input circuit labeled TSC. The conversion of an incoming voice-frequency signal to direct-current signals by such circuit, the subsequent utilization of commutators RC and face plates FP to convert the eight-element signal into its component parts and to apply each of the signals to its assigned channel; the operation of the 7/5 conversion apparatus in each channel to decode the resultant signal, and the manner of operation of the printer circuit by same are well known and understood in the art and need no further explanation herein.

*Transmitting equipment (general)*

The transmitting station apparatus, in accordance with the inventive teaching, is schematically illustrated in Figure 1ᵇ of the drawings. The incoming multiplex signal, as received from the multiplex center (Fig. 1ª) over conductor T*r*, is a 1,500 cycle/second on-off signal. The apparatus contained in block Comm. I of Figure 1ᵇ includes a trigger circuit designated ACT which rectifies the signal received over conductor T*r* and at its output side supplies the resultant signal to a succeeding trigger circuit, designated SF, which is a signal follower circuit. Signal follower SF in its turn controls two gate-trigger-balance repeater combinations GI and GII. The two four-channel signals may be termed sub-channel signals, and are represented as $a_1$ and $a_2$ in Figure 1ᵇ. Of the eight elements present in the eight-channel signal, the first element is coupled through gate GI to a first frequency-shift keyer FSK I, the second element is coupled through gate GII to a second frequency-shift keyer FSK II, the third element is coupled to FSK I, etc. Before leaving gates GI and GII, the signals are again converted (through the cooperation of generator GEN 1500 Hz) into voice-frequency signals. Moreover, the length of each signal element, which in the eight-element signal was 35/12 ms., is increased after the division to 35/6 ms. Therefore, voice-frequency signals comprising signal elements of 35/6 ms. duration reach frequency-shift keyers FSK I and FSK II.

In frequency-shift keyer FSK I, the incoming voice-frequency signal is again converted into a direct-current signal in rectifier TOC I. The resulting direct-current signal is effective to control a reactance tube R*e*I, which in its turn is effective to control the frequency of a frequency-shift oscillator FSO I. Frequency-shift oscillator FSO I is effective to produce two frequencies $p$ and $q$. Frequencies $p$ and $q$ are different each from the other, and which frequency is generated depends upon whether a mark or space signal is coupled to the channel FSK I. Another frequency $r$, several times higher than frequencies $p$ and $q$, is mixed with the signals at frequencies $p$ and $q$ in mixer tube M*i* I. The sum and difference frequencies of these several input frequencies appear at the output of mixer tube M*i* I, but only the sum frequencies are permitted to pass filters FI. Therefore the frequencies appearing at the output of filter FI, represented by $b_1$, are $r+p$ and $r+q$. These two frequencies are coupled to the upper input terminal of a commutator represented by Comm. II in Figure 1ᵇ.

A similar action occurs with respect to the four-channel signal which is applied to frequency-shift keyer FSK II, except that a frequency $s$ is coupled to mixer tube M*i* II, and the output frequencies which pass filter F II are $s+p$ and $s+q$. Frequency $s$ differs from frequency $r$, and from frequencies $p$ and $q$. Therefore frequencies $s+p$ and $s+q$ are coupled to the lower input terminal of commutator Comm. II in Figure 1ᵇ. The incoming elements to commutator Comm. II in Figure 1ᵇ are scanned, and reduced in length from 35/6 to 35/12 ms. The incoming elements are then alternately allowed to pass along conductor $d$ to a modulation stage, RT*r*, for transmission as a multiplex signal. Comm. II passes first an element from $b_1$, then from $b_2$, then from $b_1$, etc. The eight-channel multiplex signal thus sent to the transmitter comprises frequencies varying as the number of sub-channels in the system. It is observed that four frequencies, two in each sub-channel, are employed in accordance with the inventive teaching, to transmit an eight-channel multiplex signal. This is required if frequency-shift keying is employed. Otherwise, with on-off keying, only two frequencies are required. It is also apparent from the inventive teaching that twelve single channels may be employed, and in such event three separate sub-channels will be required. It is likewise apparent that, using twelve single channels and three sub-channels, element prolongation of as much as 250% can be experienced without mutilating and destroying the intelligence which would normally be derived from the scanning of the succeeding element. Using three sub-channels, however, six frequencies are required with frequency-shift keying or three-frequencies with on-off keying.

The time duration of the signal in the different stages of the transmitter equipment, and the importance of such duration, are schematically illustrated in the upper portion of Figure 2ᵍ (T*r*). As shown on line 1, the signal after arrival and rectification at point $a_1$ in frequency-shift keyer FSK I (Figure 1ᵇ) is of a given duration (twice its length as it appeared at T*r*). Line 2 in the upper portion of Figure 2ᵍ shows the signals after arrival and rectification at point $a_2$ in frequency-shift keyer FSK II. Line 3 shows the signals leaving the frequency-shift keyer FSK I at $b_1$. Frequencies $r+p$ and $r+q$ are represented, on line 3, as $f_1^1$ and $f_2^1$. Line 4 illustrates frequencies $s+p$ and $s+q$, represented numerically by designators $f_3^1$ and $f_4^1$, coupled from frequency-shift keyer FSK II at point $b_2$. Line 5 shows the waveform of the synchronizing voltage coupled to Comm. II in Fig. 1ᵇ. After the multiplex signal is reformed in the commutator Comm. II in Figure 1ᵇ, the resulting signal at point $d$ is represented on line 6 of the upper portion of Figure 2ᵍ (the signal elements being once more reduced to their original length). Line 6 indicates particularly, the long intervals between successive signals of the same frequency.

In the foregoing description a transmitting station at station A has been described; it will be understood a corresponding station B exists, which includes a transmitting apparatus similar to that at station A, and likewise a receiver apparatus similar to the installation at station A. The second station B is not shown in the drawings, to conserve space; moreover the stations are duplicates, each of the other, and therefore the operation of the second will be understood with description of the structure and operation of the first.

*Receiving equipment (general)*

The receiver portion of station A which is coupled to the input R*e* of the distributor of Figure 1[a], is shown in Figure 1[c] of the drawings. The signals transmitted from station B are received at the antenna of the receiver installation shown in Figure 1[c], and coupled to two separate receivers, RRI and RRII. Each receiver is disposed in a separate receiving channel, receiver RRI being located in channel RI, and receiver RRII being located in channel RII. The incoming signal is a multiplex signal comprising sub-channels of different frequencies, as explained in conjunction with the transmitting apparatus. The separate incoming signals of different frequencies $f_1$–$f_4$ are represented schematically in line 1 of the lower portion (R*e*) of Figure 2[g]. The two receivers include frequency-selective networks such as high-pass and low-pass filters, so that only certain frequencies are admitted to each receiver. For example, frequencies $f_1$ and $f_2$ illustrated in line 1 of the lower portion of Figure 2[g], may be accepted by receiver RRI, and frequencies 3 and 4 may be passed to the input circuits of receiver RRII. The two frequencies $f_1$ and $f_2$, after being passed by receiver RRI, are converted in frequency-shift adaptor FSA I to a direct-current signal. The output of frequency-shift adaptor FSA I is coupled to the input of a trigger, or bistable multivibrator such as T*r*I, the output of which is coupled to a signal-follower stage SFI. The output of signal follower SFI is a direct-current signal as indicated in line 2 of the lower portion of Figure 2[g]. Similar operations occur in channel RII, and result in the coupling of a direct-current signal represented schematically on line 4 of the lower portion (R*e*) of Figure 2[g]. Both of these direct-current signals, represented by $h_1$ and $h_2$, are coupled to the input terminals of a commutator Comm. III. In this commutator the two direct-current signals are modified into a resulting eight-channel signal. The resultant eight-channel signal is then coupled, as a voice-frequency signal, through a tone keyer TK, thence along the conductor represented as R*e*, to the control center illustrated in Figure 1[a] of the drawings.

It will be observed that, in accordance with the inventive teaching, and as particularly illustrated in line 1 of the lower portion of Figure 2[g], that between two successive elements of a sub-channel arriving at one receiver, there is always a space of the duration of a normal marking or spacing element. This means that even if a single element is prolonged as much as 150%, the succeeding element may be scanned and regenerated without difficulty. This is made possible by the transmission of successive elements on different frequencies, or alternate sub-channels. Hence, the number of single channels which may successfully and practically be employed with a single multiplex channel is substantially increased (doubled in the illustrated embodiment).

*Structural and operational details*

The operation of the equipment in the transmitter for converting a conventional eight-element multiplex signal into a novel staggered-frequency signal for transmission purposes, will now be described in detail. Reference is made first to the transmitting apparatus shown generally in block form in Fig. 1[b], which apparatus is cross-referenced with Roman numerals to other figures, in which the circuitry is detailed in schematic form. For example, Roman numerals VI 000–VI 160 and VII 000–VII 190, in Fig. 1[b], refer to various portions of the schematic diagrams in Figures 6, 6′, 7 and 7′. The operation of the circuits shown schematically in Figures 6–7′ will now be described.

*Transmitter scanning*

It will be remembered that a conventional eight-channel multiplex signal was formed from the channels A–H in Fig. 1[a], and coupled along path T*r* to the input side of Comm. I in Fig. 1[b]. The same input circuit is shown in detail in Fig. 6, wherein the input signal from path T*r* is illustrated as coupled to input terminals 7 and 8 of an input transformer. The signal is then amplified in amplifier stage VI 000 and rectified by network VI 010, the output of the rectifier network being coupled to a trigger, or bistable multivibrator, VI 020. This multivibrator circuit aids in restoring the rectangular waveform of the original signal, and the output of the multivibrator circuit is coupled through an input transformer 121 to signal follower VI 120, which is a conventional multivibrator arrangement.

The output of signal follower VI 120 is coupled from points SF1 and SF2 to the corresponding points in the grid circuits of tubes 152, 153, 162, and 163 (Fig. 6′); these tubes represent a portion of the gating circuit illustrated generally as GI and GII in Figure 1[b]. Division of the incoming eight-channel multiplex signal into two four-element sub-channel signals is effected by the two gating circuits (represented generally by VI 150 and VI 160), the elements comprising signal $a_1$ (Fig. 1[b]) of the multiplex signal being coupled over the output terminals 11 and 12 of transformer 155 of gate I, and the elements comprising signal $a_2$ being coupled over output terminals 9 and 10 of transformer 165 of gate II. The succeeding elements of the multiplex signal are likewise alternately coupled over the two output transformers 155 and 165.

Gates I and II are controlled to cycle by a 1500 cycle/second signal which is coupled from generator VI 170 to the grid circuit of output stages 154 and 164, so that the output signals coupled to the two sub-channels are 1500 cycle/sound signals.

*General operation of gates GI and GII*

Figure 6:
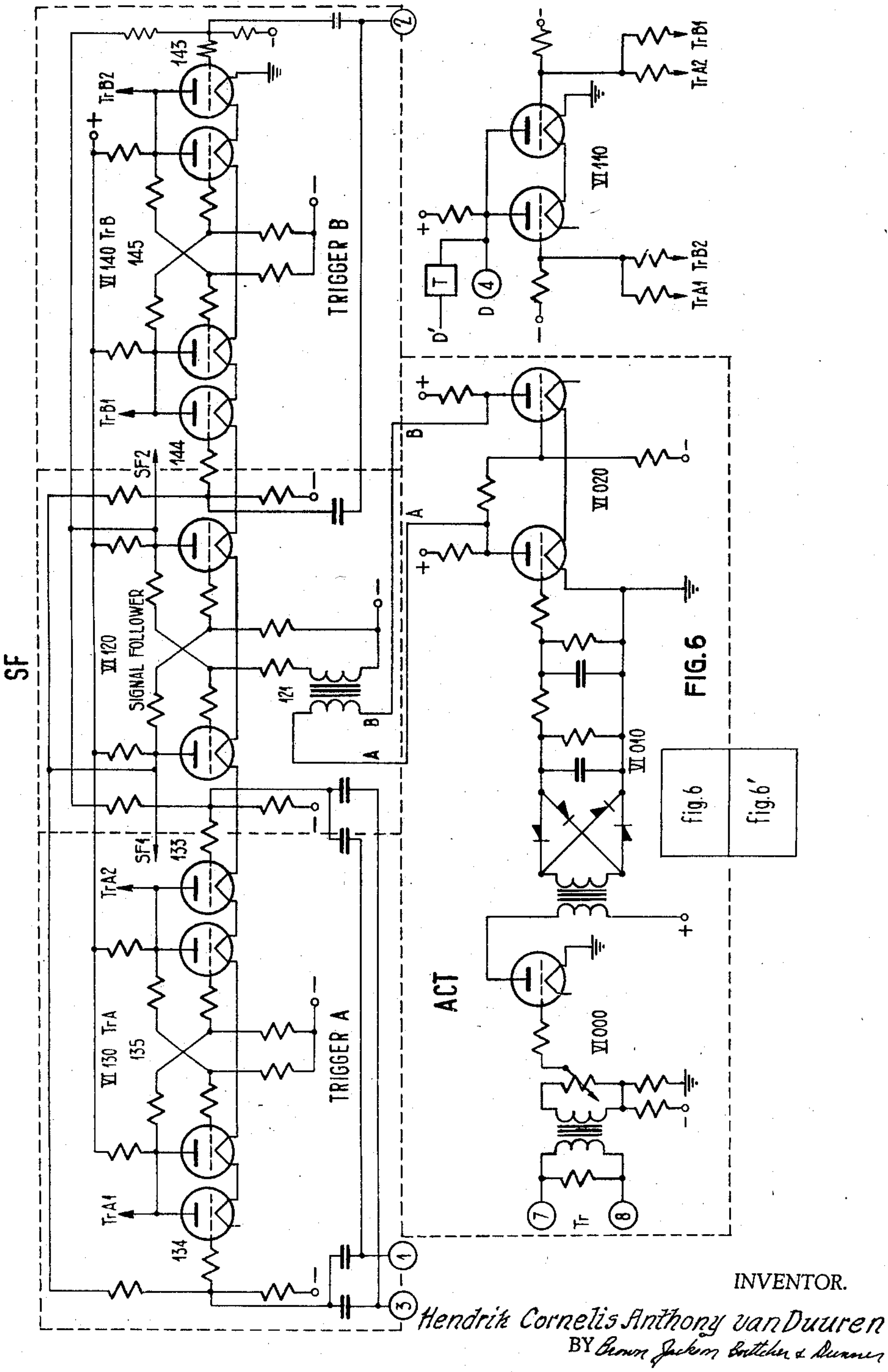
Figure 6:
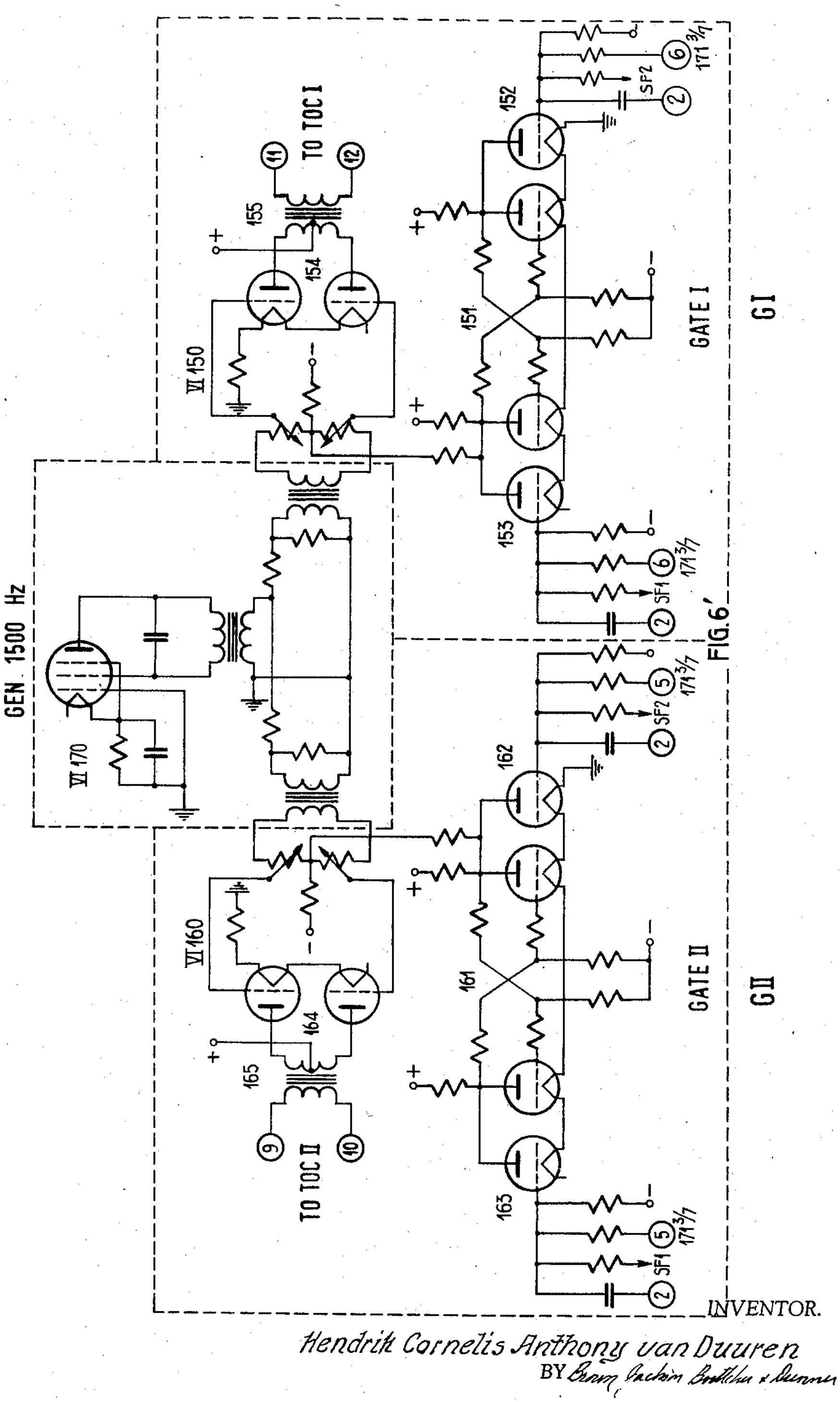

The relative conduction and non-conduction of gates GI and GII is dependent upon the conduction of tubes 152, 153, 162 and 163. As shown in Fig. 6′, a fixed negative grid bias voltage is coupled to the control grids of each of the last-mentioned tubes, and each of these control grids is also coupled to three other and different potential points. During the period that there is no incoming signal to triggers 151 and 161, the biassed circuits therefor are so arranged and connected that the left hand pair of tubes of each set are conductive; that is, tubes 163 and 153 are conducting, and that no output signal is then passed by either transformer 155 or 165.

Although several of the reference numerals (163, for example) refer to a pair of tubes, nevertheless the tubes will be described in the singular as the cathodes and anodes of the tubes are connected and the pair of tubes cooperate in a single function. This practice is followed in the specification and drawings to reduce the number of designations and simplify the description of the invention.

Figure 7:
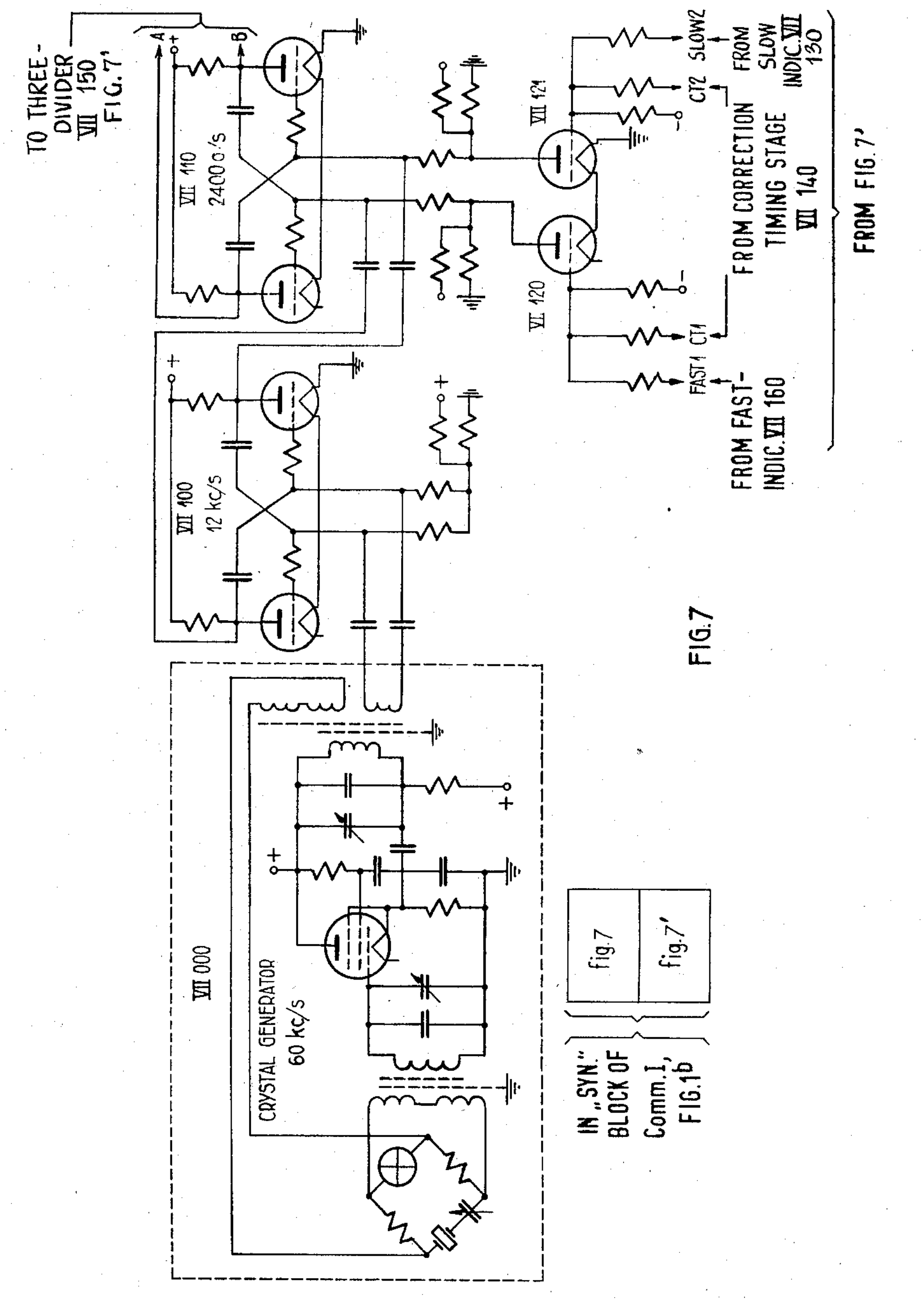
Figure 7:
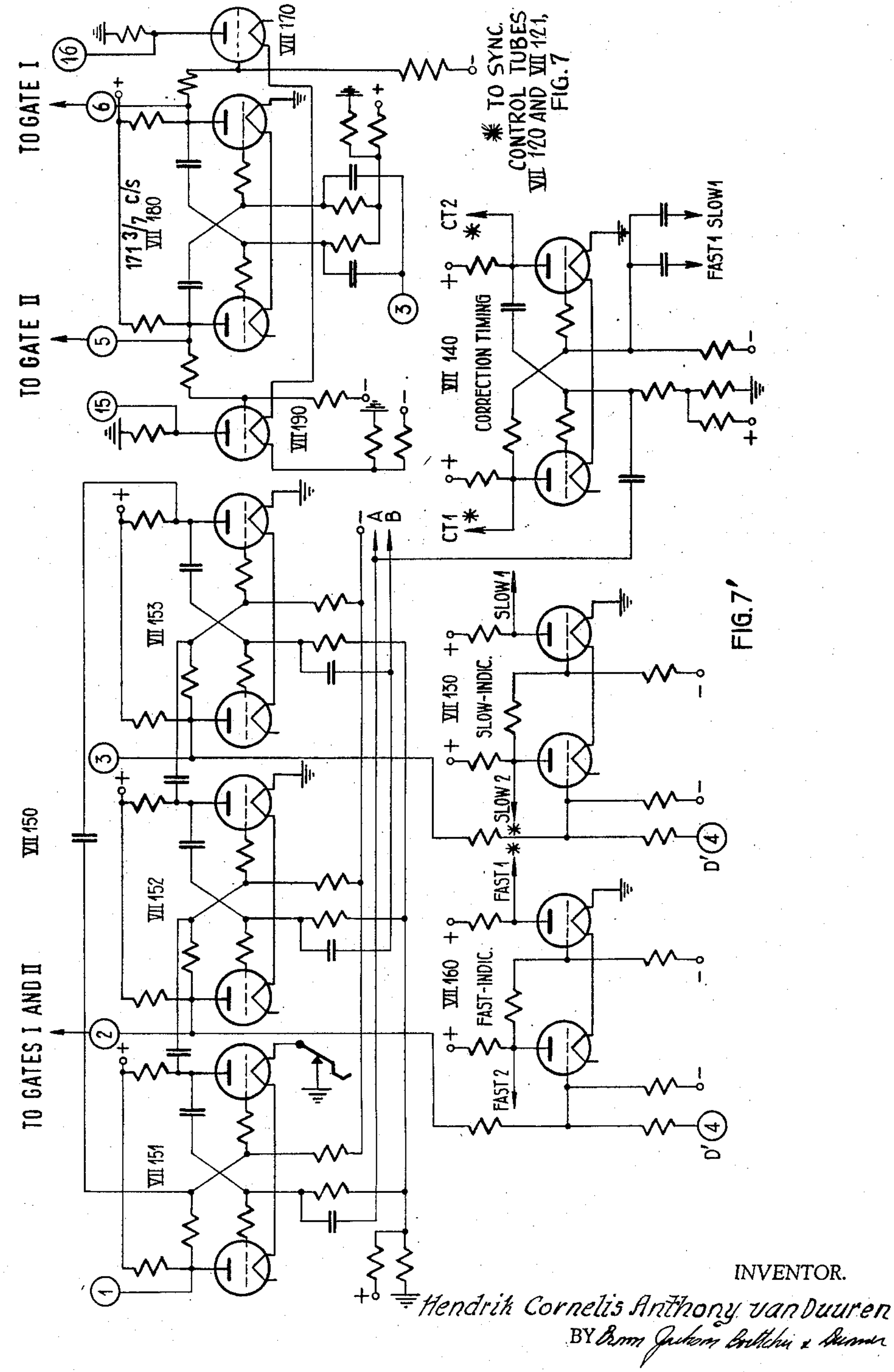

In addition to the fixed bias voltage applied to the control grid of each one of the tubes in triggers 151 and 161, three additional potentials are applied to each individual control grid. These various potentials are coupled from:

(1) A three-divider, so-called because it gives three different pulse figures in the three anode circuits, illustrated in Figure 7′ and designated VII 150. The different anode pulses may be coupled from points 1, 2, or 3 (shown encircled in the figure), of the three flip-flop or monostable multivibrators. The anode circuit of the central tube, VII, 152, is shown connected to reference numeral two, which reference numeral is also illustrated in Figure 6′ and is connected to the control grid (through a capacitor) of each of tubes 152, 153, 162 and 163. Because of the capacitor utilized in the coupling, the potentials applied from the anode circuits of tube VII 152 appear on the control grids as short voltage pulses; only positive pulses are applied through the condenser to affect the grid circuit. As will be shown more fully hereinafter, these pulses are of themselves ineffective to alter the conductive state of either triggers 151 or 161.

The three-divider is synchronized by means of a crystal generator, operating at a frequency of 60 kc. This generator is illustrated in Figure 7, and designated by reference numeral VII 000. The output of crystal generator VII 000 is then passed through two stages VII 100 and VII 110, each of which divides the frequency by five. Thus the original frequency of 60 kc. is reduced to 12 kc. and then to 2,400 cycles/second. Points A and B of stage VII 110 are shown connected to corresponding points A and B in Figure 7′.

The 2,400 cycle/second pulses from stage VII 110 are shown on line 1 of Figure $2^a$, and the pulses coupled from the anode circuit designated 2 of stage VII 152 in Figure 7′ are illustrated on line 2 of Figure $2^a$.

(2) The second source of potential applied to triggers 151 and 161 is derived from the *a*-stable multivibrator VII 180, shown in Figure 7′. This multivibrator has a frequency of 171$\frac{3}{7}$ cycles/second, and is synchronized with the anode of the right hand tube of multivibrator VII 152 in the three-divider VII 150. The synchronizing connection is indicated by the reference numeral 3 encircled, shown in the last-mentioned plate circuit and also below the *a*-stable multivibrator VII 180. The anode of the left tube in multivibrator VII 180, represented by reference numeral 5, is connected to the corresponding point 5 in the control grid circuits of both tubes 162 and 163. The anode of the right hand tube, designated by a reference numeral 6 encircled, is connected to the corresponding point 6 in the control grid circuits of grids 152 and 153. The output voltage of multivibrator VII 180, as coupled from point 5 to the control grids of tubes 162 and 163, is illustrated on line 4 of Figure $2^a$. This potential by itself, however, is not sufficient to alter the conductive state of trigger 161, nor is the potential applied from point 6 of multivibrator VII 180 to trigger 151 sufficient to alter the conductivity of those tubes.

(3) The third source of potential supplied to the control grids of triggers 151 and 161 is the signal follower VI 120, the operation of which has already been described in connection with the equipment illustrated in Figure 6. The output from the left tube of the signal follower, designated SF1, is coupled to the control grid circuits of tubes 153 and 163; the output from the anode of the right hand tube, designated SF2, is coupled to the control grids of tubes 152 and 162. The voltage coupled from the signal follower circuit, and more particularly the voltage waveform from the right hand tube coupled to point SF2, is illustrated on line 3 of Figure $2^a$. It is apparent that the potentials supplied from signal follower VI 120 are dependent upon the incoming signal, and so determine at what time the conductivity of triggers 151 and 161 can be altered. The potentials described under the foregoing paragraphs (1) and (2) occur at fixed times and are utilized to condition triggers 151 and 161 for alteration of their respective conductive states by incoming pulses from signal follower VI 120 (Figure 6). The particular waveforms and specific timing of the three potentials just described determines the periodical division of a single eight-element signal into two parts, for transmission in two sub-channels, in such a manner that the first element is coupled through output transformer 155, the succeeding element through transformer 165, the next element through 155, etc.

*Signal and synchronizing voltages in Comm. I*

The operation and correlation of the equipment illustrated in Comm. I of Figure $1^b$ is best understood by reference to Figure $2^a$, in which various voltage waveforms are illustrated. On line 0, or the time abcissa, separate moments of time are indicated by the letter $t$ with appropriate subscripts.

In Figure $2^a$, line 1 indicates the voltage waveform of the pulses coupled from the 2,400 cycle/second multivibrator VII 110, illustrated in Figure 7. Line 2 indicates the waveform of the voltage coupled from terminal 2 of the left hand tube of multivibrator VII 152 (Figure 7′), which is coupled to the control grids of each of the tubes in triggers 151 and 161 (Figure 6′). Line 3 of Figure $2^a$ is an illustration of the voltage coupled from point SF2 of signal follower VI 120 (Figure 6). Line 4 illustrates the voltage waveform appearing at the anode of the left hand tube of multivibrator VII 180, of Figure 7′, which is coupled through terminal 5 to the control grid circuits of tubes 162 and 163 (Figure 6′). Line 5 of Figure $2^a$ illustrates the voltage waveform appearing at point SF1 of signal follower VI 120 in Figure 6; it is apparent that the voltage illustrated on line 5 is the inverse or mirror image of that shown on line 3, the output from point SF2 of the signal follower. Line 6 of Figure $2^a$ illustrates the voltage waveform appearing at terminal 6, or the anode of the right hand tube, of multivibrator VII 180, and is thus coupled from point 6 to the control grids of tubes 152 and 153 (Figure 6′). It is apparent that the voltage waveform illustrated in line 6 is the inverse of that shown on line 4, which is the output of the other tube of multivibrator VII 180. Line 7 of Figure $2^a$ illustrates the eight-element multiplex signal coupled to Comm. I of the transmitter equipment illustrated in Figure $1^b$. The signal is composed of alternate marking and spacing elements; the interval $e_8$ illustrates the duration of a single marking element which is followed by another marking element, then two spacing elements, then another marking element, etc.

Line 8 of Figure $2^a$ illustrates the sum of the voltages applied to the control grid of tube 162 of Figure 6′; from the foregoing explanation, it is apparent that the voltages summed on line 8 are those shown on lines 2, 3 and 4 of Figure $2^a$. The capacitor between terminal 2 and the control grid of tube 162 couples only a sharp pulse, such as that shown under $t_1$ on line 8, when a positive pulse such as the first pulse on line 2 is coupled to the capacitor; the trailing edge or negative going portion of the pulses on line 2 have practically no effect upon the control grid circuit of tube 162.

On line 9 of Figure $2^a$ has been shown the outgoing signal represented by $a_2$ in Figure $1^b$, which is coupled from the commutator 1 of the transmitter apparatus to the second of the two frequency-shift keyers. It is apparent, therefore, that the waveform shown on line 9 is indicative of one portion of the eight-element signal. The signal on line 9 represents one-half of the eight channel signal, and the time intervals during which the portions of this four-channel signal are scanned are shown on lines 10*a* and 10*b* of Figure $2^a$. After this scansion, the eight-channel signal is again constructed from the two four-channel signals.

On line 11 of Figure $2^a$ is shown the voltage waveform representative of the summation of the potentials appearing on the control grid of tube 163 (Figure 6′), and the dashed line above the voltage waveform represents the cut-off voltage of tube 163. It is evident that the potential on the control grid of tube 163 is a summation of the potentials shown on lines 2, 4, and 5 of Figure $2^a$. line 12 illustrates the voltage waveform of the potential applied to the control grid of tube 162

(Figure 6'), and the dashed line over the waveform indicates the cut-off voltage of tube 152. It is apparent that the voltage appearing on the control grid of tube 152 is a summation of the potentials illustrated on lines 2, 3 and 6. On line 13 of Figure 2[a] is plotted the signal appearing at the output of Comm. I (Figure 1[b]) coupled along conductor $a_1$ to the first frequency-shift keyer. It is apparent that the interval $e_4$ (also illustrated on line 9), representative of the duration of a single marking element, is twice the length of the duration of a marking element in the original eight-element signal ($e_8$in line 7). On lines 14[a] and 14[b] of Figure 2[a] are plotted the time durations during which the other four-element signal is scanned, prior to the reformation of the eight-element signal. The voltage waveform on line 15 of Figure 2[a] is the composite potential applied to the control grid of tube 153 (Figure 6'), and the dashed line above the waveform is representative of the cut-off voltage of that tube. It is evident that the composite potential applied through the control grid of tube 153 is a summation of the separate potentials illustrated on lines 2, 5, and 6 of Figure 2[a].

*Gating circuit operation*

Referring again to the waveform illustrated on line 8 of Figure 2[a], it has been explained that this waveform is a composite of the several voltages appearing in different portions of the circuits and illustrated on lines 2, 3, and 4. The dashed line above the waveform illustrates the cut-off voltage of tube 162 (Figure 6'), which voltage must be exceeded to alter the conductivity of trigger 161. As shown in Figure 6', the control grid of tube 162, in addition to the bias potential, has three other potentials applied to its control grid:

(1) The voltage waveform appearing at terminal 2 in the anode circuit of the left hand tube of multivibrator VII 152 (Figure 7'), is coupled to the point designated by encircled reference numeral 2, thence through a capacitor to the control grid of tube 162 (Figure 6'). This potential is represented by the waveform illustrated on line 2 of Figure 2[a], but when applied through the capacitor, the positive-going portions of the pulses form sharp peaks for application to the control grid, as shown in lines 8, 11, 12, and 15, while the negative-going portion of the square-wave pulses have little or no effect upon the control grid circuit.

(2) A second potential is coupled from the anode circuit of the right hand tube of multivibrator VI 120 (Figure 6), from the point designated SF2 to the corresponding point in the control grid circuit of tube 162 (Figure 6'), thence to the control grid of tube 162. This potential is represented on line 3 of Figure 2[a].

(3) The third, and last, potential applied to the control grid of tube 162 is coupled from the left hand tube of the 171³⁄₇ cycle/second multivibrator VII 180 (Figure 7') to terminal 5 and thence to the control grid of tube 162. This potential is represented on line 4 of Figure 2[a]. As has been pointed out specifically before, the potentials applied from multivibrators VII 152 and VII 180 are regular pulses, each insufficient to cause tube 162 to fire. The third potential, applied from signal follower VI 120, is dependent upon incoming intelligence, and therefore determines the alteration of the conductive state of trigger 161.

Considering now the composite waveform illustrated on line 8 of Figure 2[a], at time $t_0$, the voltage level is as indicated in the drawing. At a time $t_1$ the positive voltage pulse shown on line 2 occurs (this pulse is coupled from multivibrator VII 152), causing the sharp pulse to appear under $t_1$ in line 8. At time $t_2$ two separate voltage changes occur. The first is the downward excursion of the square-wave pulse in the line 2; this has negligible effect on the waveform in line 8. But in addition the positive pulse illustrated on line 4 occurs (coupled from point 5 of multivibrator VII 180), and therefore the grid voltage curve illustrated on line 8 is moved upwardly. At time $t_3$ a marking element of the eight-channel signal occurs, as illustrated on line 7; accordingly, the signal follower VI 120 is re-routed, as shown on line 3, and therefore the potential in the grid circuit of tube 162 again increases, as shown in line 8. Although the control grid potential of tube 162 has been raised substantially, it is nevertheless (at time $t_3$) still below the cut-off voltage of the tube.

At time $t_4$ another positive voltage pulse is coupled from multivibrator VII 152 as shown on line 2, which causes the positive pulse in the grid circuit of tube 162 shown on line 8. The potential applied to the control grid of tube 162 is then higher than the cut-off voltage of the tube. Accordingly, trigger 161 is re-routed (that is, the relative conductivity of tubes 162 and 163 is reversed), the tube 164 in the gating stage G II becomes conductive, and a signal is coupled via transformer 165 to circuit $a_2$, as shown on line 9 of Figure 2[a]. Trigger 161 remains in its present condition until a subsequent positive pulse drives the control grid of tube 163 beyond cut-off and again changes the condition of trigger 161. This does not occur until time $t_{10}$ as illustrated on line 11 of Figure 2[a]. It is evident that the conductivity of tubes 152, 153, and 163 can likewise be ascertained from the illustrative waveforms shown on lines 12, 15, and 11, respectively, of Figure 2[a].

It is evident from the alternate conduction of gates GI and GII in Figure 1[b] (stages VI 150 and VI 160 in Figure 6') that the original elements of the eight-channel multiplex signals have been doubled in length when coupled over paths $a_1$ and $a_2$ (Figure 1[b]). This is effected by the alternate action of triggers 151 and 161 which in turn control the signals coupled through output transformers 155 and 165 to the two frequency-shift keyers 1 and 2 (Figure 1[b]). If, for example, a multiplex channel is operating at a rate of 42⁶⁄₇ Bauds, the duration of a single element in such channel is equal to ⁷⁄₃₀₀ seconds or ⁷⁰⁄₃ ms. That is, one multiplex element is ⁷⁰⁄₃ ms. in length. A single element in the multiplex signal would therefore be ⁷⁰⁄₃×⅛ or ³⁵⁄₁₂ ms. in length. After passage through Comm. I of Figure 1[b], each of the elements in path $a_1$ and $a_2$ have been doubled, and therefore are ³⁵⁄₆ ms. in duration. Again, two successive marking elements are indicated in the eight-channel multiplex signal from time $t_3$ to $t_9$ in Figure 2[a] of the drawings. After scanning, the marking element represented from time $t_3$ to $t_6$ is reproduced (doubled in length) as the marking element on path $a_2$ (shown on line 9) which extends in length from time $t_4$ to time $t_{10}$. The successive marking element in the eight-element signal, shown on line 7 from time $t_6$ to $t_9$, is scanned and reproduced in the other channel along conductor $a_1$, and is shown on line 13 from times $t_7$ to $t_{13}$. After the first two marking elements on line 7, a spacing element is portrayed; this element is scanned and reproduced along output conductor $a_2$ (line 9), and is indicated from times $t_{10}$ to $t_{16}$. The next successive spacing element shown on line 7 is likewise scanned, and is reproduced along output circuit $a_1$, indicated on line 13 from time $t_{13}$ to a point beyond the termination of the drawing. Accordingly, it is evident that the alternate scansion and reproduction of the original eight-channel signal is effective to divide the eight-channel signal into two four-channel signals, in which the elements are twice the length of the element duration in the original signal.

It is evident that trigger 151, comprising tubes 152 and 153, operates in a manner similar to that of trigger 161. The composite voltage waveform of the control grid of tube 152 is illustrated on line 12 of Figure 2[a], and is constructed by a summation of the voltage waveforms illustrated on lines 2, 3, and 6 of that figure. It is evident that tube 152, at time $t_7$, re-routes the trigger 151, so that tube 154 is conductive and the 1,500 cycle-second signal path is through transformer 155 to the output circuit $a_1$, indicated on line 13 of Figure 2[a].

Trigger 151 remains in this condition until a subsequent voltage pulse drives the potential appearing on the control grid of tube 153 beyond cut-off, which occurs at time $t_{13}$, indicated in line 15 of the drawing. Again, it is evident that the duration of the four-channel element is twice that of an element appearing in the original eight-channel multiplex signal. The commutator (Comm. II in Figure 1[b]) is effective to sample the elements of each sub-channel and reconstruct an eight-channel signal, in which each element is of the same duration as the original eight-channel multiplex signal elements.

*Transmitter synchronization*

A special feature of the synchronization system of the invention is that over the entire route, from transmitter A to receiver B (not shown), transmitter B (not shown) back to receiver A, there are no separate signals utilized for the synchronization between transmitter and receiver. Instead, the synchronization takes place on the signal transmitted, and is effected in such a manner that each previous and subsequent component in the composite signal keeps pace with the intermediate component; should any element tend to lose its correct place in the sequence, it is made to recover its appointed position in the correctly-timed sequence of elements.

The equipment utilized for synchronization in the commutator I (Figure 1[b]) comprises the following apparatus:

(1) The 60 kc. generator VII 000 shown in Figure 7, with frequency dividers VII 100 and VII 110, which are effective to reduce the 60 kc. frequency to 2,400 cycles/second. All of the frequencies required for the synchronization of the equipment are derived from the output of the crystal-controlled generator and the subsequent frequency dividers. In the grid circuit of the 2,400 cycle/second generator VII 110 a pair of tube arrangements VII 120 and VII 121 are illustrated; the function of this pair will be explained hereinafter. Normally, if the synchronization of the equipment is correct, tube VII 120 is not conductive and tube VII 121 is conductive. In this event, the frequency divider VII 110 is synchronized on every fifth pulse coupled from frequency divider VII 100, and this condition is illustrated graphically on line 9 of Figure 2[e] of the drawings.

If the synchronization of the equipment becomes incorrect, for example, becomes slow, then tube VII 120 remains non-conductive while tube VII 121 becomes non-conductive also. This condition affects the grid circuit of tube VII 110 so that the divider VII 110 becomes synchronized on every fourth pulse of the 12 kc. frequency divider VII 100, as illustrated on line 11 of Figure 2[e] of the drawings. In this event the frequency of the 2,400 cycle/second divider VII 110 is slightly increased to effect a correction of the synchronization.

If, on the other hand, the synchronization becomes incorrect and too fast, then tube VII 120 becomes conductive and tube VII 121 becomes non-conductive. This action affects the grid circuit of divider of VII 110 so that the latter tube is synchronized on every sixth pulse of the 12 kc. divider VII 100, as illustrated on line 10 of Figure 2[e] of the drawings. Accordingly, the frequency of the 2,400 cycle/second divider is slightly increased, thereby correcting the synchronization of the equipment.

(2) The indications as to whether the synchronization is slow or fast are given by means of a slow-indicator VII 130 and a fast-indicator VII 160, illustrated in the lower left portion of Figure 7′ of the drawings.

(3) In addition to the fast-indicator and slow-indicator, a signal is also utilized from the correction timing stage VII 140, illustrated in the lower right portion of Figure 7′. The operation of this stage, and of the fast and slow indicators, will be explained more fully hereafter.

(4) The three-divider VII 150, described previously is also utilized in the synchronization. The operation of this stage, illustrated in Figure 7′ of the drawings, and each of the other stages mentioned which are used in the sychronization, are also influenced by other equipment.

(5) The trigger-combination VI 130 (hereinafter referred to as trigger A) and VI 140 (hereinafter referred to as trigger B), illustrated to the left and right of signal follower VI 120 in Figure 6, also are utilized in the synchronization circuits. Triggers A and B are re-routed responsive to the operation of signal follower VI 120 (including the changes effected by the change-overs from mark to space indications and vice versa) in cooperation with potentials coupled from the three-divider VII 150 illustrated in Figure 7′.

In addition to being influenced by signals coupled from signal follower VI 120, trigger A is also influenced by potentials supplied from multivibrators VII 151 and VII 153 (Figure 7′), which points are represented by reference numerals 1 and 3, respectively, encircled in Figures 6 and 7′. Potentials from the multivibrator VII 152 of the three-divider VII 150 in Figure 7′ are coupled from the point represented by encircled reference numeral two to the corresponding point in the grid circuit of trigger B.

(6) The triggers A and B cooperate to control the double triode VI 110, illustrated in the lower right portion of Figure 6. The controls grids of double triode VI 110 are negatively biassed so that normally neither section of the tube is conductive. As shown in Figure 6, the control grid of the left tube of double triode VI 110 is coupled both to the anode circuit of tube 134 of trigger A and to the anode circuit of tube 143 of trigger B. The control grid of the right hand tube of double triode VI 110 is coupled both to the anode circuit of tube 133 of trigger A, and also to the anode circuit of tube 144 of trigger B. Thus the potentials from triggers A and B are applied to the control grids of double triode VI 110, in addition to the fixed negative bias. The application of these potentials to the control grids of the double triode is illustrated in Figure 2[f] of the drawings.

It will be understood that the potentials designated in Figure 2[f] are illustrative only, and are used to explain the operation of the invention; the legends do not indicate actual values of the potentials in the various circuit. Line 0 of Figure 2[f] is the time abscissa, and indicates certain moments of time thereon. If both triggers A and B are in corresponding positions, as indicated in Figure 2[f] from time $t_0$ to time $t_1$, then the result of the potentials applied to both control grids of double triode VI 110 equals 0, and the tube remains non-conductive. However, when the triggers are not in the same position, as indicated in the time interval $t_1$ to $t_2$, and the intervals $t_3$ to $t_4$, the applied potentials combine to form either a positive or negative pulse as shown on lines 1 and 2 of Figure 2[f]. The summation of the pulses indicates that during time $t_1$ to $t_2$ the left hand triode of VI 110 is conductive, and during time $t_3$ to $t_4$ the right hand section of that triode is conductive. It appears therefore that the two sections of the double triode VI 110 alternate in conductivity during the intervals where there is no correspondence between the positions of triggers A and B. As either section of the double triode is conductive, a negative pulse is formed by the diminishing plate potential and this negative pulse is coupled to the point indicated by D4 in the anode circuit of VI 110. The block designated by T represents a triode, which is effective to invert the negative pulses and couple a positive pulse to point D′ whenever either section of double triode VI 110 is conductive. These positive pulses are coupled both to fast indicator VII 160 and slow indicator VII 130 (Figure 7′) at the point represented by D′4. The fast and slow indicators VII 160 and VII 130 have been so arranged and adjusted that normally the left tube of each is non-conductive and the right tube is conductive.

*Correction of fast synchronization*

Considering now the control grid circuit of the left hand tube of fast indicator VII 160, in addition to the fixed negative bias and the positive pulses coupled to point D'4 already mentioned, the potential from the anode of the left hand tube of VII 152 in three-divider VII–150 is also coupled to the same control grid. The pulses coupled from double triode VI 110 (Figure 6) and from multivibrator VII 152 (Figure 7') are determinative of when the fast indicator VII 160 will leave its normal position. The fast indicator VII 160 only leaves its normal position when the synchronization of the system is too fast; this operation will be explained more fully hereinafter.

Normally, the left hand triode of fast indicator VII 160 is non-conductive, while the right hand tube is conductive. However, when the synchronization becomes too fast, as a result of the pulses coupled to the control grid of the left hand tube of fast indicator VII 160 the left tube becomes conductive and the right tube becomes non-conductive, so that the potential in the anode circuit of the right hand tube rises; this point is indicated by the legend Fast 1. This rise in potential is coupled to two points:

(*a*) The potential rises in the control grid circuit of the tube VII 120, shown in the lower right portion of Figure 7.

(*b*) The potential also rises in the grid of the right hand tube of the correction timing stage VII 140, shown in Figure 7' of the drawings. Therefore, the right hand tube of the correction timing stage VII 140 becomes conductive, and the left hand tube becomes non-conductive. As the left tube of correction timing stage VII 140 is cut off, its anode potential rises, and therefore a rise in potential is coupled from point CT 1 in that circuit.

This potential rise is coupled to the corresponding point CT 1 in the control grid circuit of tube VII 120, and reinforces the original rise coupled to point Fast 1 in the same circuit. Together these two applied potentials are sufficient to cause tube VII 120 to conduct, effecting a drop in the potential in the anode circuit of that tube. This potential drop is coupled to the grid circuit of the left hand tube of frequency divider VII 110, and this action causes the frequency divider to be synchronized on the sixth pulse of the output of frequency divider VII 100, as explained hereinbefore and illustrated on line 10 of Figure $2^e$ of the drawings. This action is effective to decrease the frequency of the output voltage of the 2,400 cycle/second frequency divider VII 110, thus effecting corrective action for the fast synchronization.

The change in conductivity of the two portions of monostable multivibrator VII 140, the correction timing stage, occurs, being dependent upon the discharge time of the condenser connected between the grid circuit of the left hand stage and the anode circuit of the right hand stage of the correction timing of the multivibrator. The correction timing multivibrator VII 140 is synchronized by pulses from 2,400 cycle/second frequency divider VII 110, the pulses being coupled from the point indicated by A in Figure 7 to the corresponding point in Figure 7', thence to the control grid circuit of the left hand stage and the anode circuit of the right hand stage of correction timing stage VII 140. The correction timing stage VII 140 is transferred to its original position, in which the left hand tube again becomes conductive and the right hand tube becomes non-conductive; accordingly the anode potentials of the left hand tube begins to decrease, and this decreased potential is coupled to the point designated CT 1 to the control grid circuit of tube VII 120 in Figure 7. Therefore tube VII 120 is returned to its original position in which it is non-conductive, and the 2,400 cycle/second frequency divider VII 110 is again synchronized on the fifth pulse of the 12 kc. frequency divider VII 100. In the event that the synchronization of the system continues to be fast, the above sequence of operations is repeated so that good synchronization is achived, that is, until the changeover from mark to space indications and vice versa are directly under the positive pulse of the third part (or third pulse) of the three-divider VII 150 of Figure 7', as will be explained with reference to Figure $2^b$ of the drawings.

*Correct synchronization*

On the third line of Figure $2^b$ of the drawings has been illustrated the wave form of the potential appearing at reference point 3 of the three-divider VII 150 shown in Figure 7'. Below this waveform, on line 4, is illustrated the eight-channel multiplex signal, to portray the occurrence of the change-over from marking to spacing elements and vice versa with respect to the various pulses occurring in the three-divider VII 150. So long as the change-over from space to mark indication continues to lie under the positive pulses of line 3, as for example, in the interval just subsequent to time $t_3$ and just prior to time $t_4$, then the synchronization of the system is correct.

The pulses coupled from reference point 1 in the anode circuit of tube VII 151 of three-divider VII 150 are shown on line 1 of Figure $2^b$. If the change-over from one element to another shown on line 4 lies directly beneath the positive pulses indicated on line 1, it is an indication that the synchronization is fast; accordingly, fast indicator VII 160 operates to correct the frequency of the 2400 cycle/second frequency divider, thereby correcting the synchronization of the system. The voltage waveform appearing at point 2, that is, at the anode of the left tube of multivibrator VII 152 of three-divider VII 150, is shown on line 2 of Figure $2^b$. If the change-overs from marking to spacing or spacing to marking elements shown on line 4 fall under the positive portions of the pulses on line 2, this is an indication that the synchronization of the system is slow, and corrective action is thereby effected.

*Correction of slow synchronization*

In the event that the synchronization is slow, the slow indicator VII 130 (Figure 7') begins to operate, and the left hand tube of the slow indicator becomes conductive while the right hand tube becomes non-conductive. As the left hand tube of slow indicator VII 130 conducts, its plate potential drops, and this drop of potential is coupled from the point designated Slow 2 to the corresponding point in the control grid circuit of tube VII 121 in Figure 7. This potential decrease alone is insufficient to cut off tube VII 121, which is presently conductive. Simultaneously, however, the right hand tube of slow indicator VII 130 becomes non-conductive, and therefore an increasing potential is coupled from the anode of the right hand tube from the point designated Slow 1 to the corresponding point in the control grid circuit of the right hand tube of correction timing stage VII 140 in Figure 7'. This rise in potential applied to the control grid causes the right hand tube of the correction timing stage to become conductive, and the left tube therefore is rendered non-conductive. Therefore, the anode potential of the right hand tube in correction timing stage VII 140 decreases, and this decrease is coupled from the point designated CT2 to the corresponding point in the control grid circuit of tube VII 121 in Figure 7. The combination of this potential decrease, applied to point CT 2 in conjunction with the decreasing potential already applied to point Slow 2 in the same grid circuit, is effective to cut off tube VII 121; the tube is thus transferred from its normally conductive to the non-conductive stage. Therefore its anode potential rises, and this rise in potential is coupled to the control grid of the right hand tube of the frequency divider VII 110. The grid voltage of this portion of the frequency divider is therefore raised, and this effects the synchronization of frequency divider VII 110 on every fourth pulse coupled from the previous frequency divider VII 100, as explained before and illustrated on line 11 of Figure $2^e$ of the drawings. Therefore the frequency of the 2,400 cycle/second frequency divider VII 110 is increased for a short period, to correct the synchronization of the system.

It is noted that the tube VII 120 was non-conductive, and remained so during the operation of the slow synchronization correction circuit.

*Description of synchronization voltage waveforms*

The synchronization will now be further described in connection with Figures $2^b$, $2^c$, and $2^d$, in which correct, slow, and fast synchronization, respectively, are illustrated.

Referring now to Figure $2^b$ of the drawings, on line 0, the time abscissa, some times have been indicated. On lines 1, 2, and 3 are indicated the voltage waveforms appearing at the terminals represented by encircled numerals 1, 2, and 3, respectively, of the three-divider VII 150 illustrated in Figure 7′. On line 4 of Figure $2^b$ is plotted an eight-element signal as it appears when entering commutator I over the circuit designated *Tr* in Figure $1^b$ of the drawings. On line 4 of Figure $2^b$, the first change-over from spacing to marking element is shown lying beneath the first entire positive pulse of the voltage figure on line 3, that of the third multivibrator VII 153 of the three-divider VII 150. These conditions represent correct synchronization of the signal and the system.

On line 5 an addition has been made of the voltages occurring in the grid of the tube 133 of trigger A (VI 130, Fig. 6). The front-edge and the trailing edge of the step in this voltage figure coincide with the change-overs from space to mark and from mark to space, because this tube is coupled with the signal follower (VI 120). The short pulses of this voltage figure (line 5, Fig. $2^b$) that occur are generated by the division voltages indicated in the three-divider VII 150, as plotted on line 1 and line 3.

On line 6 an addition has been made of the voltages that occur in the grid of tube 134 of trigger A (VI 130). The front-edge and the trailing edge of this voltage figure again coincide with the space to mark and mark to space change-overs and, because this tube obtains its pulses from the anode of the left-tube of the signal-follower, whereas tube 133 obtains them from the anode of the right tube of the signal follower, the two voltage figures (lines 5 and 6) have opposite curves. This voltage figure also shows the short pulses caused by the division voltages of the three-divider (lines 1 and 3). The dotted lines over the voltage figures on lines 5 and 6 indicate the cut-off voltages of the respective tubes. Wherever the short voltage pulse is extended above this line, the respective tube becomes conductive for a short time, and after the first pulse that occurs (line 5 under $t_4$) in the grid of tube 133, trigger A (line 7, where the changes in position of trigger A have been plotted under $t_4$) will change its position. Trigger A will continue to occupy the other position until tube 134 (line 6) becomes conductive and thus changes the procedure. This occurs at the time $t_{10}$, when trigger A returns to its former position. The further course of the voltage figures on lines 5, 6 and 7 is self-explanatory.

On line 8 an addition has been made of the voltages occurring in the grid of tube 143 of trigger B (VI 145, Fig. 6). The front edge and trailing edge again coincide with the change-overs from space to mark positions, the short pulses originate from the division voltage indicated from the three-divider VII 150, plotted on line 2. On line 9 an addition has been made of the voltages occurring in the grid of the tube 144 of trigger B (VI 145). The front edge and the trailing edge coincide with the change-overs from space to mark positions and are opposite to those of tube 143 (line 8), because tube 144 is coupled with the anode of the left tube of the signal follower, whereas tube 143 is connected with the anode of its right-hand tube.

The dotted lines over the voltage figures on lines 8 and 9 indicate the cut-off voltages of the respective tubes. Whenever this voltage is surpassed, the respective tube becomes conductive for a moment, and as the first pulse occurs (line 8, under $t_5$) trigger B changes it position (line 10, the position curve of trigger B on which the change has been plotted under $t_5$). Trigger B now takes this other position, until tube 144 (line 9, under $t_{11}$) becomes conductive for a while and thus changes this position (line 10, under $t_{11}$), upon which trigger B returns to its former position. The further course of the voltage figures on lines 8, 9 and 10 is self-explanatory.

On line 11 has been plotted the voltage curve from the anode of the tube arrangement (VI 110, Fig. 6), after the latter has been turned 180° in phase by a triode (T). Here voltage pulses occur from $t_4$—$t_5$ (line 11) because triggers A and B (lines 7 and 10) take different positions during that time (from $t_0$—$t_4$ this position was the same in both Figures 7 and 10). Further the two triggers take opposite positions from $t_{10}$—$t_{11}$, and during this time a pulse occurs again in the anodes of VI 110 (line 11, from $t_{10}$—$t_{11}$). The further course of line 11 is self-evident.

On line 12 an addition has been made of the voltages occurring in the grid of the first tube of the fast-indicator (VII 160, Fig. 7′). Normally this tube is non-conductive, due to a negative bias voltage (indicated by the dotted line). Addition of the indicated voltages of the three-divider (line 2) and the voltage from the anode of VI 110 (line 11) results in the voltage figure of line 12. It thus appears that the sum-voltage is never sufficient to make the left tube of the fast indicator VII 160 conductive. Consequently the fast-indicator remains in rest position.

On line 13 an addition has been made of the voltages occurring in the grid of the left tube of the slow-indicator VII 130, Fig. 7′. Normally this tube is non-conductive, due to a negative bias voltage (the dotted lines over these figures indicate the cut-off voltages of the tubes). Addition of the voltage of the three-divider (line 3) and the voltage from the anode of VI 110 (line 11) results in the voltage figure of line 13. It thus appears that the sum-voltage is never sufficient to make the tube (left tube of the slow indicator VII 130) conductive. Thus the slow-indicator remains in rest position.

Referring now to Figure $2^c$, on line 0 some times have been indicated. On lines 1, 2 and 3, respectively, have been plotted the waveforms of the voltages occurring at the points 1, 2 and 3 of the three divider (VII 150, Fig. 7′). On line 4 has been plotted the one eight-channel signal as it is developed in Figure $2^h$. As appears from this figure, the change-over from mark to space position here lies under the positive pulse of the voltage figure of the second flip-flop (VII 152) of the three-divider (VII 150). Then the synchronization is slow.

On line 5 an addition has been made of the voltages occurring on the grid of tube 133 of trigger A (VI 130). The front edge and the trailing edge of this voltage figure coincide with the change-overs from space to mark and from mark to space, because this tube is coupled with the signal follower VI 120. The short pulses shown in this voltage figure are generated by the indicated division voltages of the three-divider, plotted on line 1 and line 3.

On line 6 an addition has been made of the voltages occurring on the grid of tube 134 of trigger A (VI 130). The front edge and the trailing edge of this voltage figure coincide with the space to mark and mark to space transitions and the trailing edge of the pulse of line 6 occurs simultaneously with the front edge of the pulse of line 5, because tube 134 obtains its pulses from the anode of the left tube of the signal follower VI 120, whereas tube 133 obtains them from the anode of the right tube of the signal follower. In addition the short pulses caused by the division voltages of the three-divider (line 1 and line 3) have been included in this voltage figure. The dotted lines over the voltage figures on lines 5 and 6 indicate the cut-off voltages of the respective tubes. Thus wherever the short voltage pulse surpasses this line, the relative tube becomes conductive for a moment, and at the first occurring pulse (line 5, under $t_4$) in the grid of tube 133 of trigger A (line 7, on which the position changes of trigger A have been plotted under $t_4$) changes its postion. Trigger A will continue to occupy the other position until tube 134 (line 6) becomes conductive for a moment, and thus changes this position. This happens at the time $t_{10}$, and trigger A returns to its former position at $t_{11}$. The further courses of the voltage figures on lines 5, 6 and 7 are self-explanatory.

On line 8 an addition has been made of the voltages occurring on the grid of tube 143 of trigger B (VI 140, Fig. 6). The front edge and the trailing edge coincide again with the space to mark and mark to space transitions, and the short pulses are dependent on the division voltage indicated for the three-divider (plotted on line 2). On line 9 an addition has been made of the voltages occurring on the grid of tube 144 of trigger B (VI 140). The front edge and the trailing edge coincide with the space to mark and the mark to space changes. The dotted lines over the voltages figures on the lines 8 and 9 indicate the cut-off voltages of the respective tubes. Wherever this voltage is exceeded, the relative tube becomes conductive for a moment, and at the first occurring pulse (line 8, under $t_6$) trigger B changes its position (line 10, where the changes in position of trigger B have been plotted under $t_6$). Trigger B will continue to be in this other position until the temporary conductivity of tube 144 (line 9, under $t_{13}$) changes this (line 10, under $t_{13}$), whereupon trigger B returns to its former position. The further extensions of the voltage figures on the lines 8, 9 and 10 is self-explanatory.

On line 11 has been plotted the voltage curve from the anode of the tube arrangement (VI 110) after the voltage has been shifted 180° in phase by a triode (T). Here a voltage pulse occurs from $t_4$—$t_6$ (line 11) because the triggers A and B (lines 7 and 10) are in different positions during that time (from $t_0$—$t_4$ their positions are the same). Further the two triggers occupy opposite positions from $t_{11}$—$t_{13}$, and during that time a pulse occurs again in the anodes of VI 110 (line 11, from $t_{11}$—$t_{13}$). The further course of line 11 is self-explanatory.

On line 12 an addition has been made of the voltages occurring on the grid of the first tube of the fast indicator (VII 160, Fig. 7'). Normally this tube is non-conductive (the dotted line represents the cut-off voltage). An addition of the indicated voltage of the three-divider (line 2) and the voltage on the anode of VI 110 (line 11) yields the voltage figure of line 12. It is apparent from that figure that the sum voltage is at no moment sufficiently high to make the respective tube (left tube of the fast indicator VII 160) conductive. Thus the fast indicator remains in the non-operated condition.

On line 13 an addition has been made of the voltages occurring in the first tube of the slow indicator (VII 130). Normally this tube is not conductive because of its fixed negative bias voltage. An addition of the indicated voltage of the three divider (line 3) and the voltage at the anode of VI 110 (line 11) yields the voltage figure of line 13. It is therefore apparent that the sum voltage during several intervals, for example $t_4$—$t_5$, $t_{11}$—$t_{12}$ (and further as indicated on line 13) makes the left tube of the slow indicator conductive. Thus the slow indicator starts to operate and, as was explained before, influence the correction timing stage (VII 140) and the two will together change the tube VII 121 from its normally conductive condition to the non-conductive condition. Thus the frequency of the 2,400 cycles/second generator will be increased for a short while.

Referring now to Figure 2[d], on line 0 some times have been indicated. On lines 1, 2 and 3, respectively, have been plotted the waveforms of the voltages occurring at the points 1, 2 and 3 of the three-divider (VII 150, Fig. 7'). On line 4 has been plotted the one eight-element signal as the latter has been developed in Figure 2[h]. As is evident from these figures, the change-over from spacing to marking position here lies under the positive pulse of the voltage figure of the first flip-flop (VII 151) of the three-divider (VII 150). When this occurs, the synchronization is fast.

On line 5 an addition has been made of the voltages occurring on the grid of tube 133 of trigger A (VI 130). The front edge and the trailing edge of this voltage figure coincide with the change-overs from spacing to marking and from marking to spacing, because this tube is coupled with the signal follower (VI 120). The short pulses of this voltage figure are generated by the indicated division voltages of the three-divider, plotted on line 1 and line 3. On line 6 an addition has been made of the voltages occurring in the grid of tube 134 of trigger A (VI 130). The front edge and the trailing edge of this voltage figure coincide again with the spacing to marking and marking to spacing changes, and the respective curve is opposed to the one on line 5 for the reasons explained hereinbefore. Further the short pulses caused by the division voltages of the three-divider have been indicated in this voltage figure (line 1 and line 3).

The dotted lines over the voltage figures on lines 5 and 6 indicate the cut-off voltages of the respective tubes. Whenever the short voltage pulse surpasses this line, the respective tube becomes conductive for a moment and with the first occurring pulse (line 5, under $t_7$) on the grid of tube 133 of trigger A (line 7, where the position curve of trigger A is plotted under $t_7$) changes its position. Trigger A will continue to be in this other position until the temporary conductivity of tube 134 (line 6) changes this state. This takes place at the time $t_{14}$, when trigger A returns to its former position. The further extension of the voltage figures on lines 5, 6 and 7 is self-explanatory.

On line 8 an addition has been made of the voltages occurring on the grid of tube 143 of trigger B (VI 140). The front edge and the trailing edge coincide again with the spacing to marking and the marking to spacing changeovers. The short pulses are caused by the indicated division voltage of the three-divider (plotted on line 2). On line 9 an addition has been made of the voltages occurring on the grid of tube 144 of trigger B (VI 140). From these curves, the curve of trigger B as plotted on line 10 is deduced.

On line 11 has been plotted the voltage curve at the anode of tube arrangement VI 110 after the latter has been shifted 180° in phase by a triode (T). Here a voltage pulse occurs from $t_6$—$t_7$ (line 11) because the triggers A and B (lines 7 and 10) are in different positions during that time. Further the two triggers are in contrary positions from $t_{13}$—$t_{14}$. During that time a pulse occurs again in the anodes of VI 110 (line 11, from $t_{13}$—$t_{14}$). The further course of the curve of line 11 is self-explanatory.

On line 12 an addition has been made of the voltages occurring on the grid of the left tube of the fast indicator (VII 160). Normally this tube is not conductive, having a negative bias voltage applied thereto. An addition of the indicated voltage of the three-divider (line 2) and the voltage at the anode of VI 110 (line 11) yields the voltage figure of line 12. From the resultant figure, it is apparent that the sum voltage exceeds the cut-off voltage (dotted line) at some points, for example, from $t_6$—$t_7$ and from $t_{13}$—$t_{14}$. During the times mentioned above, the left tube of the fast indicator becomes conductive. Thus the fast indicator starts to operate, and as has been explained before, it influences the correction timing stage VII 140, and the two together change the tube VII 120 from its normal non-conductive condition to the conductive condition. Thus the frequency of the 2,400 cycles/second generator is decreased for a short time.

Referring now to Figure $2^e$, on line 3 has been indicated the waveform of the voltage at the anodes of the 2,400 cycles/second generator which occurs when the fast indicator operates.

In more detail, the 12,000 cycles/second signal has been plotted on line 1 and the time between two subsequent vertical lines agrees with half a period of the 12,000 cycles/second signal. On line 2 has been plotted the 2,400 cycles/second signal. When the synchronization is correct, one period of the 2,400 cycles/second generator VII 110 (for example from $t_0$—$t_3$, line 2) coincides with one image of the voltage curve in the grid of this divider (line 9, from $t_0$—$t_3$). On line 9, 5 pulses of the 12,000 cycles/second divider have been indicated.

If the synchronization is fast, the grid voltage of the left tube of the 2,400 cycles/second divider is decreased, as has been explained before, and 6 pulses of the 12,000 cycles/second divider occur before the divider VII 110 is synchronized (line 10, from $t_0$—$t_4$). Thus the duration of one period of the divider VII 110 is increased, and extends from $t_0$—$t_4$ (line 3, the shaded part indicating the measure of increase). The curve on line 3 is the result of the cooperation of the fast indicator and the correction timing stage. On line 4 has been plotted the voltage waveform of the fast indicator. On line 5 has been plotted the voltage waveform of the correction timing stage. Due to operation of the fast indicator, the position of the correction timing flip-flop VII 140 is temporarily modified. This time is determined by the RC combination utilized, and it is synchronized by the 2,400 cycles/second divider. The correction timing flip-flop or multivibrator therefore returns to its original position after a certain period (determined by the RC combination) and is synchronized by the 2,400 cycles/second generator. Thus the cooperation of the correction timing device and the fast indicator is discontinued, and the 2,400 cycles/second divider returns to its original position. Thus the temporary decrease in frequency ceases, and the system returns to its original conditions.

If the synchronization is still too fast, the corrective action described above is repeated until correct synchronization is attained. If the synchronization is slow, slow indicator VII 130 operates. When the slow indicator operates, the grid voltage of the right-hand tube of the 2,400 cycles/second divider is increased, as has been explained before, and after 4 pulses of the 12,000 cycles/second signal occur, the divider VII 110 synchronizes on the fourth pulse (line 11, from $t_0$—$t_2$). Thus the duration of the period of the generator VII 110 is shortened, and becomes that of the interval from $t_0$—$t_2$ (line 6, the shaded part indicating the decrease of time period). On line 7 has been plotted the voltage picture of the slow indicator stage. On line 8 has been plotted the voltage picture of the correction timing stage. As soon as the cooperation of the latter two stages is discontinued, the decrease in frequency stops.

At this point the description of the equipment in Commutator I (Figure $1^b$) has been completed.

The operation of the frequency-shift keyers FSK I and FSK II has been generally explained in the prior description of Figure $1^b$. No further elucidation of the structure and operation of the frequency-shift keyers is deemed necessary, as this equipment is widely used, well known, and understood in the art.

Figure 8:
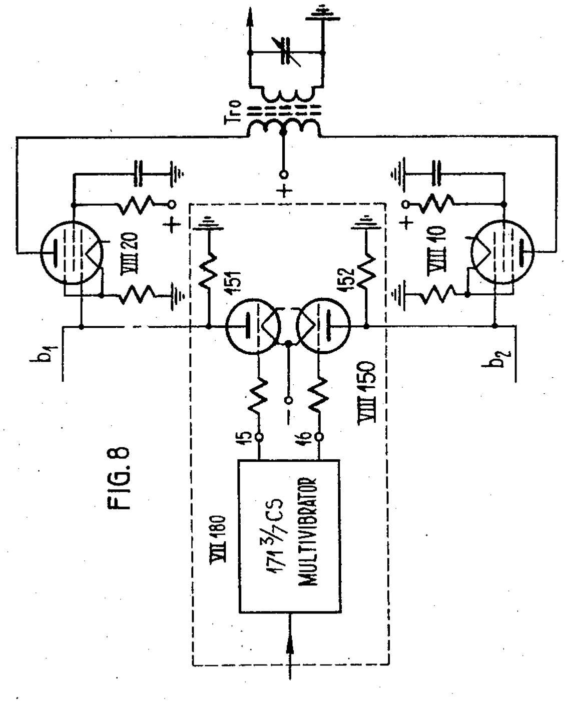

The output terminals of the frequency-shift keyers FSK I and FSK II are coupled to the input terminals of Commutator II in Figure $1^b$. The circuitry of Commutator II is shown in Figure 8 of the drawings. As there shown, Commutator II comprises two tubes VIII 10 and VIII 20. On the grid of tube VIII 20, a signal arrives from frequency-shift keyer I (FSK I, Fig. $1^b$) across circuit $b_1$. On the grid of tube VIII 10 a signal arrives from frequency-shift keyer II (FSK II, Fig. $1^b$) across the circuit $b_2$. Further the grid of tube VIII 20 is connected with the anode of tube 151, and the grid of tube VIII 10 with the anode of tube 152. The tubes 151 and 152 become alternately conductive and non-conductive. If one of them is conductive, the other is non-conductive. For this purpose the grids of tubes 151 and 152 are connected with the points 15 and 16, respectively, from the anodes of tubes VII 190 and VII 170 (Fig. 7') which are connected with the 171$\frac{3}{7}$ cycles/second generator (VII 180), the tubes VIII 20 and VIII 10 becoming conductive and non-conductive alternately in consequence. This circuit has been so adjusted that the two tubes are alternately conductive and non-conductive for a $\frac{35}{12}$ ms. period. Thus the signal elements, which were $\frac{35}{6}$ ms. in duration in the frequency-shift keyers, are reduced to $\frac{35}{12}$ ms. by scanning. The elements of each frequency-shift keyer are thus combined in Commutator II, so that one 8-channel signal is again produced.

The operation of Commutator II is also explained with reference to a time diagram (Fig. $2^g$, under T*r*). On line 1 the signal, as it arrives in FSK I (Fig. $1^b$) at $a_1$ after being rectified, has been plotted. On line 2 the signal, as it arrives in FSK II at $a_2$ after being rectified, has been plotted. On line 3 the signal, as it leaves FSK I at $b_1$, has been plotted. On line 4 the signal, as it leaves FSK II at $b_2$, has been plotted. On line 5 the voltage curve at points 15 and 16 of the 171$\frac{3}{7}$ cycles/second generator (VII 180) has been plotted. On line 6 the waveform of the voltage as it leaves Commutator II has been plotted. The various frequencies in Figure $2^g$ ($f_1^1$, $f_2^1$, $f_3^1$, $f_4^1$) have been explained previously in the description. Further the short lines drawn on four different levels of line 6 conform to lines $10^a$ and $10^b$, $14^a$ and $14^b$ respectively, in Figure $2^a$. The waveform illustrated on line 6 is supplied to the transmitter (RT*r*, Figure $1^b$), and this is transmitted after modulation.

It is apparent that the structure and operation of the transmitting station at A has been fully set forth. It will be understood that the transmitter equipment at B (not shown in the drawings) is similar to the equipment at station A except that, to minimize possibility of error, station B utilizes different transmission frequencies. Therefore it is apparent that the frequency-shift adaptors in the receivers of station A are adjusted to respond to the frequencies transmitted by station B which differ from the frequencies utilized by station A. It will also be understood that the receiver equipment at station B (not shown) is similar to the equipment at station A, except for slight differences in their respective frequency-shift adaptors occasioned by the different transmission frequencies.

*Receiver operation*

The signals transmitted upon modulation from the transmitter at B (not shown) are analogous to those shown in line 6 of the upper portion of Fig. $2^g$, and are received at the antenna of the receiver and supplied to two receiver-installations (Fig. $1^c$, R I and R II). The radio-receivers RR I and RR II have been tuned to different wave-lengths.

At the first radio-receiver (RR I, Fig. $1^c$) the frequencies $f_1$ and $f_2$ arrive (lower portion of Fig. $2^g$, after $e_1$). At the other radio-receiver (RR II, Fig. $1^c$) the frequencies $f_3$ and $f_4$ arrive (lower portion of Fig. $2^g$, after $e_2$). It has been shown that the frequencies transmitted by the transmitter at B and received at A (line 1, Fig. $2^g$, R*e*) have not the same values as the frequencies transmitted by the transmitter at A (line 6, Fig. $2^g$, T*r*). Every radio-receiver is connected with a frequency-shift adaptor (e.g., FSA I and FSA II, Fig. $1^c$). From these frequency-shift adaptors two direct-current signals are obtained. The two direct-current signals control two triggers, or bistable multivibrators (*Tr* I and *Tr* II, Fig. 1[c]). The two triggers control two signal-follower-combinations (SF I and SF II). The two signal-follower-combinations emit direct-current signals as indicated under *h*1 and *h*2 (Fig. 2[g], R*e*, lines 2 and 4). In Commutator III (Comm. III, Fig. 1[c]) these two signals are combined into one 8-channel-signal. This 8-channel signal is further supplied as a voice-frequency signal across a tone keyer (TK, Fig. 1[c]), and further across the circuit R*e* to the control unit for further commutation and distribution over the 8 connected channels. It is evident from line 1 of Fig. 2[g], R*e*, that the interval between a marking and a spacing element arriving at a receiver is equal to the time duration of a normal marking-element or spacing-element. Thus a lengthening of the signal up to 150% may occur without causing any disturbance. That is, if the scanning pulses occur at the center, or 50% point, of the elements, then after an element is received, the interval (equal to 100% of an element duration) between elements first elapses and the time prior to the scanning of the subsequent element (equal to 50% of an element duration) next elapses, before the pulse occurs to scan the subsequent element. Accordingly, even if an element is prolonged by as much as 150% of the original duration, the invention is nevertheless effective to successfully scan and regenerate the succeeding element. This efficient operation is in contradistinction to prior art devices, in which prolongations of more than 50% of the assigned element duration are fatal to effective scanning and regeneration of the subsequent pulse.

The operation of the receiver will now be explained in connection with schematic diagrams of the equipment shown in block form in Fig. 1[c].

*Receiver scanning*

Figure 5:
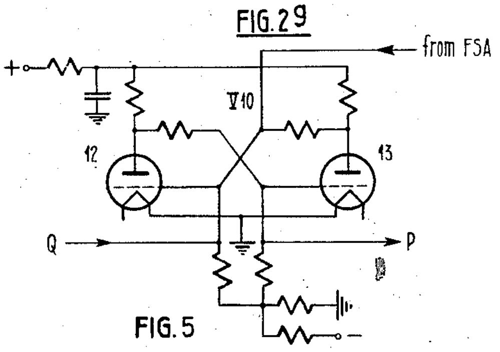
Figure 2H:
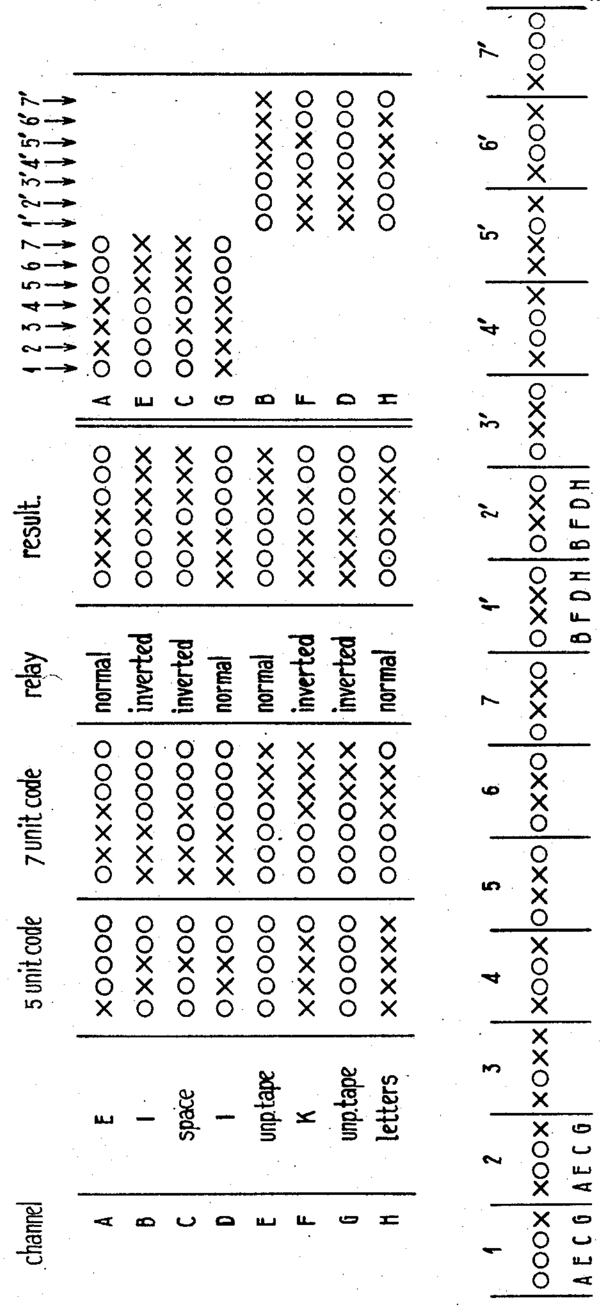

As has been explained before, in receiver installation I frequencies $f_1$ and $f_2$ occur, i.e., voltages at these frequencies control the frequency-shift adaptor. (The operation of the frequency-shaft adaptor is well-known and understood, and therefore is not further described here). From this frequency-shift adaptor a direct-current signal is obtained, which signal controls a trigger (Fig. 5).

In the spacing position tube 12 of the trigger is not conductive, and tube 13 is conductive. For example, by means of an incoming change-over from spacing to marking condition (of the FSA), tube 12 becomes conductive and tube 13 non-conductive. The potential at point P then drops. This decrease in potential is supplied to the signal-follower IV 120 (Fig. 4) at point P. Thus the left tube of the signal-follower, which was conductive in the spacing condition, becomes non-conductive, and the right tube of the signal-follower, which was non-conductive in the spacing condition, becomes conductive. Due to this action the trigger-combinations A (IV 121) and B (IV 122) are influenced, but prior to any change in their positions, a further co-operation is required of two voltages coupled from two points in a four-divider III 150 (Fig. 3′), the respective points 1 and 3 of III 150. The triggers A and B control the tube-combination IV 140 (Fig. 4), at the corresponding points T*r*A1, T*r*A2, T*r*B1 and T*r*B2. The tube-combination IV 140 now controls (in co-operation with the four-divider) the gate-trigger-combination III 160 (Fig. 3), (at the respective points 6, 7, 9 and 10 in IV 140 and III 160). The points 9 and 10 in IV 140 are points corresponding with 6 and 7, but they are in the second receiver installation (not shown). The gate-trigger-combination III 160 is likewise controlled by means of the four-divider (at the respective points 2 and 4 in III 160 and III 150). At point 11 of III 160 (Fig. 3) the one 8-channel signal is again found. This signal is coupled to the tone-keyer, where it is converted into a voice-frequency signal.

The four-divider III 150 has been so called because it supplies in the anodes of the first tubes of the four flip-flops (mono-stable multivibrators) 151, 152, 153 and 154, from which this four-divider is composed, at the points 1, 2, 3 and 4, four different pulse-voltage figures. The operation of the four-divider is similar to the operation of the three-divider, the latter having been described in detail in the Transmitter section. With reference to certain time-diagrams (Figs. 9[a], 9[b] and 9[c]) the foregoing explanation as regards scanning will be extended.

Figure 3:
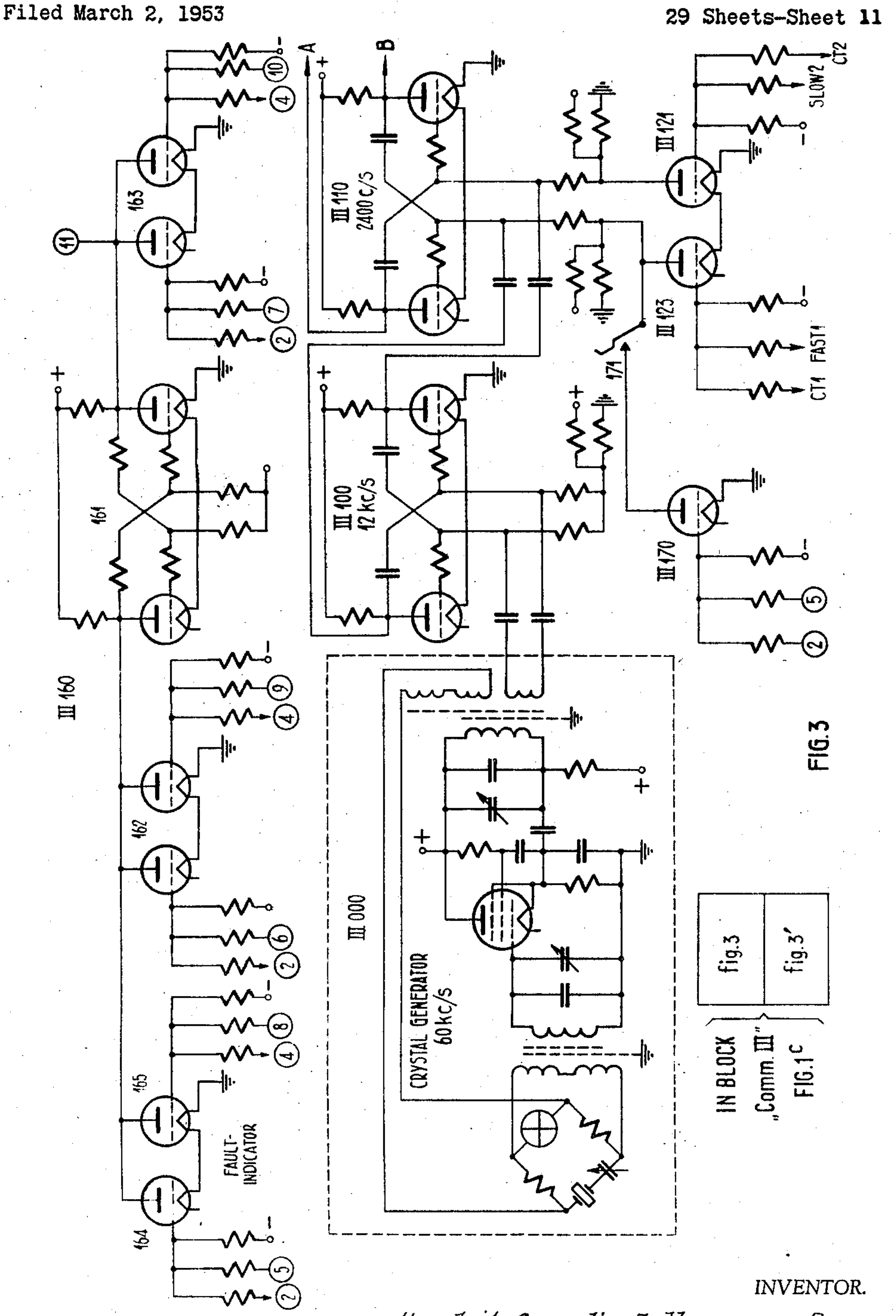
Figure 3:
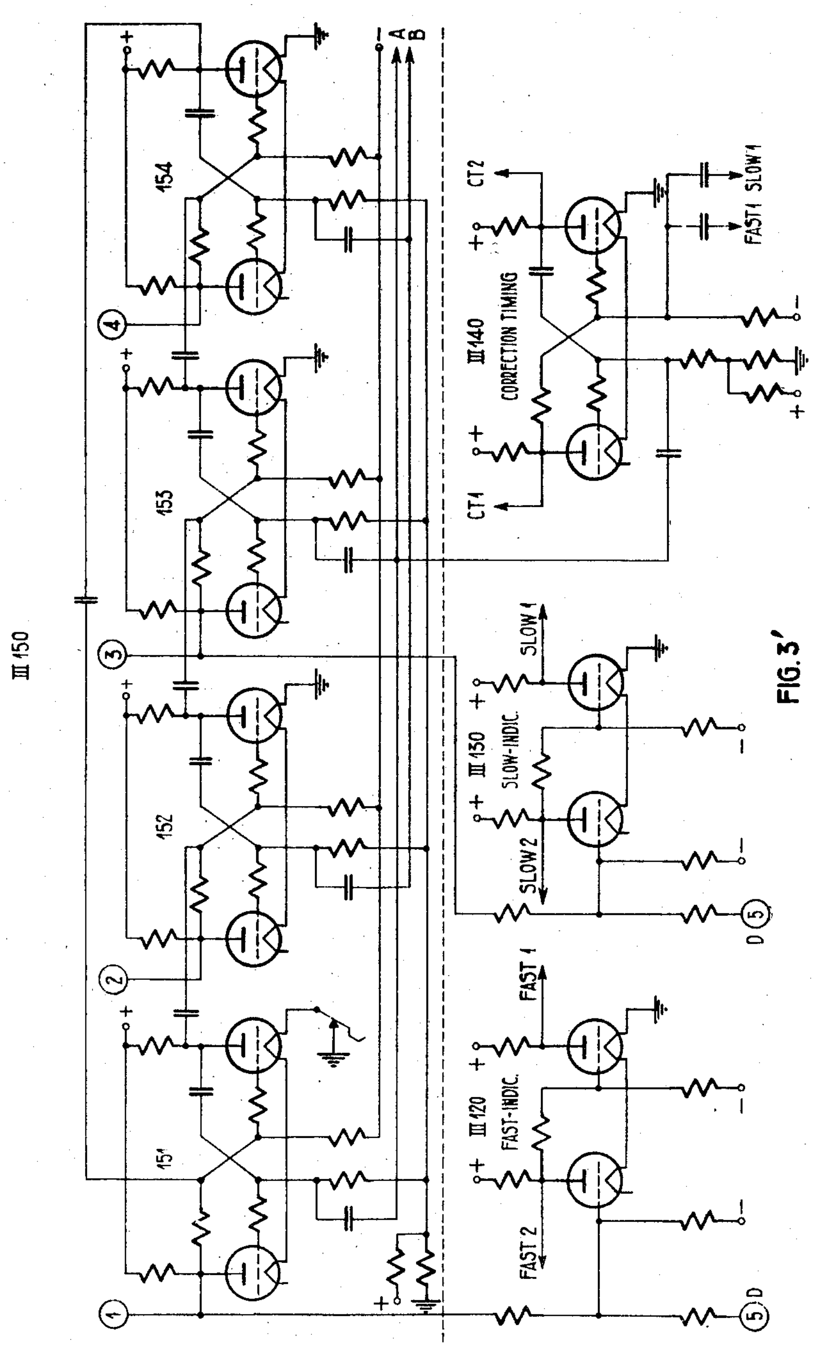
Figure 4:
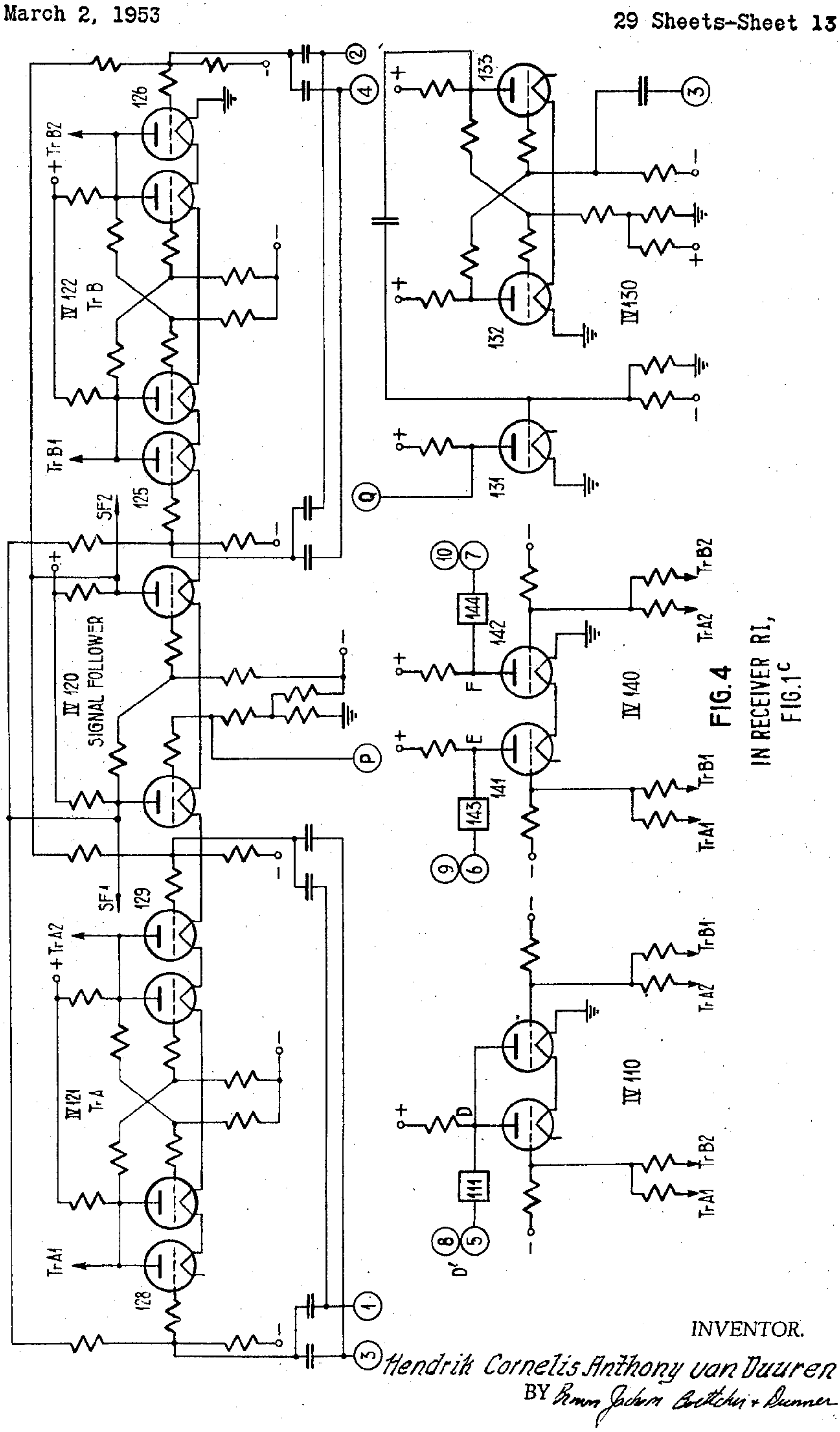

Referring to Fig. 9[a], the following waveforms have been plotted thereon: on line 0, a time-division; on line 1, the voltage-pulse as it occurs at point 1 in the anode of the left tube of the flip-flop 151 (Fig. 3′); on line 2, the voltage-pulse as it occurs at point 2 in the anode of the left tube of the flip-flop 152; on line 3, the voltage-pulse as it occurs at point 3 in the anode of the left tube of the flip-flop 153; on line 4, the voltage-pulse as it occurs at point 4 in the anode of the left tube of the flip-flop 154; on line 5, the two frequencies (marking- and spacing-frequency) as they occur at circuit $e_1$ in the radio-receiver 1 (RRI, Fig. 1[c]); on line 6, the direct-current signal as it controls the signal-follower SFI in Fig. 1[c]; on line 7, the sum of the voltages occurring in the grid of tube 129 of the trigger-combination IV 121 (Fig. 4). Here the front-edge coincides with the front-edge of line 6, and so does the trailing edge, because this tube is synchronized by the signal-follower (from point SF 2). The voltage-peaks in the voltage-figure of line 7 are supplied by the four-divider from the points 1 and 3 through a condenser (line 1 and line 3 of Fig. 9[a]). On line 8 the sum of the voltages occurring in the grid of tube 128 of the trigger-combination IV 121 has been plotted. Here the front-edge and the trailing edge are in opposite positions with respect to those of line 7, because this tube is synchronized from the other anode (point SF 1) of the signal-follower (IV 120). The voltage-peaks are supplied by the four-divider (lines 1 and 3). The dotted lines over the voltage figures on lines 7 and 8 indicate the cut-off-voltages of the respective tubes 129 and 128.

Wherever the voltage figure surpasses this dotted line, the respective tube becomes temporarily conductive and thus the position of the trigger A is changed. At the time $t_6$ the tube 129 becomes conductive for a moment (line 7, under $t_6$) and hence its anode potential drops. Therefore the voltage in the grid of the left tube of trigger A (T*r*A) drops and the anode voltage of this tube (at the point T*r*A1) rises. Thus the position of trigger A is changed. This has been indicated on line 9 under $t_6$, on which line the voltage figure of trigger A has been plotted. At the time $t_{12}$ the tube 128 becomes conductive (line 8, under $t_{12}$), the anode voltage of this tube drops, the grid voltage of the second tube of trigger A drops, and this tube now changes from the conductive to the non-conductive condition. The anode voltage (at point T*r*A2) rises, and the anode voltage of the first tube of trigger A (point T*r*A1, line 9 under $t_{12}$) drops.

On line 10 the sum of the voltages occurring on the grid of tube 126 of the trigger-combination IV 122 has been plotted. On line 11 the sum of the voltages occurring on the grid of tube 125 of the trigger combination IV 122 has been plotted. The change-overs in the latter two voltage figures coincide with the change-overs of lines 7 and 8, because these tubes are also controlled by the signal follower IV 120. The little voltage peaks in the voltage figures on lines 10 and 11 are supplied by the four-divider from the points 2 and 4 (lines 2 and 4, Fig. 9[a]).

On line 12 the voltage figure of the trigger B has been plotted, which after the preceding description can be easily deduced from lines 10 and 11. Further the components plotted on lines 13, 14, 15, 16 are described under Receiver Synchronization and will be elucidated in that portion of the description.

In order to explain the scanning, Fig. 9[b] has been drawn. Here the voltage figure occurring at points 6 and 7 of tube combination IV 140, will be deduced. For further reference the two frequencies as they occur at circuit $e_1$ in the radio receiver I (also line 5, Fig. 9[a]) have been plotted on line 1. On line 2 the direct-current signal as it controls the signal-follower (also line 6, Fig. 9[a]) has been plotted. On line 3 the voltage pulse as it occurs in point 2 in the anode of the left tube of the flip-flop 152 (also line 2, Fig. 9[a]) has been plotted. On line 4 the voltage figure as it occurs at point TrA1 in the anode of the left tube of trigger A (also line 9, Fig. 9[a]) has been plotted. On line 5 the voltage figure as it occurs at the point TrB1 in the anode of the left tube of trigger B (also line 12, Fig. 9) has been plotted. On line 6 the sum voltage as it occurs on the grid of tube 141 of the tube-combination IV 140 has been plotted. This voltage is found by adding the voltages of lines 4 and 5. The same voltage figure occurs at the anode of tube 141 and the grid of the subsequent tube (143), also at the point 6.

On line 7 the voltage figure as it occurs at the point TrA2 in the anode of the right tube of trigger A has been plotted. On line 8 the voltage figure as it occurs at the point TrB2 in the anode of the right tube of trigger B has been plotted. On line 9 the sum voltage as it occurs on the grid of tube 142 of the tube combination IV 140 has been plotted. The latter sum voltage is found by adding the voltages of lines 7 and 8. The same voltage figure occurs across the anode of tube 142 and on the grid of a subsequent tube (144), also at the point 7.

On line 10 the sum voltage as it occurs on the grid of the left tube of the tube-combination 162 (III 160) has been plotted. This is found by addition of the voltages of lines 3 and 6. And on line 11 the sum voltage as it occurs on the grid of the left tube of the tube combination 163 has been plotted. It is found by addition of the voltages on lines 3 and 9.

In Figure 9[c] the scanning across receiver II (RII, Fig. 1[c]) with the commutation as it occurs in Commutator III (Fig. 1[c], Comm. III) has been plotted. On line 1 the frequencies $f_3$ and $f_4$ as they enter across $e_2$ in the radio-receiver RRII (Fig. 1[c]) have been plotted. On line 2 the voltage figure which controls the signal-follower (SFII) has been plotted. On line 3 the voltage figure at point 4 of the four-divider (III 150) has been plotted. On line 4 the voltage figure at point TRA *a* of the trigger $A^1$ has been plotted, which is in receiver II (not shown), and it corresponds with point TrA1 in IV 121. On line 5 the voltage figure from point $TrB_1^1$ of the trigger $B^1$ has been plotted. This point is in receiver II (not separately drawn), and corresponds with point TrB1 in IV 122. On line 6 has been plotted the sum voltage as it occurs in the grid of tube $141^1$ (not separately shown), corresponding with tube 141 (IV 140) from receiver I. It is found by addition of the voltage figures on lines 4 and 5. The same voltage figure occurs across the anode of tube $141^1$ and the grid of tube $143^1$ (not separately drawn) at the point 9 (IV 140). Point 9 in receiver II corresponds with point 6 in receiver I.

On line 7 the voltage figure as it occurs in point 10 has been plotted. Point 10 of receiver II corresponds with point 7 of receiver I (IV 140). On line 8 the sum of the voltages occurring on the grid of the right tube of the tube-combination 162 has been plotted. This sum voltage is found by addition of the voltages of the voltage figures on lines 3 and 6. On line 9 the sum of the voltages occurring on the grid of the right tube of the tube-combination 163 has been plotted. This is found by addition of the voltage figures on lines 3 and 7. Finally the sum of the voltages occurring on the grid of the left tube of the tube-combination 162 (line 10, Fig. 9[b]) has been likewise plotted again on line 10, and on line 11 the sum of the voltages occurring on the grid of the left tube of the tube combination 163 (line 11, Fig. 9[b]) has been plotted. The voltage figures on the last-mentioned four lines, i.e. 8, 9, 10 and 11, determine the voltage at point 11 (III 160).

On line 12 this voltage has been plotted. The voltage figures on lines 10 and 11 arrive from receiver I and are coupled to the grids of the left-hand tubes of 162 and 163 (III 160). The voltage figures on lines 8 and 9 arrive from receiver II and are coupled to the grids of the right-hand tubes of 162 and 163. The dotted lines over these figures represent the cut-off voltages of the respective tubes. Wherever the voltage figure surpasses this dotted line, the respective tube becomes conductive for a moment and influences the position of trigger 161. At the time $t_1$ the left tube of 163 becomes conductive for a moment (line 11, under $t_1$). Thus its anode potential drops, hence the voltage on the grid of the left tube of 161 drops, hence its anode potential rises and consequently the anode voltage of the right tube of 161 drops and thus the voltage at point 11 (line 12, under $t_1$) drops and a spacing element from receiver I is supplied.

At the time $t_2$ the right tube of 163 becomes conductive (line 9, under $t_2$). Thus its anode voltage drops, hence the voltage on the grid of the left tube of 161 drops (this tube was non-conductive already), hence the right tube of 161 remains conductive, hence the voltage in its anode remains low and consequently the voltage in point 11 (line 12, $t_2$) remains low, and a spacing element from receiver II is supplied.

At the time $t_3$ the left tube of 162 becomes conductive for a moment (line 10), hence its anode potential drops, hence the voltage on the grid of the right tube of 161 drops, hence its anode voltage rises, hence the voltage at point 11 (line 12, under $t_3$) rises, and a marking element from receiver I is supplied.

At the time $t_4$ the right tube of 161 becomes conductive for a moment, hence its anode voltage drops, hence the grid voltage of the right tube of 161 drops; the latter was non-conductive and remains so, hence its anode potential remains high, and consequently the voltage at point 11 remains high as well, and a marking element is supplied from receiver II. The voltage figure at point 11 represents the one eight-element signal which is coupled to the tone keyer.

*Receiver synchronization*

In the receiver, synchronization is effected on the signal received, with respect to the change-overs from marking to spacing condition and from spacing to marking condition. In the transmitter a three-divider was used in the synchronization, which made it possible to signal three different conditions. The three conditions indicated whether the signal for the synchronization was: (1) correct, (2) fast, or (3) slow.

In the receiver a four-divider is used, which makes it possible to signal four different conditions. With the aid of the four-divider four conditions of signal are distinguished, that is, whether the synchronization is: (1) correct, (2) fast, (3) slow, or (4) faulty. Particulars as to the faulty indication will be discussed after the description of the synchronization.

The equipment for the synchronization comprises:

(1) A crystal-controlled 60 kc. generator III 000 (Fig. 3) with a frequency-divider to 12 kc., III 00, and another to 2400 c./s., III 110. From the crystal-controlled generator all the frequencies required for synchronization are derived. In the grid circuits of the 2400 c./s. divider are included the tube arrangement III 121 and III 123, which have the same function as the corresponding elements in the transmitter station (VII 120 and VII 121, Fig. 7); the receiver arrangement, by means of switching arrangement 171 in the grid of the left tube of the 2400 c./s. divider, can also include the tube arrangement III 170, which serves for initial correction purposes.

(2) A slow indicator III 130 (Fig. 3') and a fast indicator (III 120).

(3) The correction-timing stage (III 140).

(4) A four-divider (III 150).

Operation of these circuits is influenced by:

(1) The trigger-combinations IV 121 (Fig. 4) and IV 122, which are also indicated as trigger A and trigger B, respectively. These triggers change their positions due to operation of signal follower IV 120 across the tubes 128, 129 and 125, 126. Trigger A is additionally influenced by the pulses from the anode of the left tube of the flip-flop 151 from the four-divider III 150 (corresponding points 1) and from the anode of the left tube of the flip-flop 153 (corresponding points 3), whereas trigger B is further influenced by the pulses from the anode of the left tube of the flip-flop 152 (corresponding points 2) and from the anode of the left tube of the flip-flop 154 (corresponding points 4).

(2) The double triode IV 110.

The equipment that has been described up to this point for the synchronization corresponds with the equipment discussed with reference to the transmitter under the heading "Transmitter synchronization," and has there been explained in detail, so that reference to that description readily explains the structure and operation of the corresponding elements in the receiver.

The foregoing discussion will now be elaborated upon with reference to time-diagrams. Fig. $9^a$, here synchronization is "correct"; Fig. $9^d$, here synchronization is "slow"; Fig. $9^e$, here synchronization is "fast"; Fig. $9^f$, here synchronization is "faulty."

*Correct synchronization*

Referring now to Figure $9^a$, for the description of lines 0–12 has been given in the description of the receiver station, where the respective lines have been explained. As it appears from this figure, the change-over from spacing- to marking-condition lies under the positive pulse of the third flip-flop 153 of the four-divider (III 150). In this case, the synchronization is correct.

On line 13 has been plotted the voltage figure at the anode of the tube-arrangement (IV 110) after it has been shifted 180° in phase by a triode (indicated as 111), which in turn is coupled to point 5. Here a voltage pulse occurs from $t_5$—$t_6$ (line 13) because triggers A and B (lines 9 and 12) occupy different positions during that time (from $t_0$—$t_5$ their positions were the same). Further the two triggers occupy opposite positions from $t_{11}$—$t_{12}$, and during that time a pulse occurs again (line 13, under $t_{11}$—$t_{12}$).

On line 14 an addition has been made of the voltages occurring at the grid of the first tube of the fast indicator (III 120), which is normally non-conductive. The dotted line over this figure indicates the cut-off voltage of this tube. Addition of the indicated voltage of the four-divider (line 1) and the voltage from point 5 of the tube arrangement IV 110 (line 13) results in the voltage figure of line 14. From this figure it appears that the sum-voltage is never sufficient to make the respective tube (left tube of the fast-indicator III 120) conductive. Thus the fast-indicator remains non-operated.

On line 15 an addition has been made of the voltages occurring at the grid of the first tube of the slow-indicator (III 130), which is normally non-conductive. An addition of the indicated voltage of the four-divider (line 3) and the voltage from the point 5 of IV 110 (line 13) yields the voltage figure of line 15. From this figure it appears that the sum-voltage is never sufficient to make the respective tube (left tube of the slow-indicator III 130) conductive. Thus the slow-indicator remains non-operated.

On line 16 an addition has been made of the voltages occurring on the grid of the left tube (164) of the fault-indicator (III 160). Normally this tube is non-conductive. An addition of the indicated voltage of the four-divider (line 2) and the voltage from point 5 of IV 110 (line 13) yields the voltage figure of line 16. From this waveform it appears that the sum-voltage is never sufficient to render the respective tube (tube 164 of the fault-indicator) conductive. Thus the fault-indicator remains non-operated.

*Correction of slow synchronization*

Referring now to Figure $9^d$, on lines 1–4 the four voltage figures from the four-divider have been plotted. On line 5 the signal which controls the signal-follower has been plotted. From this figure it is evident that the change-over from spacing- to marking-condition lies under the positive pulse of the second flip-flop (152) of the four-divider (III 150), shown on line 2. Under these conditions, the synchronization is slow.

On line 6 the sum-voltage which occurs at the grid of tube 129 (IV 121) has been plotted. This tube is controlled by the anode of the right tube of the signal follower (point SF2) and by the voltages from the points 1 and 3 of the four-divider (lines 1 and 3). Due to the control by the signal-follower, the front-edge and the trailing-edge coincide with those of the signal (line 5). The voltage peaks in line 6 are supplied by the respective voltages from the four-divider.

On line 7 the sum-voltage which occurs at the grid of tube 128 (IV 121) has been plotted. It is controlled by the anode of the left tube of the signal-follower (point SF1) and by the voltages from points 1 and 3 of the four-divider (lines 1 and 3).

On line 8 the voltage figure of trigger A (at point TrA1) has been plotted. It is determined by the co-operation of tubes 128 and 129. Wherever the voltage figure of tube 129 exceeds the cut-off voltage (e.g., under $t_3$, line 6), trigger A changes its position (line 8, under $t_3$) and wherever the voltage figure of tube 128 exceeds the cut-off voltage (e.g., under $t_8$, line 7), trigger A returns to its former position (line 8, under $t_8$).

On line 9 the sum-voltage which occurs on the grid of tube 126 (IV 122) has been plotted.

On line 10 the sum-voltage which occurs on the grid of tube 125 has been plotted.

On line 11 the voltage figure of trigger B has been plotted. It is determined by tubes 125 and 126 (lines 10 and 9).

On line 12 the voltage figure which occurs at point 5 of tube IV 110 has been plotted. It is determined by the co-operation of triggers A and B. Wherever the position of the two triggers is not the same, e.g., from $t_3$—$t_4$ and from $t_8$—$t_9$ (lines 8 and 11), a voltage pulse occurs.

On line 13 the sum-voltage which occurs on the grid of the left tube of the fast-indicator III 120 has been plotted. The sum-voltage comprises the voltage from point 5 of IV 110 (line 12) and the voltage from point 1 of the four-divider (line 1). As is evident from the figure this sum-voltage never surpasses the cut-off voltage, hence the fast-indicator is not operated.

On line 14 the sum-voltage which occurs on the grid of the left tube of the slow-indicator III 130 has been plotted. The sum-voltage includes the voltage from point 5 of IV 110 (line 12) and the voltage from point 3 of the four-divider (line 3). As appears from the figure this sum-voltage sometimes exceeds the cut-off voltage, e.g. from $t_3$—$t_4$ and from $t_8$—$t_9$. Then the slow-indicator is operated and the frequency of the 2,400 c./s. divider III 110 is temporarily increased. These factors have been discussed in detail with reference to the transmitter.

On line 15 the sum-voltage which occurs on the grid of tube 164 (III 160) has been plotted. This sum-voltage includes the voltage from point 5 of IV 110 (line 12) and the voltage from point 2 of the four-divider (line 2). As is shown in this figure, the sum-voltage nowhere exceeds the cut-off voltage of the tube. Hence the fault-indicator is not operated.

*Correction of fast synchronization*

Figure 9A:
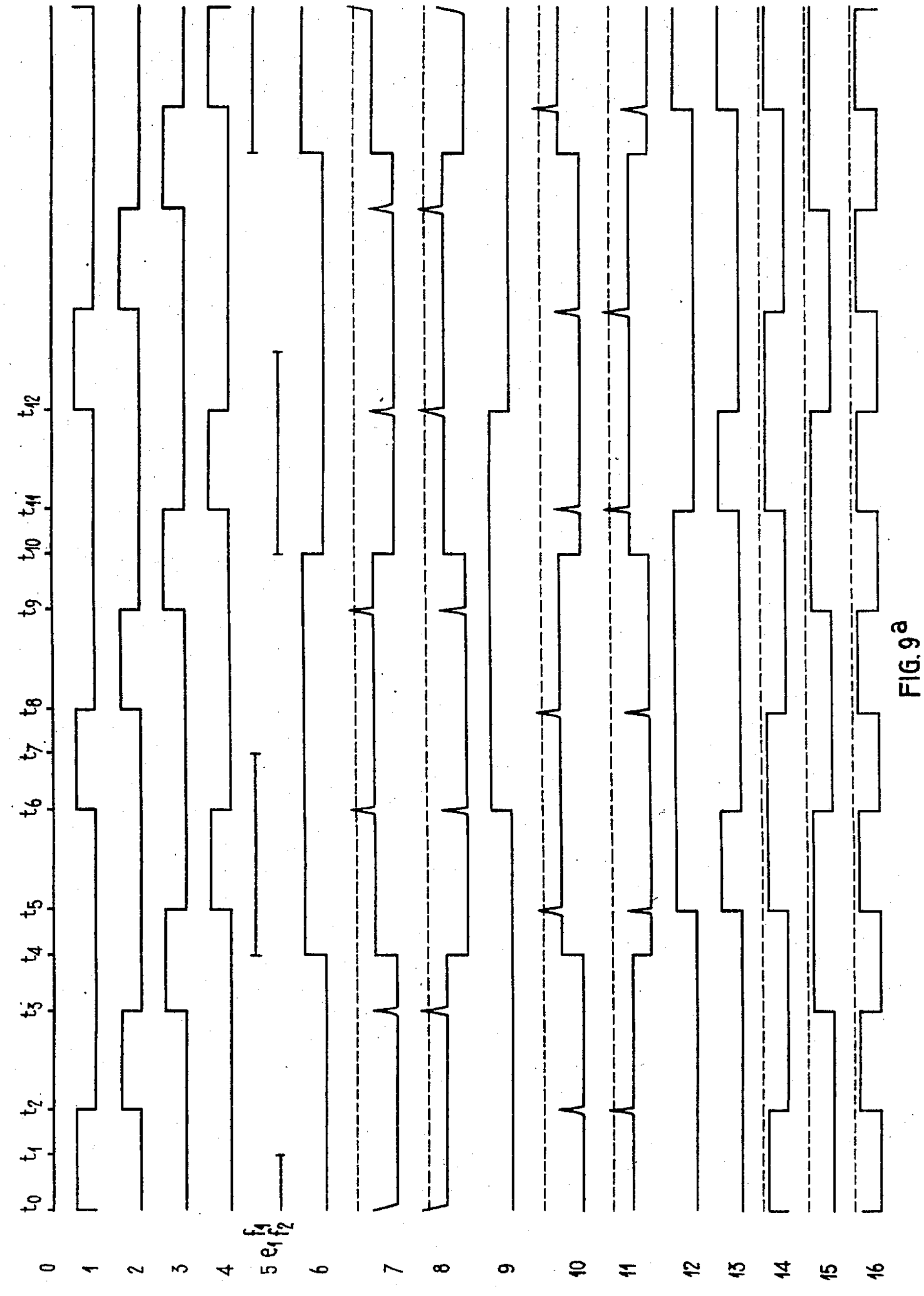
Figure 9C:
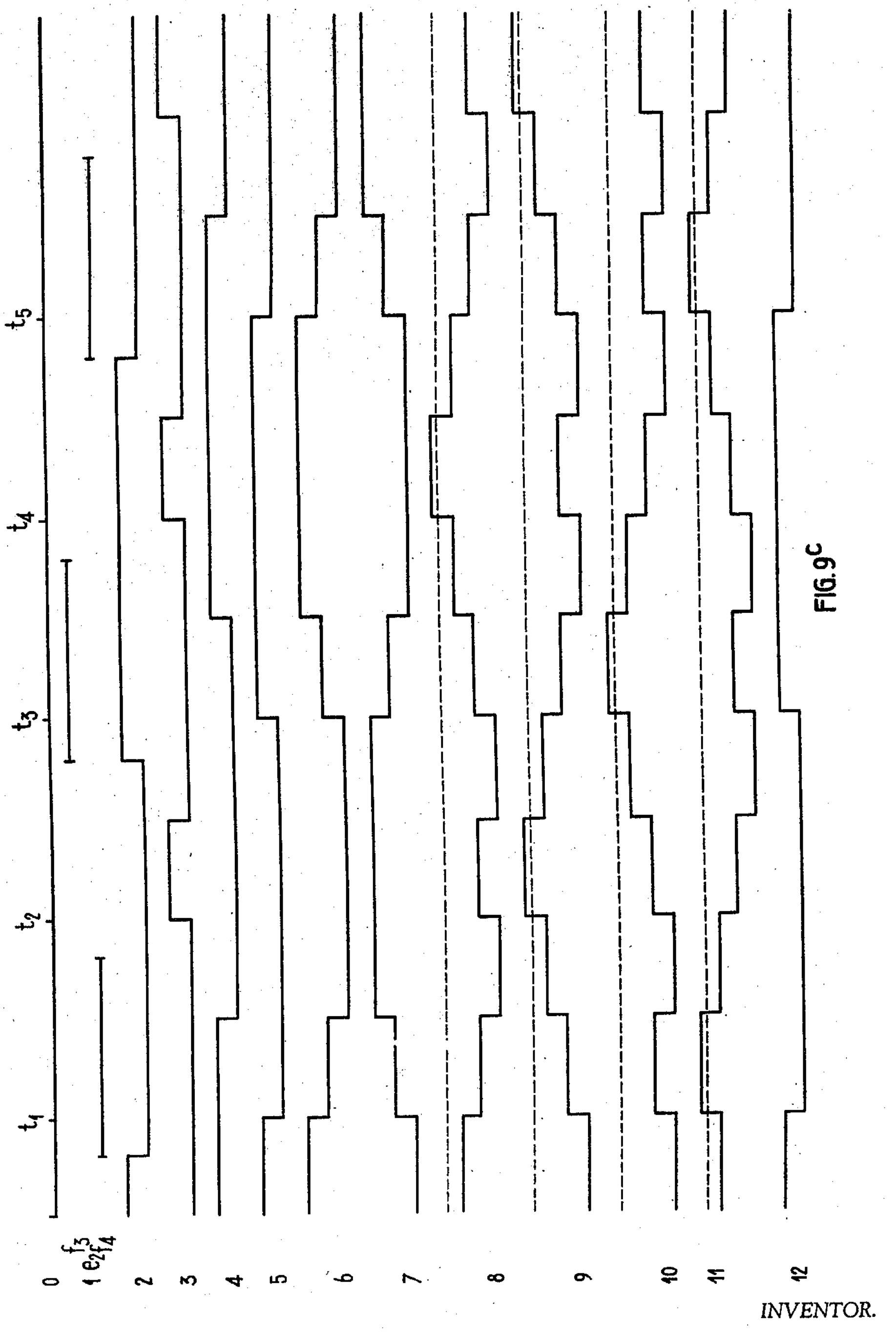
Figure 9D:
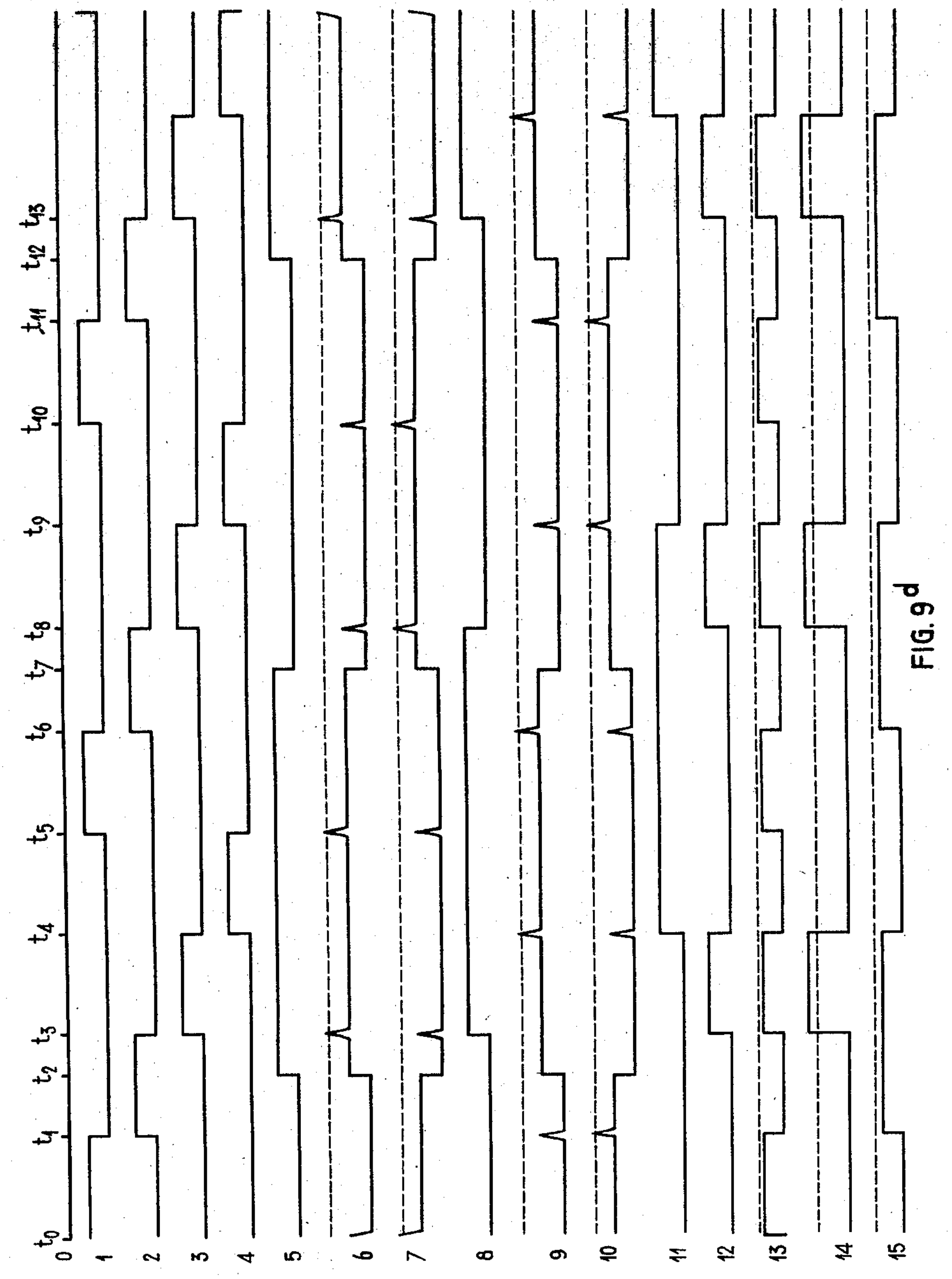
Figure 9E:
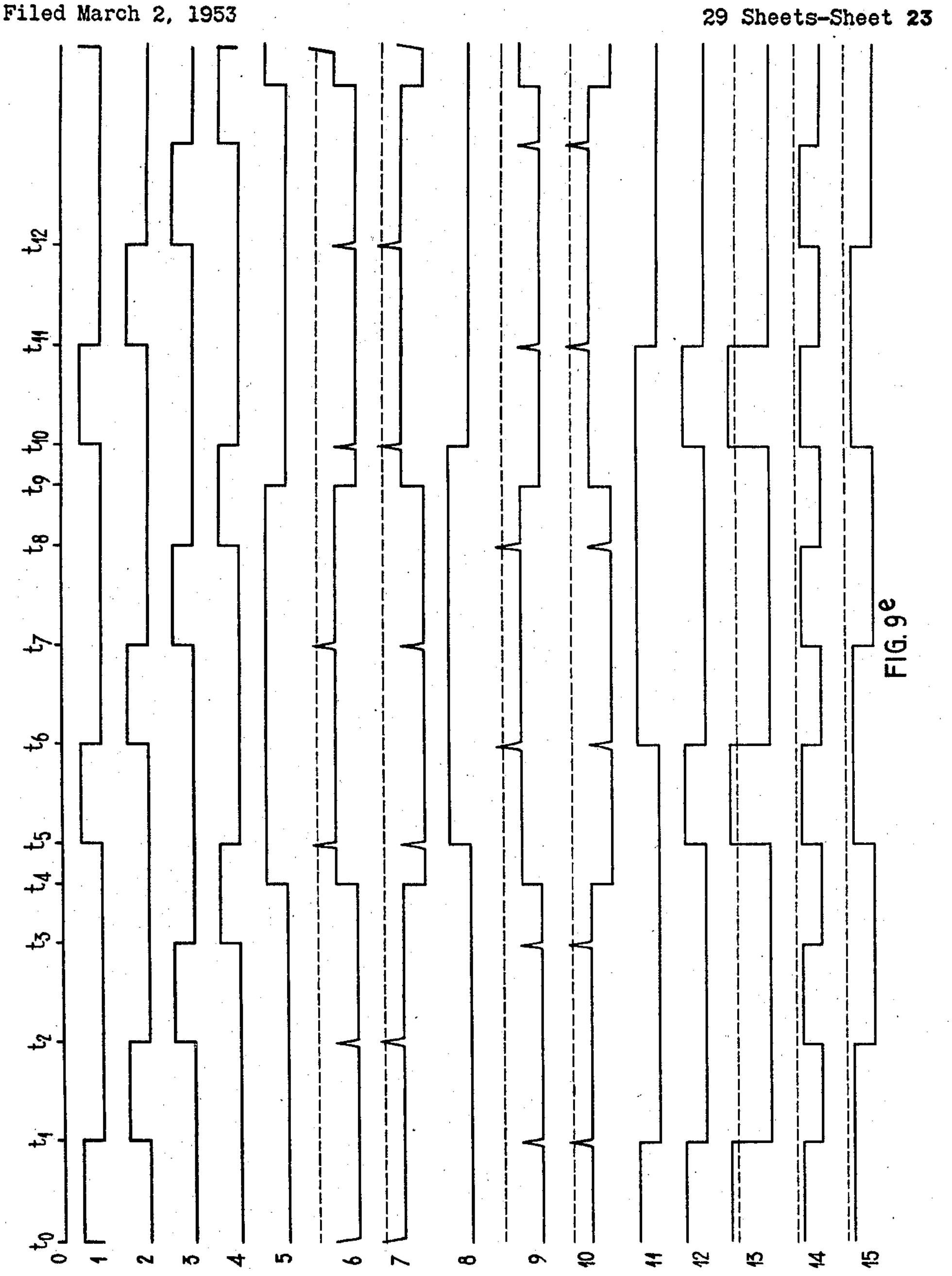

Referring now to Figure 9e, on lines 1–4 the four voltage figures from the four-divider have been plotted. On line 5 the signal which controls the signal-follower has been plotted. From this figure it is evident that the change-over from spacing- to marking-condition here lies under the positive pulse of the fourth flip-flop (154) of the four-divider (III 150) (line 4). When this occurs, the synchronization is fast.

On line 6 the sum-voltage which occurs on the grid of tube 129 (IV 121) has been plotted. On line 7 the sum-voltage which occurs on the grid of tube 128 (IV 121) has been plotted. On line 8 the voltage figure of trigger A has been plotted. It is deduced from lines 6 and 7 in the same manner as in the preceding examples.

On line 9 the sum-voltage which occurs at the grid of tube 126 (IV 122) has been plotted. On line 10 the sum-voltage which occurs at the grid of tube 125 (IV 122) has been plotted. On line 11 the voltage figure of trigger B (deduced from lines 9 and 10) has been plotted.

On line 12 the voltage figure which occurs at point 5 has been plotted. It is determined by the co-operation of triggers A and B (lines 8 and 11). On line 13 the sum voltage which occurs on the grid of the left tube of the fast-indicator (deduced from lines 12 and 1) has been plotted. As is apparent from these figures the sum-voltage at certain moments surpasses the cut-off voltage, e.g., from $t_5$—$t_6$ and from $t_{10}$—$t_{11}$. When this occurs, the fast-indicator is operated, and the frequency of the 2,400 c./s. divider III 110 is temporarily decreased. These factors have been discussed in detail with reference to the transmitter.

On line 14 the sum-voltage which occurs on the grid of the left tube of the slow-indicator has been plotted. It is clear from the figure that the slow-indicator is not operated. On line 15 the sum-voltage which occurs at the grid of tube 164 (deduced from lines 12 and 2) has been plotted. As is evident from this figure the sum-voltage nowhere surpasses the cut-off voltage of the tube, and the fault-indicator is consequently not operated.

*Faulty synchronization*

Figure 9F:
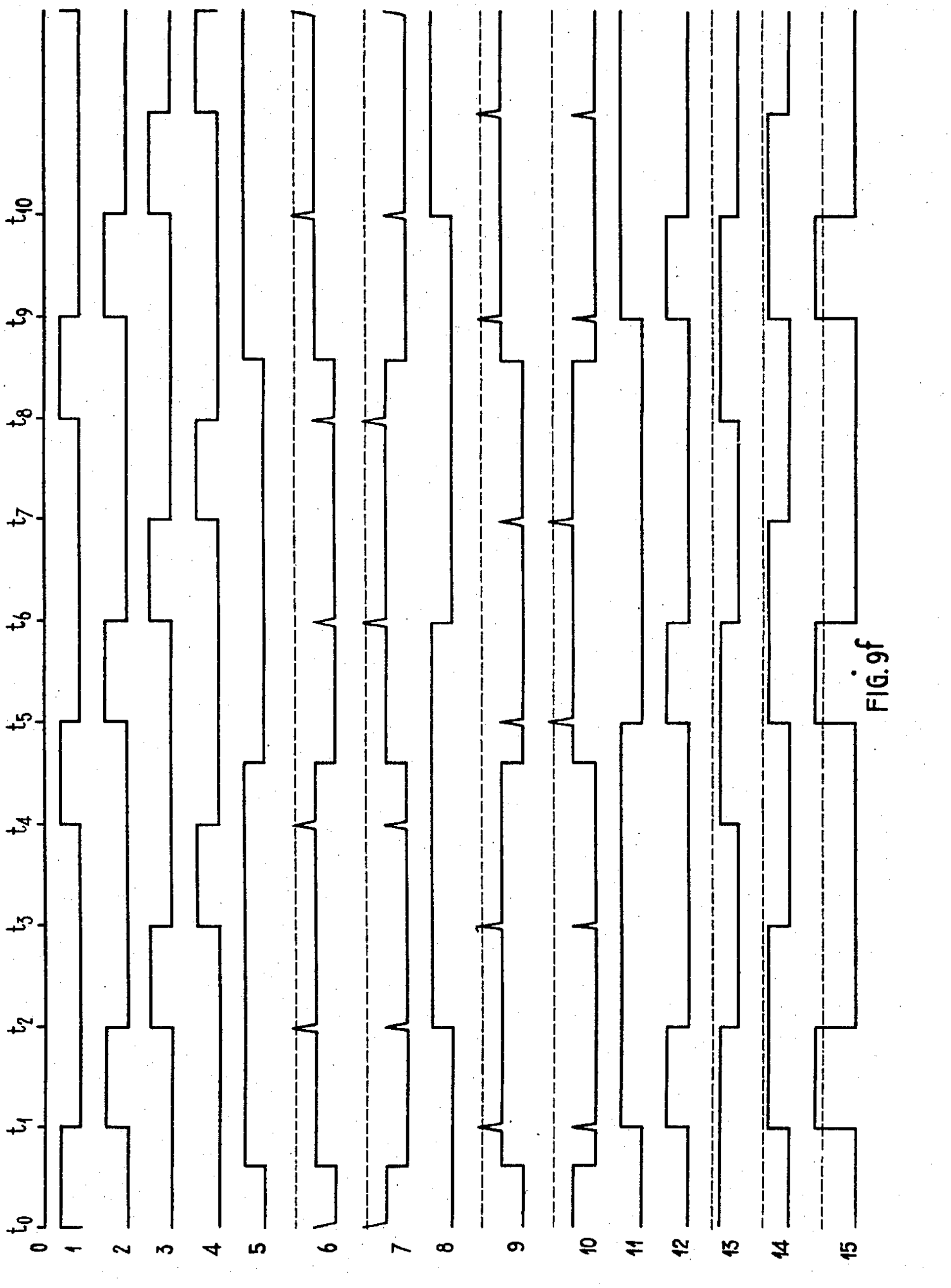
Figure 10A:
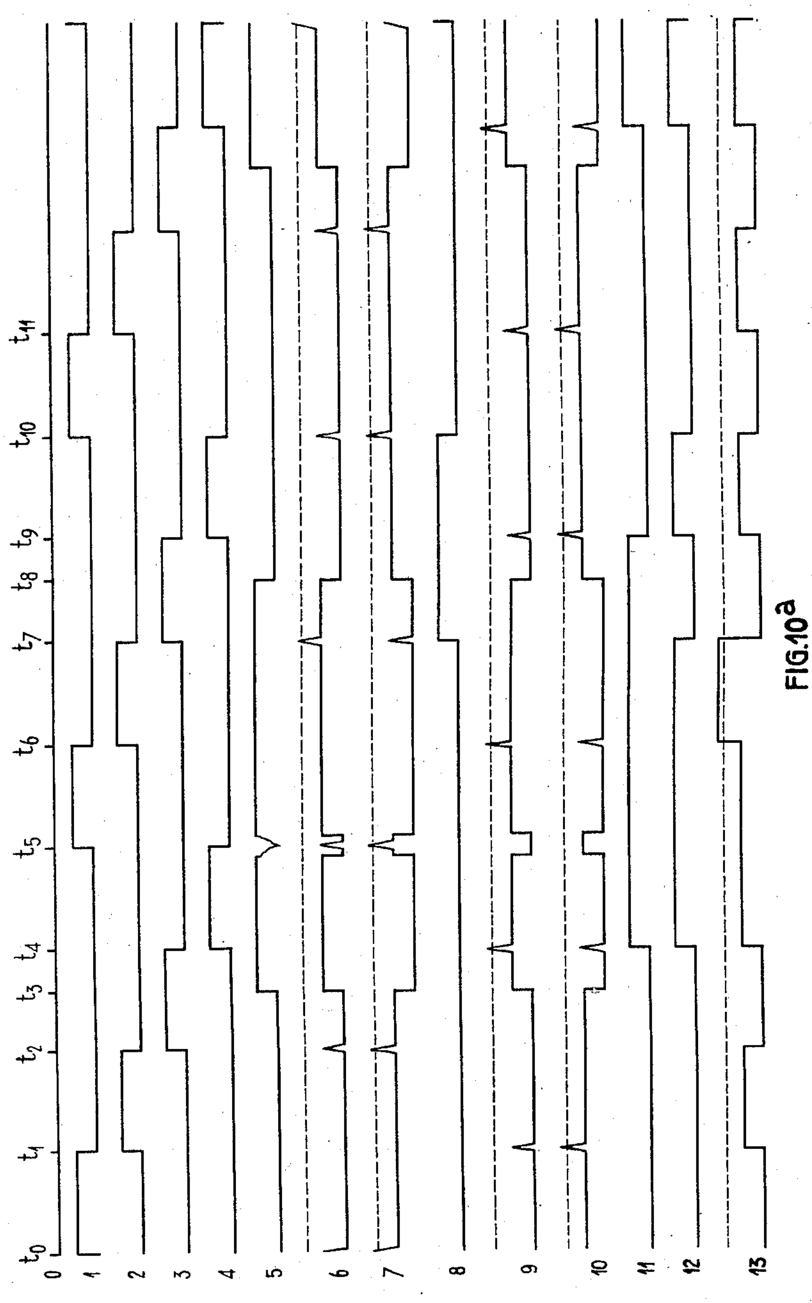
Figure 10B:
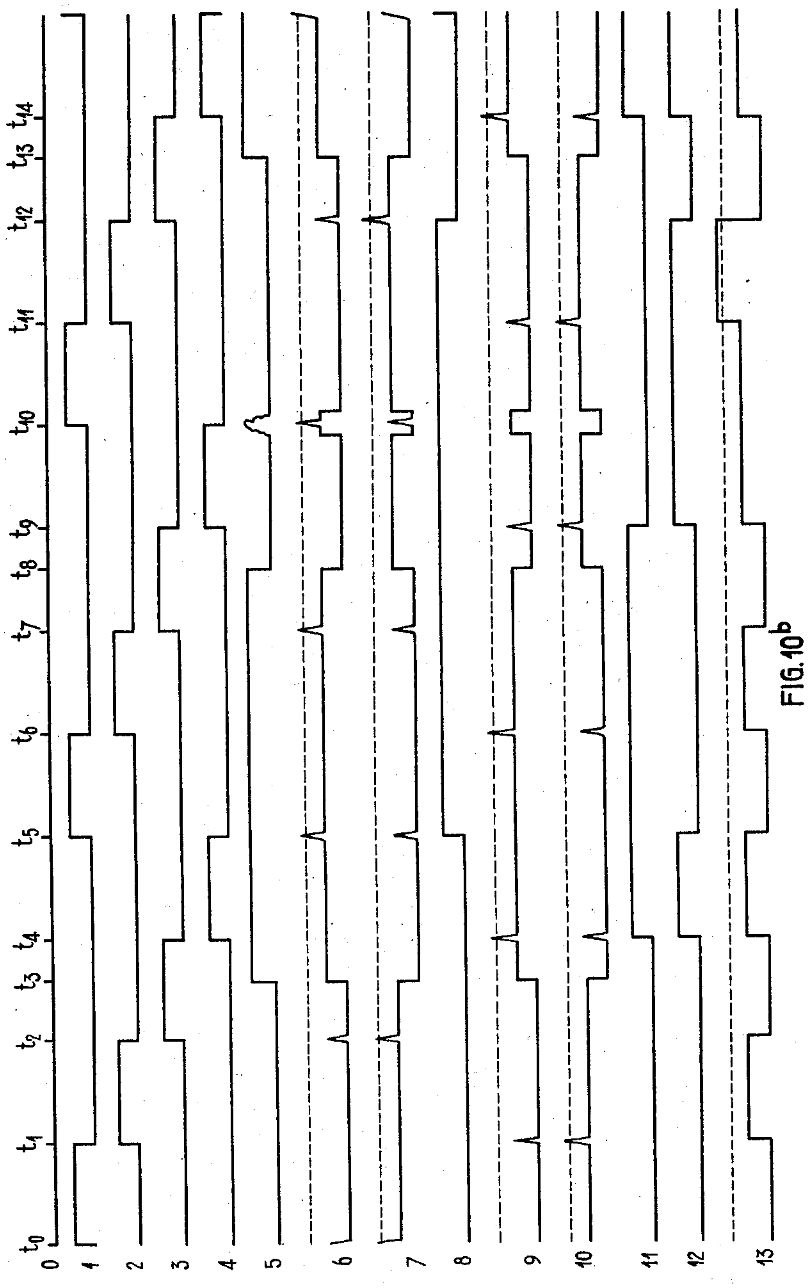
Figure 10C:
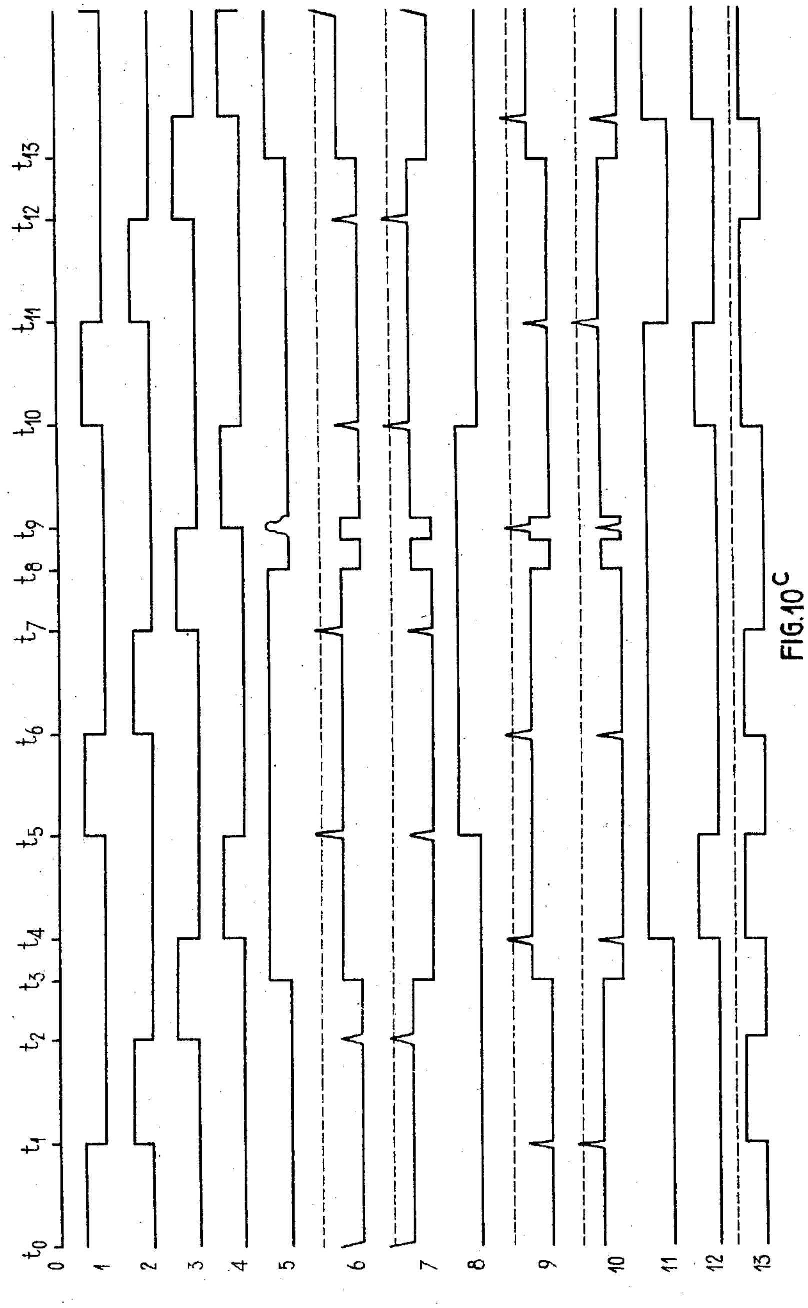
Figure 10D:
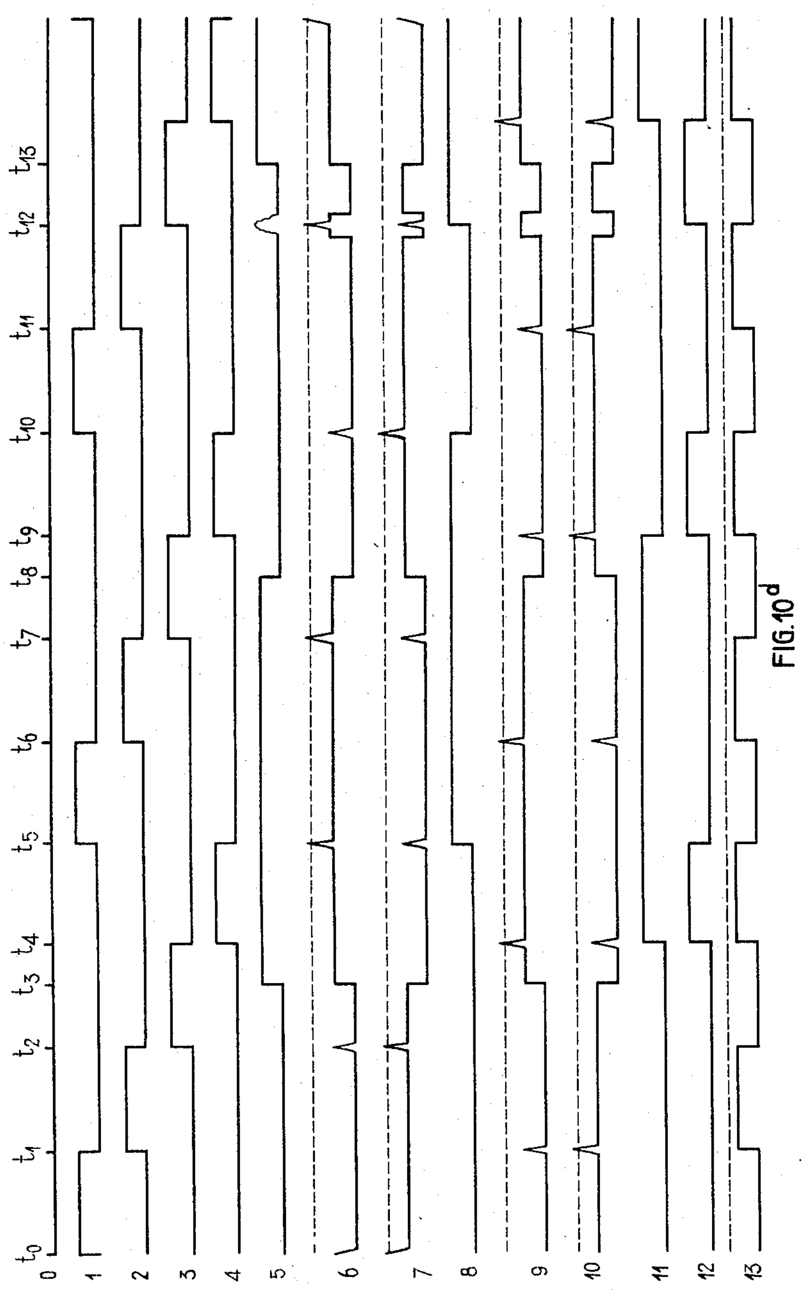
Figure 10E:
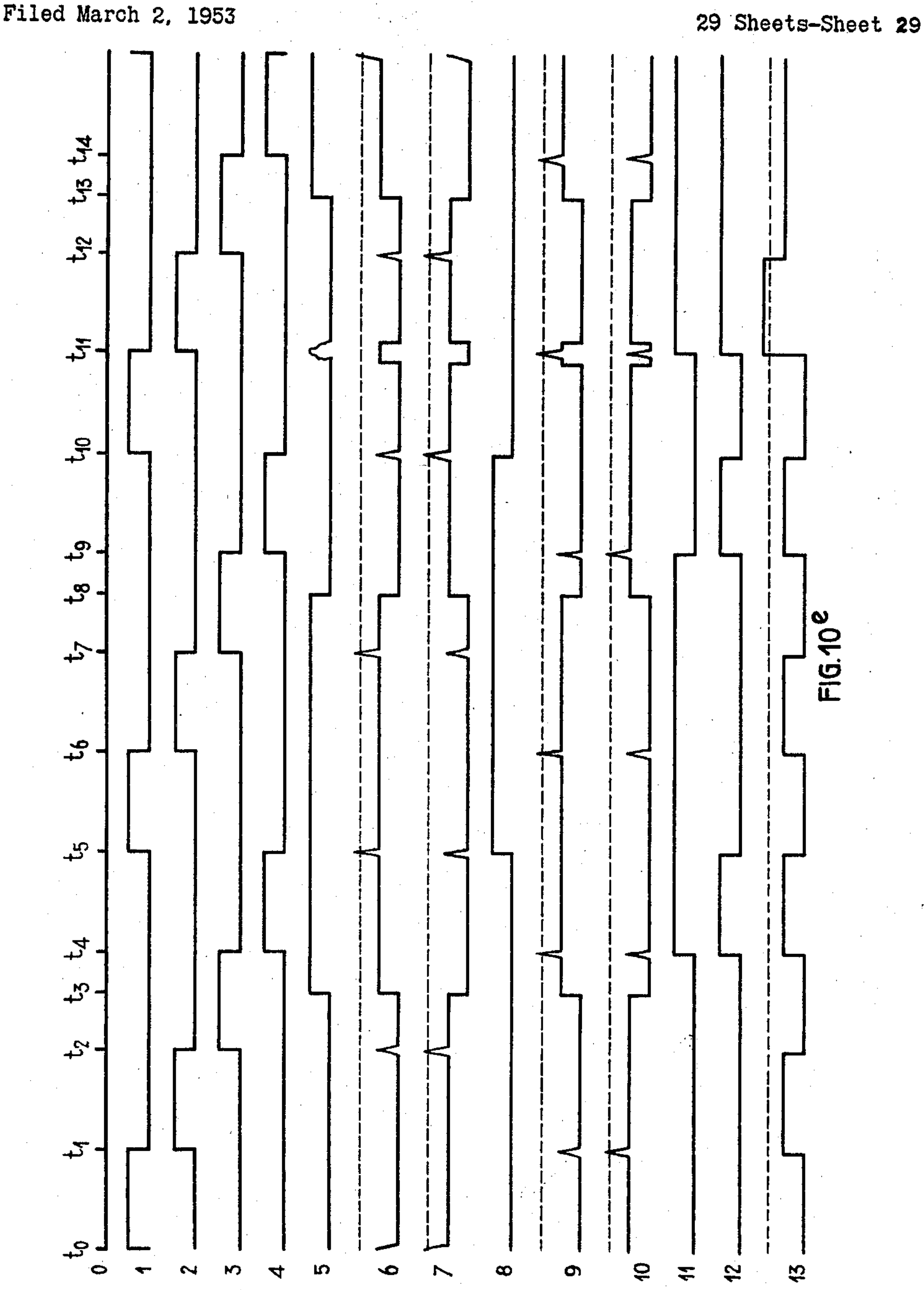

Referring now to Figure 9f, on lines 1–4 the four voltage figures from the four-divider have been plotted. On line 5 the signal which controls the signal-follower has been plotted. From this figure it is clear that the change-over from spacing- to marking-condition lies under the positive pulse of the first flip-flop (151, line 1) of the four-divider (III 150). Under these conditions, the synchronization is faulty.

On line 6 the sum-voltage which occurs on the grid of tube 129 (IV 121) has been plotted. On line 7 the sum-voltage which occurs on the grid of tube 128 (IV 121) has been plotted. On line 8 the voltage figure of trigger A, which is deduced from lines 6 and 7, has been plotted.

On line 9 the sum-voltage which occurs at the grid of tube 126 (IV 122) has been plotted. On line 10 the sum-voltage which occurs on the grid of tube 125 (IV 122) has been plotted. On line 11 the voltage figure of the trigger B (deduced from lines 9 and 10) has been plotted.

On line 12 the voltage figure which occurs at the point 5 in IV 110 has been plotted. It is determined by the co-operation of the triggers A and B (lines 8 and 11). On line 13 has been plotted the sum of the voltages which occur on the grid of the left tube of the fast indicator (deduced from lines 12 and 1). As shown in the figure, the sum-voltage nowhere surpasses the cut-off voltage, hence the fast indicator is not operated.

On line 14 the sum-voltage which occurs on the grid of the left tube of the slow indicator has been plotted (deduced from lines 12 and 3). As shown by the figure, the slow indicator is not operated.

On line 15 has been plotted the sum-voltage which occurs on the grid of the left tube of the fault indicator (deduced from lines 12 and 2). As is evident from the figure, the sum-voltage surpasses the cut-off voltage at various times e.g., from $t_1$—$t_2$ and from $t_5$—$t_6$. Then the fault indicator is operated, tube 164 becomes conductive, therefore its anode potential drops, hence the grid voltage of the right tube of 161 drops, hence this tube becomes non-conductive, hence its anode voltage rises as does the voltage at the point 11, and a marking element is transmitted.

Operation of the slow indicator or the fast indicator causes the synchronization to be corrected through a temporary modification of the frequency of the 2,400 c./s. divider (III 110), until synchronization is again correct. When the fault indicator operates, this correction is not attained automatically. Accordingly, if the signal is in faulty condition prior to synchronization, uninterrupted marking pulses are produced. These pulses operate the signal correction device, the repetition device consequently being operated, as the signal correction device does not effect the correction by itself, but because of its warning, switch 171 of the initial correction circuit will be closed until the synchronization is again in the correct position. Normally this fault correction does not occur in this manner under operating conditions, the signal then having values within the extreme limits slow and fast.

The fault indication may operate, however, when a transmission is commenced, because the signal will then be comprised in the fault indication procedure. The push button 171 is pressed down until the receiver is in the right pace. As shown in Figure 3, the pushing of push button 171 influences the frequency of the 2,400 c./s. divider III 110 across tube arrangement III 170, as long as the push button is pressed down.

In the preceding sections the fault indication has been discussed as it occurred in connection with the synchronization of the signal, and it has also been shown that due to operation of the fault indicator the synchronization is not automatically reinstituted. However, it is not the only task of the fault indicator to give indications as to synchronization and, as pointed out previously, the fault indicator will not operate in the said manner under normal operating conditions. The prime function of the fault indicator lies in another field, namely in that of fault indication in the event a signal is received in multilated condition.

Before proceeding to a description of the fault indicator's prime function, the following should be noted. In the transmitter the signal is scanned by means of three pulses from the three-divider. Thus it is possible to obtain three types of information relative to the signal, namely: 1st indication: correct; 2nd indication: slow; and 3rd indication: fast. In the receiver equipment it is desirable to have an indication of signal multilation, in addition to the other three indications. This fourth indication requires the scanning of the signal by means of four pulses and thus a four-divider is provided in the receiver. It might happen that a signal element may be mutilated by a disturbing factor at the moment of scanning, that a marking element might be recorded as a spacing element or a spacing element as a marking element. If, in one complete signal, one element should be wrongly recorded due to mutilation, the fixed ratio of the number of marking and spacing elements would be disturbed. In that case the request for a repeat through a repetition device would be automatically made. But if in one signal two elements would be so mutilated that a marking element was recorded as a spacing element and a spacing element recorded as a marking element, the proper ratio of the number of marking and spacing elements would continue to exist, but the recorded signal would not be the right one. So-called transposition would then occur. In order to prevent such transposition the fault indication has been incorporated in the receiver.

*Transimssion disturbances*

Referring now to Figure $10^a$, the signal shown is good prior to synchronization but is mutilated due to a disturbance on the transmission route. On line 0 a time division has been indicated. On lines 1—4 the voltages of the four-divider have been plotted. On line 5 the signal has been indicated. At the time $t_5$, the moment when the signal is scanned by the first flip-flop of the four-divider, the signal (a marking element) is mutilated. Had no fault indicator been incorporated a spacing element would be recorded. As will be shown hereafter, the fault-indicator is operated and due to its operation a marking element is nevertheless recorded.

On line 6 the sum-voltage which occurs on the grid of tube 129 of trigger IV 121 has been plotted. On line 7 the sum-voltage which occurs on the grid of tube 128 of trigger IV 121 has been plotted. On line 8 the position of trigger A (Tr*A*) has been plotted. It is deduced from lines 6 and 7.

On line 9 the sum-voltage which occurs at the grid of tube 126 of trigger IV 122 has been plotted. On line 10 the sum-voltage which occurs on the grid of tube 125 of trigger IV 122 has been plotted. On line 11 the position of trigger B (Tr*B*) has been plotted. It is deduced from lines 9 and 10.

On line 12 the voltage which occurs at point 5 of tube-combination IV 110 has been plotted. It is deduced from the positions of the two triggers (lines 8 and 11). On line 13 the sum-voltage which occurs on the grid of tube 164 (III 160) of the fault-indicator has been plotted. As shown in line 13, the fault-indicator is operated from $t_6$—$t_7$ and thus a marking element is issued, as has been explained before.

Due to the mutilation the marking element would be recorded as a spacing element in the absence of a fault indication device. Due to the operation of the fault indicator the marking element, however, is recorded as a marking element and if no further mutilations of the signal occur, the proper ratio of the number of marking and spacing elements continues to exist. If in the same signal a spacing element is mutilated as well, it is registered as a marking element due to operation of the fault indicator. But when this occurs, the fixed mark/space ratio is disturbed, and the "request for repetition" device is operated in a manner well known and understood in the art. Hence transpositions are no longer possible.

Referring now to Figure $10^b$, on line 0 a time division has been indicated. On lines 1—4 the voltages from the four-divider have been plotted. On line 5 the signal has been indicated as mutilated at the time $t_{10}$.

On line 6 the sum-voltage that occurs on the grid of tube 129 has been plotted. On line 7 the sum-voltage which occurs on the grid of tube 128 has been plotted. On line 8 the position of trigger A has been plotted. It is deduced from lines 6 and 7.

On line 9 the sum-voltage that occurs in the grid of tube 126 has been plotted. On line 10 the sum-voltage which occurs on the grid of tube 125 has been plotted. On line 11 the position of trigger B has been plotted. It is deduced from lines 9 and 10.

On line 12 the voltage that occurs at point 5 of tube combination IV 110 has been plotted. It is deduced from the positions of the two triggers (lines 8 and 11). On line 13 has been plotted the sum voltage which occurs on the grid of tube 164 of the fault-indicator. As there shown the fault indicator is operated from $t_{11}$—$t_{12}$, and hence a marking element is issued.

In Figures $10^c$ and $10^d$ has been illustrated what occurs if the signal is mutilated directly after the change-over from marking to spacing condition (Fig. $10^c$, line 5, at time $t_9$) and immediately prior to the change-over from spacing to marking condition (Fig. $10^d$, line 5, at time $t_{12}$). The fault indicator is then not operated and the remaining part of the marking element, from $t_9$—$t_{13}$, Fig. $10^c$, and from $t_8$—$t_{12}$, Fig. $10^d$, is then sufficient to record the spacing element as a spacing element.

In Fig. $10^e$ what happens if the signal is mutilated at the time $t_{11}$ has been indicated. As shown in the figure, the fault correction operates from $t_{11}$—$t_{12}$, and thus a marking element is issued, whereby the fixed mark/space ratio is disturbed and the repetition device is in turn operated. The orientation and significance of the lines of Figures $10^c$, $10^d$, and $10^e$ are the same as those of $10^a$ and $10^b$, and after the detailed description of the prior illustrations, Figures $10^c$, $10^d$, and $10^e$ are self-explanatory.

Tube 165 has been included in the fault indication equipment. It is controlled by the second receiver. Point 8 in the grid of this tube is controlled by the voltage pulse from point 8 of the tube arrangement IV 110. Here point 8 (from receiver II, not separately drawn) has the same function as point 5 in receiver I. Also coupled to the grid of tube 165 is the voltage pulse from point 4 of the four-divider. If a signal arrives in the second receiver in a mutilated condition, the receiver influences the fault-indicator via tube 165, and every time the latter is operated a marking element is supplied. The receiver also includes a device (IV 130) by means of which trigger V 10 (Fig. 5) is always returned to the same position at a certain moment; here it is the spacing position. This is effected in receiver I with the aid of the 3rd flip-flop of the four-divider and in receiver II also with the aid of the first flip-flop of the four-divider.

In Fig. 4, tube 131 of IV 130 is normally in the non-conductive condition, tube 132 is normally in the conductive condition, and tube 133 is normally in the non-conductive condition. In Fig. 5, tube 12 of V 10 is normally in the non-conductive condition and tube 13 is normally in the conductive condition. The trigger (T*r*) from this figure (Fig. 5) has been coupled between the frequency-shift-adapter (FSA I, resp. II) and the Signal Follower (SF I, resp. II), shown in Fig. $1^c$.

When a marking element arrives from the FSA, the voltage on the grid of tube 12 of trigger V 10 rises, hence this tube changes over from the non-conductive condition to the conductive condition and hence tube 13 is modified from the conductive to the non-conductive condition. Due to the changeover to the conductive condition of tube 12, its anode potential drops, consequently the voltage at point P (Fig. 5) drops, and therefore, the voltage at the corresponding point P of the signal follower IV 120 (Fig. 4) drops, and the latter signal follower is changed over to the marking position.

When a spacing element arrives from the FSA, the grid voltage of tube 12 drops and tube 12 changes over to the non-conductive condition, and hence tube 13 is changed over to the conductive condition. Due to the change-over of tube 12 to the non-conductive condition, its anode voltage rises and so does the voltage at point P, hence the voltage at the corresponding point P of the signal follower IV 120 rises and the latter signal follower changes over to the spacing position. Further, the trigger V 10 is controlled at the point Q by a voltage from the corresponding point Q of the tube arrangement IV 130 (Fig. 4).

The tube arrangement IV 130 is controlled at the grid of tube 133 by the voltage from the point 3 of the 3rd flip-flop of the four-divider (III 150). Now if a pulse arrives at the grid of tube 133, tube 133 changes over from the non-conductive condition to the conductive condition, hence its anode voltage drops, hence the grid voltage of tube 131 drops. Because this tube was already non-conductive, the drop in its grid voltage has no further effect.

After some time has elapsed, which time is determined by the RC-time of the condensor-resistance combination in the anode circuit of tube 133 and in the grid of tube 132, the tube arrangement IV 130 returns to its previous position. Thus tube 133 becomes non-conductive again, its anode voltage rises, the grid voltage of tube 131 also rises, and hence tube 131 will be changed over from the non-conductive to the conductive condition. Consequently its anode potential drops and hence the voltage at point Q drops too, and therefore the voltage at the corresponding point Q of V 10 drops, hence the voltage on the grid of tube 12 drops and thus the latter is changed back to the non-conductive condition.

This process is now regularly repeated just before the change-over from spacing to marking condition and also just before the change-over from marking to spacing position. Consequently this circuit arrangement always returns trigger V 10 to its original position (spacing position) at fixed times.

Figure 11:
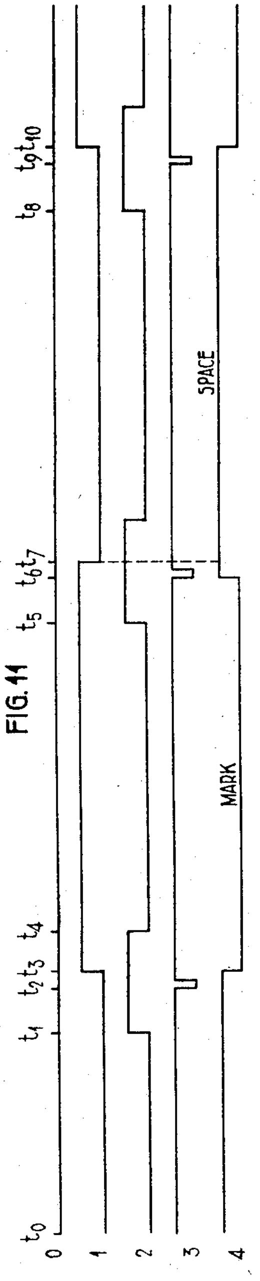

Referring now to Fig. 11, here a time division has been made on line 0. On line 1 the signal has been plotted. On line 2 the voltage at point 3 of the four-divider as it occurs at point 3 of IV 130 has been plotted. On line 3 the voltage at point Q of tube arrangement IV 130 has been plotted. On line 4 the voltage at point P of the tube arrangement V 10 has been plotted.

At the time $t_1$ the pulse of the third flip-flop of the four-divider occurs. Now tube 133 is changed over to the conductive condition, and at point Q nothing happens yet. At the time $t_2$ tube 133 changes back to the non-conductive condition (the time interval $t_1$—$t_2$ is determined by the above-mentioned RC combination). Now a negative voltage pulse occurs at point Q (line 3, under $t_2$). The latter causes the grid voltage of tube 12 of V 10 to drop. Because the incoming spacing element has not yet been discontinued (line 1, under $t_2$) tube 12 is not conductive and thus the voltage drop at the grid of this tube has no effect. At the time $t_3$ the incoming signal is changed over from the spacing to the marking condition, hence the grid voltage of tube 12 rises, hence its anode voltage drops and hence the voltage at point P drops (line 4). At the time $t_5$ a pulse occurs again at point 3 of tube arrangement IV 130 and after the determined RC time a negative pulse follows it at point Q (line 3, under $t_6$). This causes the voltage at point Q of V 10 drop, hence tube 12 is changed over to the non-conductive condition, hence the voltage at point P rises (line 4, under $t_6$). Thus the trigger V 10 is put in the spacing position just before the occurrence of the subsequent signal element. This signal element occurs at the time $t_7$ (line 1, under $t_7$) and it is a spacing element.

If no signal arrives either due to the discontinuation of the traffic or due to the circuit being interrupted, or possibly due to disturbances, this tube arrangement always returns trigger V 10 to the same position (spacing position). This process of returning the equipment to the spacing condition at fixed times prevents the occurrence of transpositions.

See further Fig. 2$^g$, lines 2, 3, 4, and 5, where one after the other have been plotted: the signal from the receiver I (line 2) after treatment by the pulses of the tube arrangement IV 130 of receiver I (line 3), then the signal of receiver II (line 4) after treatment by the pulses of the tube arrangement IV 130 of receiver II (line 5). Before the one eight channel signal leaves the receiver station, it is first modified from a direct-current signal to a voice-frequency signal in a tone keyer (Fig. 1$^c$, TK) and afterwards supplied to the Control Center across a telephone circuit (R*e*).

I claim:

1. In a multiplex telegraph system having a source of "*n*" signal channels and a distributor operative to scan the elements of the signals occurring in each of said "*n*" channels to provide a single composite signal, means for converting said composite signal into an outgoing signal having a plurality of different frequencies appearing therein comprising means for commuting said composite signal into its component parts and coupling the different parts over different ones of a plurality of paths, frequency shift keyer means in each of said paths operative to provide frequency signals representative of the signals which are transmitted thereover, the frequency signals provided in the different paths being different, and means for combining the frequency signal output of said different paths into a single signal for transmission purposes, which transmission signal is comprised of a series of parts derived in a successive manner from the frequency signal in each of the paths the parts being of a substantially reduced time duration relative to their duration in said signal channels.

2. In a multiplex telegraph system having a source of "*n*" signal channels and a distributor operative to scan the elements of the signals occurring in each of said "*n*" channels to provide a single composite signal the parts of which have a duration substantially less than its duration in said signal channels, means for commuting said composite signal into its component parts and transmitting the different parts over different ones of $n/4$ paths, on-off keying means in each of said paths operative to provide frequency different signal parts representative of the signals which are coupled thereover the frequency signals provided in the different paths being different, and means for combining the frequency signal output of said $n/4$ paths into a single transmission signal equivalent in duration to said composite signal comprised of a series of successive frequency signals, the number of different frequencies in the single signal being $n/4$.

3. In a multiplex telegraph system having a source of "*n*" signal channels and a distributor operative to scan the elements of the signals occurring in each of said "*n*" channels to provide a single composite signal, commutator means for commuting the composite signal into component parts and coupling different parts over different ones of a plurality of paths, means in each of said paths operative to provide frequency signals representative of the signals which are transmitted therein including on-off keyer means for providing a given frequency signal for certain signals and no frequency signal for other signals, frequency shift keyer means in each path for providing a frequency signal for each type of signal in said path as provided by said on-off keyer means, the frequencies in the different paths being different, and means for combining the frequency signal output of said paths into a common transmission signal comprised of a series of successive frequency signals.

4. In a multiplex telegraph system having a source of "*n*" signal channels and a distributor operative to scan the signal elements occurring in each of said "*n*" channels to provide a series of composite signals comprised of one signal element from each channel, the portions of the signal representative of the elements of the different channels being of a substantially reduced time duration in the composite signals, means for converting said composite signals into outgoing signals, each of which has a plurality of frequencies appearing therein, comprising means for commuting each composite signal into its component parts and coupling alternate parts over alternate ones of $n/q$ paths, "*q*" being the number of channels which may be reliably scanned by the receiver equipment in a multiplex radio-telegraph system with the occurrence of maximum element prolongation, means in each of said paths operative to provide frequency signals representative of the signals which are transmitted therein, different paths being provided with signals of different frequency values, means for combining the frequency signal output of said $n/q$ paths into a single transmission signal comprised of a series of successive frequency signals; receiver equipment for responding to said single signals, including means for establishing $n/q$ paths, and means for commuting each of said single signals incoming to the receivers into the separate frequency signals for distribution to the $n/q$ paths in a cyclic manner, whereby the signals in each receiving path are separated by a period which is equal to $(n/q-1)$ times the length of each signal appearing therein.

5. In a multiplex telegraph signal having a source of "n" signal channels and a distributor operative to scan the elements of the signals occurring in each of said "n" channels to provide a single composite signal; means for commuting the composite signal into its component parts and for coupling the different parts over different ones of a plurality of paths, means in each of said paths operative to provide frequency change signals representative of the different signal parts which are coupled thereto, the frequency signals for like parts in each path being of like value; means for thereafter mixing the frequency signals in the different paths with a carrier, the carrier in the different paths being different from each other, and means for combining the frequency signal output of said paths into a common signal comprised of a series of successive frequency signals.

6. In a multiplex telegraph system having a source of "n" signal channels and a distributor operative to scan the signals occurring in each of said "n" channels to provide a single composite signal, means for commuting the composite signal into its component parts for coupling in cyclic manner over $n/4$ paths, means in each of said paths operative to provide frequency signals of different values for the signals of different characteristics which are transmitted thereover, the frequency signals for like signals in the different channels being the same; means in each path for transposing the signals therein by combining same with a base frequency, the base frequency for the various paths being of a different value; and means for combining the frequency signal output of said paths into a common transmission signal comprised of 2 $n/4$ frequency signals.

7. In a multiplex telegraph system having a source of "n" signal channels and a distributor operative to scan the signals occurring in each of said "n" channels to provide a single composite signal of a total duration which is equivalent in duration to a signal in one of the "n" channels; a plurality of paths; commutator means for commuting the composite signal into its separate elements and supplying the first element of each signal to the first one of the paths and supplying the successive ones of the elements to the successive paths until each path is used, and then reusing the paths in a cyclic manner, signal converting means in each path for providing frequency signals representative of the signals which are applied thereto, different frequencies being provided in different paths, and means for combining the frequency signal output of said paths into a common transmission signal comprised of a series of successive frequency signals each of which signals is of a duration substantially shorter than its duration in said source signal channels.

8. In a multiplex telegraph system having a source of "n" signal channels and a distributor operative to scan the signals occurring in each of said "n" channels to provide a single composite signal, each composite signal being of a time duration which is equivalent to a single signal in one of said "n" channels; means for transposing the composite signal into an outgoing signal having a plurality of frequencies appearing therein comprising signal follower means for commuting the composite signal into its component parts and coupling the successive parts over alternate ones of a plurality of paths including gate means for converting each signal part into a voice frequency signal which is of a time duration as applied to a path which is at least two times that of its duration in the composite signal, frequency shift keyer means in each of said paths operative to provide frequency signals representative of the signals applied to the path which are equal in duration to the path signal, frequency mixer means in each path for transposing the frequency signal to different values, the new frequency values for the various paths being different; means for reducing the frequency signals as generated to a time duration which is substantially less than that of its path value, and means for combining the frequency signal output of said paths in an alternating manner into a common transmission signal for transmission purposes having a duration equivalent to said composite signal.

9. In a multiplex telegraph system having a source of eight signal channels and a distributor operative to scan the signals occurring in each of said eight channels to provide a single composite signal, each composite signal being of a time duration which is equivalent to a single signal in one of the eight channels; signal follower means for commuting the eight channel signal into two four-channel signals by separating each eight-channel signal into its component parts and coupling the successive parts over two paths in an alternating manner, including means for converting each signal part into a frequency signal having a time duration at least twice that of its duration in the composite signal; frequency shift means in each of said paths operative to transpose the frequency signals in the two paths into frequency signals of different values comprising frequency shift oscillators for each path adapted to add a base frequency of different value to the signals in the different paths; means for reducing the frequency signals to a time value which is at least one half that of its value in the path, and combining the frequency signal output of said paths into a common signal for transmission purposes.

10. In a multiplex telegraph system having a source of "n" signal channels and a distributor operative to scan the signals occurring in each of said "n" channels to provide a single composite signal, each of the composite signals being of a time duration which is equivalent to a single signal in one of said "n" channels; means for converting said composite signal into an outgoing signal having a plurality of frequencies appearing therein comprising means for commuting the composite signal into its component parts and coupling the successive parts over $n/4$ paths; means for converting each signal to a frequency signal of a time duration $n/4$ times that of its duration in the composite signal as applied to its assigned path; means for reducing the representative frequency signals to a time value which is one half that of its generated value, including means for combining the shortened frequency signals of said paths into a single signal which is comprised of a series of frequency signals derived from said $n/4$ paths in a successive alternate manner different paths having different frequencies; and receiving means for scanning said single signal and assigning the successive parts thereof to different ones of the $n/4$ paths, whereby a time period of $(n/4-1)$ is introduced between the elements in the common signal which are derived and fed to any one of the paths.

11. In a multiplex telegraph system having a source of "n" signal channels and a distributor operative to scan the signals occurring in each of said "n" channels to provide a single composite signal; means for converting said composite signal into an outgoing signal having a plurality of frequencies appearing therein comprising signal follower means for commuting the composite signal into its component parts; means for coupling the successive parts of the signal over different ones of a plurality of paths until each path has been used and then reusing the paths in a like manner, the signals in different paths being converted into signals of different frequencies; and signal converting means for converting each signal for each path to a time duration substantially greater than that of its duration in the composite signal comprising at least one multivibrator set for each path, each of which sets is operable between several signal generating positions in accordance with the nature of the signal applied thereto, and means for controlling each multivibrator in a path to maintain its assumed position following termination of an input signal thereto until such time as a succeeding signal is applied to the set by the cyclically operated means, whereby the signal in a path has a time duration equivalent to the number of paths times its duration in the composite signal.

12. An arrangement as set forth in claim 11 in which the signal elements in the "n" channels are 7⅔ ms. in length and the corresponding elements in the composite signal are 35/12 ms. in length, and said signal converting means includes means for elongating the signals for each path to a length of 35/6 ms.

13. In a multiplex telegraph system having a source of "n" signal channels and a distributor operative to scan the signals occurring in each of said "n" channels to provide a single composite signal; means for commuting the composite signal into its component parts and transmitting the different parts over different ones of a plurality of paths comprising signal follower means operative to provide representations of the different elements as received, gate means comprising at least one signal marking set for each path, each of which has several signal generating positions, and common control means for controlling the marking sets for the different paths comprising a signal conditioning set operative to prepare each gate for use at the prospective time of receipt of its assigned signal, means for connecting the signal output of said signal follower to the gates, and gate tripping means operative to supply a tripping signal to the proper gate at the time the conditioning signal and the assigned incoming signal are applied thereto.

14. In a multiplex telegraph system having a source of "n" signal channels and a distributor operative to scan the signals occurring in each of said "n" channels to provide a single composite signal; means for converting said composite signal into an outgoing signal having a plurality of frequencies appearing therein comprising signal follower means for commuting the composite signal into its component parts and coupling each of the successive parts of the signal over different ones of a plurality of paths until each path has been used, and then reusing the paths in cyclic manner, the signals in different paths being converted into signals of different frequencies gate means for converting each signal in each path to a time duration which is equal to the number of paths times its duration in the composite signal comprising a frequency generator set, a trigger set for each path operative between two stable positions, and an equilibrium repeater stage for each path controlled to connect the output of the frequency generator set to its associate path with operation of its associated trigger to one position and to disconnect same therefrom when the trigger for its path is operated to the other one of its positions.

15. An arrangement as set forth in claim 14 in which the trigger set for a path is shifted from one operating position to another only responsive to the simultaneous receipt of a conditioning pulse, an incoming signal pulse and a triggering pulse.

16. In a multiplex telegraphy system in which the successive elements of an incoming signal are transmitted over different ones of each of a plurality of paths which are arranged for use in a cyclic manner; gate means for each path for applying the assigned signals to its associated path comprising gate control means including a first pulse generator means operative to generate pulses for conditioning each gate for operation during the particular period that an incoming signal is to be applied to its associated path, signal follower means for supplying a signal representative of the incoming signal to each of said gates, and a second pulse generating means operative to supply a tripping pulse to the particular gate means be rendered effective at the time during the period that the incoming signal representation and the gate conditioning signal are supplied thereto, the conditioning pulse, the representative signal pulse, and the tripping pulse being insufficient in value to trip a gate in any combination thereof which is less than the summated value of the three pulses.

17. An arrangement as set forth in claim 16 in which the means for generating the conditioning pulse, the representative signal pulse and the tripping pulse provide pulses which are insufficient in value to trip a gate in any combination thereof which is less than all three pulses.

18. In a multiplex telegraphy system in which the successive elements of an incoming signal are to be transmitted over a different one of each of a plurality of paths until each path is used, and in which the paths are reused in like manner as successive elements are received; gate means for applying the different signals to their assigned paths comprising gate control means including a first pulse generator means operative to generate pulses for conditioning each gate for operation during the particular period that an incoming signal is to be applied to its associated path; signal follower means for supplying a signal representative of the incoming signal to each of said gates; a second pulse generating means operative to supply a tripping pulse to the particular gate means to be rendered effective at the time during the period that the incoming signal representation and the gate conditioning signal are supplied thereto; and means for extending synchronizing impulses from the second pulse generating means to the first generator means.

19. An arrangement as set forth in claim 18 in which said system includes two paths, each of which has an individual gate set for applying the alternate impulses of the composite signal to the paths in an alternate manner, and in which said first pulse generating means comprises a stable multivibrator set operable between two positions responsive to receipt of timed impulses from said second impulse generator set, and two output circuits for said multivibrator connected to said two gates, one of said circuits being operative to condition one gate as the multivibrator is in one position and the other circuit being operative to condition the other gate as the multivibrator is in the other position.

20. An arrangement as set forth in claim 18 in which the second impulse generating means includes means for generating at least two nonconcurrent impulse sets, and means for connecting one of said sets to said first generator means to synchronize the operation of the two units, and means for connecting the other of said sets to said gate means as tripping impulses.

21. In a multiplex telegraphy system in which the successive elements of an incoming signal are to be transmitted over a different one of each of a plurality of paths until each path is used, and in which the paths are reused in like manner as successive elements are received; gate means for applying the different signals to their assigned paths comprising gate control means including a first pulse generator means operative to generate pulses for conditioning each gate for operation during the particular period that an incoming signal is to be applied to its associated path; signal follower means for supplying a signal representative of the incoming signal to each of said gates, a second pulse generating means operative to supply a tripping pulse to the gate means associated with the assigned path for the incoming signal concurrent with the application of the incoming signal representation and the gate conditioning signal thereto, synchronizing means for transmitting synchronizing pulses to said second pulse generating means, and means in said second pulse generating means for transmitting synchronizing pulses to said signal follower, said first pulse generating means and said gate means.

22. In a multiplex telegraphy system in which the successive elements of an incoming signal are to be transmitted over a different one of each of a plurality of paths until each path is used and in which the paths are reassigned for use with receipt of the successive elements; gate means for controlling application of the signals to their assigned paths including gate control means comprising signal follower means for supplying a signal to each of said gates which is representative of and of equal duration with the incoming signal; a first pulse generator means operative to generate pulses for conditioning each gate for operation during the particular period that an incoming signal is to be applied to its associated path, the duration of the conditioning pulse being equivalent to the length of the signal incoming to the gate; a second pulse generating means operative to generate a tripping pulse of a duration which is substantially less than said incoming signal and said conditioning signal; and means for differentiating said tripping pulse and supplying same to the particular gate means to be rendered effective at least once during the period that the incoming signal representation and the gate conditioning signal are supplied thereto.

23. An arrangement as set forth in claim 22 in which said first pulse generator comprises a monostable generator which is operative between two conditions, and in which the second generator means includes means operative to generate a second impulse set for controlling shifting of the first pulse generator between its two positions, the equipment being adjusted when in synchronization to effect shifting of the first pulse generator concurrently with the initiation of receipt of an incoming impulse.

24. In a multiplex telegraphy system in which the successive elements of an incoming composite signal are to be transmitted over a different one of each of a plurality of paths until each path is used, and in which the paths are reassigned for use with receipt of the further elements; gate means for each of said paths operative to apply each signal as received to its assigned path including gate control means comprising signal follower means for supplying a signal representative of the incoming signal to each of said gates; a first pulse generator means operative to generate pulses for conditioning each gate for operation during the particular period that an incoming signal is to be applied to its associated path; a second pulse generating means including means operative to supply a tripping pulse to the particular gate means to be rendered effective at the time, and means operative to transmit operating impulses to said first impulse generating means; and signal forming means for scanning the output sides of said paths in sequence and providing a composite signal therefrom controlled in its operation by said first pulse generating means.

25. An arrangement as set forth in claim 24 in which said outgoing gating means includes timing means operative to scan said signals in said paths for a period which is sufficient to provide a composite signal having elements which are of a length comparable to that of the elements in the incoming composite signal.

26. In a multiplex telegraphy system, a signal input path, an output path, a plurality of trigger means, each of which is operative between different positions to indicate the time of changeover between successive incoming signals, signal follower means connected to said input path operative responsive to signals appearing in said input path to effect the repetition of same over the outgoing path, and simultaneously to extend same to said signal trigger means; and synchronizing means including pulse generator means operative to transmit a tripping pulse to the different triggers at different predetermined time periods, and means associated with each trigger for controlling tripping of the trigger to indicate the time of changeover of the impulses in the incoming path only responsive to the concurrent receipt of the new incoming signal and a tripping pulse.

27. In a multiplex telegraphy system, a signal input path, an output path, a plurality of trigger means, each of which is operative between different positions to indicate the time of changing between successive incoming signals; signal follower means connected to said input path operative to effect repetition of incoming signals over the outgoing path, and to also extend same to said trigger means; synchronizing means including pulse generator means operative to generate a tripping pulse for the different triggers at different predetermined time periods, each of said tripping pulses being generated for a given time duration; means associated with each trigger for controlling tripping of the trigger to indicate the changeover impulse in the incoming path only responsive to receipt of the incoming signal and a tripping pulse during a contemporaneous period, said system being in synchronization whenever the changeover between incoming signals occurs during the period of generation of a predetermined one of said tripping impulses, and synchronizing gate means operative to determine the time of signal changeover indicated by said trigger means relative to the synchronizing tripping pulse.

28. In a multiplex telegraphy system, a signal input path, an output path, a pair of trigger means, each of which is operative to indicate signal changeover in the incoming path; signal follower means connected to said input path operative to effect repetition of incoming signals over the outgoing path, and to also extend representations of same to said trigger means; and synchronizing means including pulse generator means operative to generate a series of pulses, each series having a duration equivalent to that of one incoming impulse, means for applying said pulses to the different triggers at different predetermined time periods as tripping pulses, means for rendering said trigger operative only responsive to simultaneous receipt of an incoming signal and a tripping pulse, whereby each trigger is operated at a different time as each incoming signal is received, said system being in synchronization if signal changeover occurs during the period of generation of a first predetermined one of the impulses, and the different conditions of operation of the triggers occur during the period of generation of a second predetermined one of said impulses; and synchronization determining means operative to determine the time of occurrence of the difference in operating conditions relative to the synchronization impulses.

29. In a multiplex telegraphy system, a signal input path, an output path, a pair of trigger means, signal follower means connected to said input path operative to effect repetition of incoming signals over the outgoing path, and to also extend same to said signal indicator means; and synchronizing means including pulse generator means operative to generate a series of separate synchronization pulses, each series being equivalent in value to the duration of one incoming impulse, means for transmitting same to the different triggers at different predetermined time periods, means for controlling tripping of a trigger only responsive to concurrent receipt of the incoming signal and a tripping pulse, whereby the different triggers are operated at different times; comparer means operative as an incoming signal is received to compare the time between operations of the two triggers with the time of generation of the impulses of the corresponding series, said system being in synchronization whenever the differential period occurs during the generating period of a first impulse; fast indication means controlled by said comparer means to indicate out of synchronization in a fast direction whenever the differential period occurs during the generating period of a second impulse, and slow indication means controlled to indicate out of synchronization in a slow direction whenever a portion of the differential period occurs during the generating period of a third impulse.

30. An arrangement as set forth in claim 29 which includes synchronization adjustment means for adjusting the frequency of operation of the pulse generating means relative to the incoming signal, and means for connecting said fast indication and said slow indication means thereto to accomplish said adjustment automatically.

31. In a multiplex telegraphy system, a signal input path, an output path, a pair of trigger means, signal follower means connected to said input path operative to effect repetition of incoming signals over the outgoing path, and to also extend same to said trigger means, and synchronizing means including pulse generator means operative to generate a series of separate tripping pulses, each series being equivalent in duration to the duration of one incoming impulse, means for transmitting same to the different triggers at different predetermined time periods, means for controlling tripping of a trigger only responsive to concurrent receipt of the incoming signal and a tripping pulse, whereby the different triggers are operated at different times; comparer means operative as an incoming signal is received to determine with the time of operation of the several impulses, the system being in synchronization whenever the differential period occurs during the generating period of a first impulse of said series; fast indication means for indicating out of synchronization in a fast direction whenever the differential period occurs during the generating period of a second impulse of said series, and slow indication means for indicating out of synchronization in a slow direction whenever a portion of the differential period occurs during the generating period of a third impulse of the series; a first and a second generator means for operating said pulse generator means at a given frequency rate, said first generator controlling the frequency of operation of said second generating means, and synchronous adjustment means connected to said fast and slow indication means operated to temporarily modify the frequency output of the second generator means whenever said indication means indicate an out of synchronization condition.

32. An arrangement as set forth in claim 31 in which said fast indication and slow indication means each comprise an electronic tube set, means for supplying the output of said comparer means to each of said sets, means for supplying said second impulse of each series to said fast indication means, means for supplying said third impulse of each series to said slow indication means, correction timing means controlled to operate by said fast and slow indication with the determination of an out of synchronization condition, output means for said correction timer means operative to supply a signal of a predetermined length to said synchronization adjustment means, and means for effecting operation of said synchronization adjustment means only during the simultaneous receipt of signals from the corrector timer and one of the "out of synchronization" indication means.

33. In a multiplex telegraphy system having a station-connecting channel over which a series of frequency signals of a given length derived from $n/q$ paths in a transmitter station are transmitted in a given sequence, the signals of different paths being of different frequencies wherein "$q$" is the number of separate signal channels which may be scanned reliably at a receiver station with the occurrence of maximum element prolongation on the station-connecting channel, and "$n$" is the number of messages simultaneously transmitted in the system, a receiver station having $n/q$ subchannels, a plurality of receivers, each of which is connected to said station-connecting channel, and to an associated one of $n/q$ subchannels in the receiver station, different receivers being connected to receive signals of different frequencies, whereby each successive one of the different frequency signals in the station-connecting channel is coupled to a different one of the subchannels until each subchannel has been used, the length of a period between the successively applied signals to each of the subchannels by the receivers thereby being equivalent to at least $(n/q-1)$ times the length of each signal in the station-connecting channel.

34. In a multiplex telegraphy system having a station-connecting channel over which a series of frequency signals of a given length which are derived from a plurality of subchannels at a transmitter station are transmitted in a given sequence, a plurality of subchannels at the receiver station equal in number to the plurality of subchannels at the transmitting station a plurality of receivers, each of which is connected to said station-connecting channel and to an associated one of said receiver station subchannels, different receiver being operative to receive different frequency signals, whereby each successive one of the signals in the station-connecting channel is coupled to a different one of the subchannels until each subchannel has been used, and means coupled to each subchannel for scanning the output of each subchannel, and combining same into a single composite signal.

35. In a multiplex telegraphy system in which a number of channels, each having signals comprised of a fixed ratio of different elements are scanned to provide a series of composite signals, each of which signals includes an element from one of the channels, and in which said composite signals are transmitted over a station connecting channel; receiver means connected to said station connecting channel, an output path for said receiver means including timing means for introducing a predetermined signal element between each element occurring in the receiver output path, and means for maintaining application of said predetermined element to the path in the event of a circuit interruption in a signal element on said station connecting channel to prevent signal transposition in said receiver means.

36. In a multiplex telegraphy system in which a number of channels each having signals comprised of a fixed ratio of different elements are scanned to provide a series of composite signals, each of which includes an element from one of the channels; and in which said composite signals are transmitted over a station connecting channel; a receiving station including receiver means connected to said station connecting channel, an output path for said receiver means including timing means for introducing a predetermined signal element between each element occurring in the receiver output path, means for deriving phase-retarded indicating voltages from said incoming signals, and synchronization means at said receiver station controlled by said indicating voltages to supply synchronization pulses to said timing circuit to maintain same in operating synchronization with the transmitter equipment.

37. An arrangement as set forth in claim 36 which includes means for testing the synchronized relation of said incoming signals and said timing circuit, and means for adjusting said synchronization means to provide a synchronized operating relation as a deviation is detected.

38. In a multiplex telegraphy system having means for scanning a number of paths, each of which carries signals comprised of a fixed ratio of marking and spacing elements, said scanning means being operative to provide a series of composite signals, each of which includes an element from each one of the paths for transmission over a station connecting channel, receiver means connected to said channel, an output path for said receiver means including fault indicator means for detecting signals mutilated in transmission, and means controlled by said fault indicator means to substitute a predetermined type of element for each mutilated signal detected in said path, and ratio detector means operative to determine the receipt of a signal having a number of elements other than a predetermined ratio.

39. In a multiplex telegraphy system having means for scanning a number of paths, each of which carries signals comprised of a fixed ratio of marking and spacing elements, said scanning means being operative to provide a series of composite signals, each of which includes an element from each one of the paths for transmission over a station connecting channel, receiver means connected to said path, an output circuit for said receiver means including fault indicator means for detecting signals mutilated in transmission, means controlled by said fault indicator means to substitute a predetermined type of element for each mutilation detected in said path, means for converting said transposed signals into the original fixed ratio signals, means for examining each of the converted signals for the existence of said fixed ratio of elements, and means for requesting repetition of the signal in the event that a signal disturbance is detected.

40. An arrangement as set forth in claim 39 which includes means for detecting the occurrence of signal disturbances wherein two signals of a set are mutilated in such manner that the proper fixed ratio is provided for the set.

41. In a multiplex system having a path over which a number of signals comprised of marking and spacing elements are transmitted, receiver means operative responsive to receipt of said signals over said path comprising an input circuit, trigger means connected to said input circuit operative between two positions to mark the nature of the incoming signal, and conditioning means for applying a control signal to said input circuit for said trigger means a brief period before the receipt of each successive signal to operate the marking means to a predetermined one of its said positions just prior to the time each successive impulse is received.

42. In a multiplex system having a path over which a number of signals comprised of marking and spacing elements are transmitted, receiver means operative responsive to receipt of said signals over said path comprising an input circuit, trigger means connected to said input circuit operative between two positions to mark the nature of the incoming signal, conditioning means for applying a control signal of one of said types to said input circuit for said trigger means a brief period before the receipt of each successive signal to operate same to a predetermined one of said positions, pulse generator means operative to supply operating impulses to said conditioning means, and synchronization means operative to control application of said operating signal to said conditioning means in operating synchronization with the signals incoming to the receiver means.

43. An arrangement as set forth in claim 42 in which said conditioning means comprises an electronic tube set connected to said pulse generator means, an RC circuit connected in the output circuit of said tube set, and a signal member controlled by said RC circuit to transmit a signal to said trigger set for a predetermined interval after receipt of a signal by said tube set from said pulse generating means.

44. In a multiplex telegraphy system, a signal input path, an output path, a plurality of trigger sets, each of which is operative to provide indications of the time of changeover of the incoming signals, signal follower means connected to said input path operative responsive to signals appearing in said input path to effect repetition of same over the outgoing path, and simultaneously to extend same to said trigger sets; and synchronizing means including pulse generator means operative to transmit a tripping pulse to the different indicators at different predetermined time periods, means associated with each trigger for controlling tripping of each trigger only responsive to concurrent receipt of an incoming signal and a tripping pulse, and synchronization means operative in accordance with the indication of said trigger means in combination to control the speed of operation of said pulse generator means relative to said incoming impulse including means for detecting slow operation, fast operation, and faulty operation of the components relative to the speed of the incoming impulse.

45. In a multiplex telegraphy system, a signal input path, an output path including gate means, a pair of trigger means, a signal follower means connected to said input path operative to effect repetition of incoming signals to the gate means for transmission over the outgoing path, and to also extend same to said trigger means; synchronizing means including pulse generator means operative to generate a series of successive synchronizing pulses, each series being equivalent in summated duration to the duration of an incoming impulse; means for transmitting a different synchronization pulse to the different triggers, means for controlling tripping of a trigger only responsive to concurrent receipt of the incoming signal and a synchronizing pulse, whereby the different triggers are operated at different times; comparer means for matching the time period between operations of the two triggers with the period of generation of the impulses of the series, said system being in synchronization whenever the differential period occurs during the generating periods of a first impulse, fast indication means for indicating out of synchronization in a fast direction whenever the differential period occurs during the generating period of a second impulse, slow indicator means for indicating out of synchronization in a slow direction whenever the differential period occurs during the generating period of a third impulse, and fault indicator means for indicating a faulty signal responsive to the occurrence of a differential period during the generating period of a fourth impulse.

46. In a multiplex telegraphy system having a pair of receiver units having their output paths connected by a common gate means operative to select signals from each path in an alternate manner, each of said receivers comprising an input path, a pair of trigger means, signal follower means connected to said input path operative to effect repetition of incoming signals over the outgoing path, and to also extend same to said trigger means; synchronizing means including pulse generator means operative to generate four separate successive synchronization pulses equivalent in summated duration to the duration of an incoming impulse, means for transmitting a different synchronization pulse to the different triggers, means for controlling tripping of a trigger only responsive to concurrent receipt of the incoming signal and a synchronization pulse, whereby the different triggers are operated at different times; comparer means for determining the time period between operations of the two triggers and matching same with the synchronization impulse generated at that time, said system being in synchronization whenever the differential period occurs during the generating period of a first impulse, fast indication means for indicating out of synchronization in a fast direction whenever the differential period occurs during the generating period of a second impulse, and slow indication means for indicating out of synchronization in a slow direction whenever the differential period occurs during the generating period of a third impulse, and fault indicator means common to both of said receivers operative responsive to the occurrence of the differential period of operation of said triggers in either receiver during the generating period of a predetermined impulse thereof, the predetermined impulses for the two receivers being different.

47. An arrangement as set forth in claim 46 which includes a second comparer circuit connected to derive signals indicative of the polarity of the incoming signal at different phased periods, means for connecting same to said gating means to control same in its operation, and means for connecting synchronization pulses to said gates with said second comparer signals to synchronize operation thereof with the system.

48. In a multiplex system, an incoming signal path over which incoming signals are received, means for repeating said signals over a secondary path, means operative to derive a plurality of phase retarded signals from each signal incoming to the path, and synchronization means operative responsive to receipt of said plurality of phase retarded signals to control said signal repeater means to repeat said outgoing signals in synchronization with said incoming signals.

49. In a multiplex system, an incoming signal path over which incoming signals are received, means for repeating said signals over a secondary path, means operative to provide a series of synchronizing signals for effecting synchronized operation of said repeater with said incoming signals, means for deriving phase retarded signals from said incoming signals having a differential period which occurs concurrently with a predetermined one of the synchronizing signals when said repeater is in synchronism, and means operative with the occasion of the differential period at other than the predetermined one of the impulses to detect same and to effect automatic adjustment of said synchronizing means in the return of the equipment to synchronism.

50. In a multiplex system, an incoming signal path over which incoming signals are received, means for repeating said signals over a secondary path, means operative to derive a plurality of phase retarded signals from each signal incoming to the path, synchronization means operative responsive to receipt of said plurality of phase retarded signals to control said signal repeater means to repeat said outgoing signals in synchronism with said incoming signals, means operative to derive a second set of phase retarded signals to indicate the polarity of the incoming signals, and means controlled by said first and said second sets of phase retarded signals to operate the repeating means in synchronism with said incoming signals.

51. In a multiplex system, an incoming signal path over which signals are received, signal following means operable between two positions to indicate the nature of the incoming signals, repeater means controlled thereby to transmit the signals over an outgoing path, means operative to derive a plurality of phase retarded signals from each incoming signal, synchronizing means operative responsive to receipt of said plurality of phase retarded signals to control said repeater means to repeat said outgoing signals in synchronization with said incoming signals, and means controlled by said synchronizing means for transmitting a signal to said signal responsive means prior to the receipt of each successive incoming impulse to effect the operation thereof to a predetermined position.

References Cited in the file of this patent

UNITED STATES PATENTS

| | | |
|---|---|---|
| 1,802,240 | Dirkes et al. | Apr. 21, 1931 |
| 2,273,193 | Heising | Feb. 17, 1942 |
| 2,527,638 | Kneen et al. | Oct. 31, 1950 |
| 2,622,153 | Schuler | Dec. 16, 1952 |
| 2,629,088 | Kendall | Feb. 17, 1953 |
| 2,672,509 | McCoy | Mar. 16, 1954 |
| 2,676,203 | Phelps | Apr. 20, 1954 |

UNITED STATES PATENT OFFICE

CERTIFICATE OF CORRECTION

Patent No. 2,911,473 November 3, 1959

Hendrik Cornelis Anthong van Duuren

It is hereby certified that error appears in the printed specification of the above numbered patent requiring correction and that the said Letters Patent should read as corrected below.

Column 34, line 24, for "different signal parts" read -- signals --; line 25, for "signals" read -- different signal parts --; same line 25, after "thereover" insert a comma; column 37, line 70, after "means" insert -- to --; column 43, line 69, before "signal" strike out "a".

Signed and sealed this 20th day of September 1960.

(SEAL)

Attest:

KARL H. AXLINE

Attesting Officer

ROBERT C. WATSON

Commissioner of Patents